(12) United States Patent
Eryurek et al.

(10) Patent No.: US 7,557,702 B2
(45) Date of Patent: Jul. 7, 2009

(54) INTEGRATED ALERT GENERATION IN A PROCESS PLANT

(76) Inventors: Evren Eryurek, 5417 Blake Rd. S., Edina, MN (US) 55436; Craig Thomas Llewellyn, 7520 Auto Club Cir., Bloomington, MN (US) 55438; Lester David Marschall, 141 Roberts Cir., Georgetown, TX (US) 78628; Jon D. Westbrock, 3210 Red Oak Dr., Eagan, MN (US) 55121; Stuart A. Harris, 4636 Fairhills Rd. East, Minnetonka, MN (US) 55345; Scott N. Hokeness, 17335 Jade Ter., Lakeville, MN (US) 55044

( * ) Notice: Subject to any disclaimer, the term of this patent is extended or adjusted under 35 U.S.C. 154(b) by 410 days.

(21) Appl. No.: 10/484,907
(22) PCT Filed: Feb. 28, 2003
(86) PCT No.: PCT/US03/06018
§ 371 (c)(1), (2), (4) Date: Jan. 26, 2004
(87) PCT Pub. No.: WO03/075206
PCT Pub. Date: Sep. 12, 2003

(65) Prior Publication Data
US 2005/0007249 A1    Jan. 13, 2005

Related U.S. Application Data

(63) Continuation-in-part of application No. 10/104,586, filed on Mar. 22, 2002, which is a continuation-in-part of application No. 09/896,967, filed on Jun. 29, 2001, now Pat. No. 6,975,219, which is a continuation-in-part of application No. 09/861,790, filed on May 21, 2001, application No. 10/484,907, which is a continuation-in-part of application No. 10/087,308, filed on Mar. 1, 2002, now Pat. No. 7,346,404, which is a continuation-in-part of application No. 09/953,811, filed on Sep. 17, 2001, now Pat. No. 7,206,646, which is a continuation-in-part of application No. 09/707,580, filed on Nov. 7, 2000, now Pat. No. 6,774,786, and a continuation-in-part of application No. 09/256,585, filed on Feb. 22, 1999, now Pat. No. 6,298,454.

(60) Provisional application No. 60/273,164, filed on Mar. 1, 2001.

(51) Int. Cl.
*G08B 29/00* (2006.01)

(52) U.S. Cl. .................. 340/511; 340/517; 340/521; 340/524; 340/525; 340/3.1; 340/825.36; 340/825.49

(58) Field of Classification Search ............... 340/506, 340/511, 517, 521, 524, 525, 3.1, 825.36, 340/825.49
See application file for complete search history.

(56) References Cited

U.S. PATENT DOCUMENTS 3,096,434 A    7/1963    King ........................ 235/151

(Continued)

FOREIGN PATENT DOCUMENTS

CN    1007757    4/1990

(Continued)

OTHER PUBLICATIONS dotnet.za.net, "Web Services—A Guide for Business and IT Managers (Sep. 23, 2001)", (Copyright 2001), www.dotnet.za.net.

(Continued)

*Primary Examiner*—Daryl C Pope
(74) *Attorney, Agent, or Firm*—Marshall, Gerstein & Borun LLP

(57) ABSTRACT

Operational status information associated with a process entity in a process plant is received. The operational status information is mapped into one of a plurality of status conditions. Then, an alert message associated with the process entity is generated, where the alert message is indicative of the one status condition of the plurality of status conditions.

41 Claims, 31 Drawing Sheets

U.S. PATENT DOCUMENTS

| | | | |
|---|---|---|---|
| 3,404,264 A | 10/1968 | Kugler | 235/194 |
| 3,701,280 A | 10/1972 | Stroman | 73/194 |
| 3,705,516 A | 12/1972 | Reis | |
| 3,981,836 A | 9/1976 | Pangle, Jr. et al. | 524/549 |
| RE29,383 E | 9/1977 | Gallatin et al. | 137/14 |
| 4,058,275 A | 11/1977 | Banks et al. | 344/3.15 |
| 4,099,413 A | 7/1978 | Ohte et al. | 374/175 |
| 4,322,976 A | 4/1982 | Sisson et al. | |
| 4,337,516 A | 6/1982 | Murphy et al. | 364/551 |
| 4,408,285 A | 10/1983 | Sisson et al. | |
| 4,425,798 A | 1/1984 | Nagai et al. | |
| 4,435,770 A | 3/1984 | Shiohata et al. | |
| 4,493,042 A | 1/1985 | Shima et al. | |
| 4,517,468 A | 5/1985 | Kemper et al. | 290/52 |
| 4,527,271 A | 7/1985 | Hallee et al. | |
| 4,530,234 A | 7/1985 | Cullick et al. | 73/53 |
| 4,607,325 A | 8/1986 | Horn | |
| 4,635,214 A | 1/1987 | Kasai et al. | 364/551 |
| 4,642,782 A | 2/1987 | Kemper | 364/550 |
| 4,644,478 A | 2/1987 | Stephens et al. | |
| 4,644,749 A | 2/1987 | Somes | 60/459 |
| 4,649,515 A | 3/1987 | Thompson et al. | 364/900 |
| 4,657,179 A | 4/1987 | Aggers et al. | |
| 4,683,542 A | 7/1987 | Tanguti | |
| 4,707,796 A | 11/1987 | Calabro et al. | 364/552 |
| 4,734,873 A | 3/1988 | Malloy et al. | |
| 4,758,964 A | 7/1988 | Bittner et al. | |
| 4,763,243 A | 8/1988 | Barlow et al. | |
| 4,764,862 A | 8/1988 | Barlow et al. | |
| 4,777,585 A | 10/1988 | Kokawa et al. | 364/164 |
| 4,819,233 A | 4/1989 | Delucia et al. | 371/19 |
| 4,831,564 A | 5/1989 | Suga | 364/999.999 |
| 4,843,557 A | 6/1989 | Ina et al. | 364/999.999 |
| 4,873,655 A | 10/1989 | Kondraska | 364/553 |
| 4,885,694 A | 12/1989 | Pray et al. | |
| 4,885,707 A | 12/1989 | Nichol et al. | |
| 4,907,167 A | 3/1990 | Skeirik | |
| 4,910,691 A | 3/1990 | Skeirik | |
| 4,922,412 A | 5/1990 | Lane et al. | 364/157 |
| 4,924,418 A | 5/1990 | Backman et al. | 364/550 |
| 4,934,196 A | 6/1990 | Romano | 73/999.999 |
| 4,942,514 A | 7/1990 | Miyagaki et al. | 364/190 |
| 4,944,035 A | 7/1990 | Aagardl et al. | |
| 4,956,793 A | 9/1990 | Bonne et al. | |
| 4,964,125 A | 10/1990 | Kim | 371/20 |
| 4,965,742 A | 10/1990 | Skeirik | |
| 4,980,844 A | 12/1990 | Demjanenko et al. | |
| 4,992,965 A | 2/1991 | Holter et al. | 364/999.999 |
| 5,005,142 A | 4/1991 | Lipchak et al. | 354/550 |
| 5,006,992 A | 4/1991 | Skeirik | |
| 5,008,810 A | 4/1991 | Kessel et al. | |
| 5,015,934 A | 5/1991 | Holley et al. | |
| 5,018,215 A | 5/1991 | Nasr et al. | |
| 5,043,862 A | 8/1991 | Takahashi et al. | 364/162 |
| 5,043,863 A | 8/1991 | Bristol et al. | |
| 5,050,095 A | 9/1991 | Samad | |
| 5,053,815 A | 10/1991 | Wendell | 355/208 |
| 5,070,458 A | 12/1991 | Gilmore et al. | |
| 5,081,598 A | 1/1992 | Bellows et al. | 364/513 |
| 5,089,978 A | 2/1992 | Lipner | 364/999.999 |
| 5,089,984 A | 2/1992 | Struger et al. | 364/200 |
| 5,094,107 A | 3/1992 | Schoch | |
| 5,098,197 A | 3/1992 | Shepard et al. | 374/120 |
| 5,099,436 A | 3/1992 | McCown et al. | 364/550 |
| 5,103,409 A | 4/1992 | Shimizu et al. | 364/556 |
| 5,111,531 A | 5/1992 | Grayson et al. | 364/513 |
| 5,121,467 A | 6/1992 | Skeirik | |
| 5,122,976 A | 6/1992 | Bellows et al. | 364/550 |
| 5,130,936 A | 7/1992 | Sheppard et al. | 364/999.999 |
| 5,134,574 A | 7/1992 | Beaverstock et al. | |
| 5,140,530 A | 8/1992 | Guha | |
| 5,142,612 A | 8/1992 | Skeirik | |
| 5,148,378 A | 9/1992 | Shibayama et al. | 364/999.999 |
| 5,161,013 A | 11/1992 | Rylander et al. | |
| 5,167,009 A | 11/1992 | Skeirik | |
| 5,175,678 A | 12/1992 | Frerichs et al. | 364/148 |
| 5,187,674 A | 2/1993 | Bonne | |
| 5,193,143 A | 3/1993 | Kaemmerer et al. | |
| 5,197,114 A | 3/1993 | Skeirik | |
| 5,197,328 A | 3/1993 | Fitzgerald | 73/168 |
| 5,200,958 A | 4/1993 | Hamilton et al. | 371/16.4 |
| 5,210,704 A | 5/1993 | Husseiny | |
| 5,212,765 A | 5/1993 | Skeirik | |
| 5,214,582 A | 5/1993 | Gray | 364/999.999 |
| 5,224,203 A | 6/1993 | Skeirik | |
| 5,228,780 A | 7/1993 | Shepard et al. | 374/175 |
| 5,235,527 A | 8/1993 | Ogawa et al. | 364/999.999 |
| 5,251,151 A | 10/1993 | Demjanenko et al. | |
| 5,265,031 A | 11/1993 | Malczewski | 364/497 |
| 5,265,222 A | 11/1993 | Nishiya et al. | 395/3 |
| 5,274,572 A | 12/1993 | O'Neill et al. | 364/550 |
| 5,282,261 A | 1/1994 | Skeirik | |
| 5,291,190 A | 3/1994 | Scarola et al. | |
| 5,293,585 A | 3/1994 | Morita et al. | 395/52 |
| 5,301,101 A | 4/1994 | MacArthur et al. | |
| 5,303,181 A | 4/1994 | Stockton | 365/96 |
| 5,305,230 A | 4/1994 | Matsumoto et al. | 364/495 |
| 5,311,421 A | 5/1994 | Nomura et al. | 364/157 |
| 5,311,447 A | 5/1994 | Bonne | |
| 5,311,562 A | 5/1994 | Palusamy | |
| 5,315,521 A | 5/1994 | Hanson et al. | 364/468 |
| 5,317,520 A | 5/1994 | Castle | 364/482 |
| 5,325,522 A | 6/1994 | Vaughn | |
| 5,327,357 A | 7/1994 | Feinstein et al. | 364/502 |
| 5,333,240 A | 7/1994 | Matsumoto et al. | 395/23 |
| 5,333,298 A | 7/1994 | Bland et al. | 395/500 |
| 5,347,449 A | 9/1994 | Meyer et al. | 364/185 |
| 5,349,541 A | 9/1994 | Alexandro, Jr. et al. | 364/578 |
| 5,351,184 A | 9/1994 | Lu et al. | |
| 5,353,207 A | 10/1994 | Keeler et al. | |
| 5,353,315 A | 10/1994 | Scarola et al. | |
| 5,361,612 A | 11/1994 | Voiculescu et al. | 70/241 |
| 5,369,599 A | 11/1994 | Sadjadi et al. | |
| 5,373,452 A | 12/1994 | Guha | |
| 5,384,698 A | 1/1995 | Jelinek | |
| 5,384,699 A | 1/1995 | Levy et al. | 364/999.999 |
| 5,386,373 A | 1/1995 | Keeler et al. | 364/577 |
| 5,390,287 A | 2/1995 | Obata | 395/67 |
| 5,390,326 A | 2/1995 | Shah | |
| 5,394,341 A | 2/1995 | Kepner | 364/999.999 |
| 5,394,543 A | 2/1995 | Hill et al. | 395/575 |
| 5,396,415 A | 3/1995 | Konar et al. | |
| 5,398,303 A | 3/1995 | Tanaka | |
| 5,400,246 A * | 3/1995 | Wilson et al. | 700/17 |
| 5,404,064 A | 4/1995 | Mermelstein et al. | 310/319 |
| 5,408,406 A | 4/1995 | Mathur et al. | |
| 5,408,586 A | 4/1995 | Skeirik | 395/23 |
| 5,511,442 A | 4/1995 | Hernandez | |
| 5,414,645 A | 5/1995 | Hirano | 364/999.999 |
| 5,419,197 A | 5/1995 | Ogi et al. | 73/659 |
| 5,430,642 A | 7/1995 | Nakajima et al. | 364/148 |
| 5,440,478 A | 8/1995 | Fisher et al. | 364/188 |
| 5,442,544 A | 8/1995 | Jelinek | |
| 5,461,570 A | 10/1995 | Wang et al. | |
| 5,467,355 A | 11/1995 | Umeda et al. | 371/29.1 |
| 5,469,735 A | 11/1995 | Watanabe | 73/118.1 |
| 5,483,387 A | 1/1996 | Bauhahn et al. | 359/885 |
| 5,485,753 A | 1/1996 | Burns et al. | 73/720 |
| 5,486,920 A | 1/1996 | Killpatrick et al. | |
| 5,486,996 A | 1/1996 | Samad et al. | |
| 5,488,697 A | 1/1996 | Kaemmerer et al. | |
| 5,489,831 A | 2/1996 | Harris | 318/701 |
| 5,499,188 A | 3/1996 | Kline, Jr. et al. | |
| 5,500,941 A | 3/1996 | Gil | 395/183.14 |

| Patent No. | Date | Inventor | Class |
|---|---|---|---|
| 5,511,004 A | 4/1996 | Dubost et al. | 364/999.999 |
| 5,521,814 A | 5/1996 | Teran et al. | |
| 5,528,510 A | 6/1996 | Kraft | 364/488 |
| 5,533,413 A | 7/1996 | Kobayashi et al. | |
| 5,537,310 A | 7/1996 | Tanake et al. | |
| 5,541,833 A | 7/1996 | Bristol et al. | |
| 5,546,301 A | 8/1996 | Agrawal et al. | |
| 5,548,528 A | 8/1996 | Keeler et al. | 364/497 |
| 5,559,690 A | 9/1996 | Keeler et al. | |
| 5,561,599 A | 10/1996 | Lu | |
| 5,566,065 A | 10/1996 | Hansen et al. | |
| 5,570,282 A | 10/1996 | Hansen et al. | |
| 5,570,300 A | 10/1996 | Henry et al. | 364/999.999 |
| 5,572,420 A | 11/1996 | Lu | |
| 5,574,638 A | 11/1996 | Lu | |
| 5,586,066 A | 12/1996 | White et al. | 364/576 |
| 5,596,704 A | 1/1997 | Geddes et al. | |
| 5,598,521 A | 1/1997 | Kilgore et al. | 395/155 |
| 5,600,148 A | 2/1997 | Cole et al. | 250/495.1 |
| 5,602,757 A | 2/1997 | Haseley et al. | |
| 5,602,761 A | 2/1997 | Spoerre et al. | |
| 5,604,914 A | 2/1997 | Kabe | 395/800 |
| 5,610,339 A | 3/1997 | Haseley et al. | |
| 5,623,598 A | 4/1997 | Voigt et al. | 395/184.01 |
| 5,625,574 A | 4/1997 | Griffiths et al. | 364/550 |
| 5,628,994 A | 5/1997 | Kaper et al. | 424/93.2 |
| 5,631,825 A | 5/1997 | van Weele et al. | |
| 5,640,491 A | 6/1997 | Bhat et al. | |
| 5,640,493 A | 6/1997 | Skeirik | |
| 5,646,350 A | 7/1997 | Robinson et al. | |
| 5,666,297 A | 9/1997 | Britt et al. | |
| 5,671,335 A | 9/1997 | Davis et al. | 395/23 |
| 5,671,351 A | 9/1997 | Wild et al. | 395/183.14 |
| 5,675,504 A | 10/1997 | Serodes et al. | 364/496 |
| 5,680,409 A | 10/1997 | Qin et al. | |
| 5,682,309 A | 10/1997 | Bartusiak et al. | 364/149 |
| 5,687,090 A | 11/1997 | Chen et al. | |
| 5,691,895 A | 11/1997 | Kurtzberg et al. | |
| 5,692,158 A | 11/1997 | Degeneff et al. | |
| 5,698,788 A | 12/1997 | Mol et al. | |
| 5,704,011 A | 12/1997 | Hansen et al. | |
| 5,715,158 A | 2/1998 | Chen | |
| 5,729,661 A | 3/1998 | Keeler et al. | |
| 5,740,324 A | 4/1998 | Mathur et al. | |
| 5,742,513 A | 4/1998 | Bouhenguel et al. | |
| 5,754,451 A | 5/1998 | Williams | |
| 5,757,371 A | 5/1998 | Oran et al. | 345/348 |
| 5,761,518 A | 6/1998 | Boehling et al. | |
| 5,764,891 A | 6/1998 | Warrior | |
| 5,768,119 A | 6/1998 | Havekost et al. | |
| 5,777,872 A | 7/1998 | He | |
| 5,781,432 A | 7/1998 | Keeler et al. | |
| 5,781,878 A | 7/1998 | Mizoguchi et al. | 701/109 |
| 5,790,898 A | 8/1998 | Kishima et al. | |
| 5,796,602 A | 8/1998 | Wellan et al. | |
| 5,796,609 A | 8/1998 | Tao et al. | |
| 5,798,939 A | 8/1998 | Ochoa et al. | |
| 5,805,442 A | 9/1998 | Crater et al. | |
| 5,809,490 A | 9/1998 | Guiver et al. | |
| 5,819,050 A | 10/1998 | Boehling et al. | |
| 5,819,232 A | 10/1998 | Shipman | |
| 5,825,645 A | 10/1998 | Konar et al. | |
| 5,826,249 A | 10/1998 | Skeirik | |
| 5,838,561 A | 11/1998 | Owen | 364/152 |
| 5,842,189 A | 11/1998 | Keeler et al. | |
| 5,847,952 A | 12/1998 | Samad | |
| 5,848,365 A | 12/1998 | Coverdill | 701/35 |
| 5,855,791 A | 1/1999 | Hays et al. | |
| 5,859,773 A | 1/1999 | Keeler et al. | |
| 5,859,885 A | 1/1999 | Rusnica et al. | 376/259 |
| 5,859,964 A | 1/1999 | Wang et al. | |
| 5,875,420 A | 2/1999 | Piety et al. | |
| 5,877,954 A | 3/1999 | Klimasauskas et al. | |
| 5,880,716 A | 3/1999 | Kunugi | 345/173 |
| 5,892,679 A | 4/1999 | He | |
| 5,892,939 A | 4/1999 | Call et al. | |
| 5,898,869 A | 4/1999 | Anderson | |
| 5,901,058 A | 5/1999 | Steinman et al. | |
| 5,905,989 A | 5/1999 | Biggs | |
| 5,907,701 A | 5/1999 | Hanson | |
| 5,909,370 A | 6/1999 | Lynch | |
| 5,909,541 A | 6/1999 | Sampson et al. | |
| 5,909,586 A | 6/1999 | Anderson | |
| 5,917,840 A | 6/1999 | Cheney et al. | |
| 5,918,233 A | 6/1999 | LaChance et al. | |
| 5,922,963 A | 7/1999 | Piety et al. | |
| 5,924,086 A | 7/1999 | Mathur et al. | |
| 5,940,290 A | 8/1999 | Dixon | |
| 5,948,101 A | 9/1999 | David et al. | |
| 5,949,417 A | 9/1999 | Calder | |
| 5,951,654 A | 9/1999 | Avsan et al. | 710/5 |
| 5,960,214 A | 9/1999 | Sharpe, Jr. et al. | |
| 5,960,441 A | 9/1999 | Bland et al. | |
| 5,975,737 A | 11/1999 | Crater et al. | |
| 5,984,502 A | 11/1999 | Calder | |
| 5,988,847 A | 11/1999 | McLaughlin et al. | |
| 5,995,916 A | 11/1999 | Nixon et al. | |
| 5,997,167 A | 12/1999 | Crater et al. | |
| 6,006,171 A | 12/1999 | Vines et al. | 702/184 |
| 6,008,985 A | 12/1999 | Lake et al. | |
| 6,014,612 A | 1/2000 | Larson et al. | 702/183 |
| 6,017,143 A | 1/2000 | Eryurek et al. | |
| 6,026,352 A | 2/2000 | Burns et al. | |
| 6,033,257 A | 3/2000 | Lake et al. | |
| 6,035,339 A | 3/2000 | Agraharam et al. | 709/234 |
| 6,038,486 A | 3/2000 | Saitoh et al. | |
| 6,041,263 A | 3/2000 | Boston et al. | |
| 6,047,221 A | 4/2000 | Piche et al. | |
| 6,055,483 A | 4/2000 | Lu | |
| 6,061,603 A | 5/2000 | Papadopoulos et al. | |
| 6,067,505 A | 5/2000 | Bonoyer | |
| 6,076,124 A | 6/2000 | Korowitz et al. | |
| 6,078,843 A | 6/2000 | Shavit | |
| 6,093,211 A | 7/2000 | Hamielec et al. | |
| 6,106,785 A | 8/2000 | Havlena et al. | |
| 6,108,616 A | 8/2000 | Borchers et al. | |
| 6,110,214 A | 8/2000 | Klimasauskas | |
| 6,122,555 A | 9/2000 | Lu | |
| 6,128,279 A | 10/2000 | O'Neil et al. | |
| 6,134,574 A | 10/2000 | Oberman et al. | 708/551 |
| 6,144,952 A | 11/2000 | Keeler et al. | |
| 6,169,980 B1 | 1/2001 | Keeler et al. | |
| 6,185,470 B1 | 2/2001 | Pado et al. | 700/104 |
| 6,197,480 B1 | 3/2001 | Iguchi et al. | |
| 6,246,972 B1 | 6/2001 | Klimasauskas | 703/2 |
| 6,259,959 B1 | 7/2001 | Martin | 700/99 |
| 6,266,726 B1 | 7/2001 | Nixon et al. | |
| 6,298,377 B1 | 10/2001 | Hartikainen et al. | |
| 6,298,454 B1 | 10/2001 | Schleiss et al. | |
| 6,317,638 B1 | 11/2001 | Schreder et al. | |
| 6,317,701 B1 | 11/2001 | Pyotsia et al. | |
| 6,332,110 B1 | 12/2001 | Wolfe | |
| 6,389,331 B1 | 5/2002 | Jensen et al. | 700/275 |
| 6,397,114 B1 | 5/2002 | Eryurek et al. | |
| 6,400,681 B1 | 6/2002 | Bertin et al. | 370/351 |
| 6,418,465 B1 | 7/2002 | Hirosawa et al. | 709/206 |
| 6,421,571 B1 | 7/2002 | Spriggs et al. | |
| 6,445,963 B1 | 9/2002 | Blevins et al. | |
| 6,507,797 B1 | 1/2003 | Kliman et al. | |
| 6,529,780 B1 | 3/2003 | Soergel et al. | |
| 6,535,769 B1 | 3/2003 | Konar et al. | |
| 6,549,130 B1 | 4/2003 | Joao et al. | |
| 6,567,718 B1 | 5/2003 | Campbell et al. | 700/30 |
| 6,571,273 B1 | 5/2003 | Shirai et al. | 709/201 |
| 6,591,260 B1 | 7/2003 | Schwarzhoff et al. | 707/2 |
| 6,609,040 B1 | 8/2003 | Brunnemann | |

| | | | |
|---|---|---|---|
| 6,628,994 B1 | 9/2003 | Turicchi et al. | |
| 6,633,782 B1 | 10/2003 | Schleiss et al. | |
| 6,651,012 B1 | 11/2003 | Bechhoefer et al. | |
| 6,654,697 B1 | 11/2003 | Eryurek et al. | |
| 6,690,274 B1 | 2/2004 | Bristol et al. | |
| 6,704,689 B1 | 3/2004 | Hogan et al. | 702/184 |
| 6,717,513 B1 | 4/2004 | Sandelman et al. | 340/506 |
| 6,721,609 B1 | 4/2004 | Wojsznis et al. | |
| 6,732,191 B1 | 5/2004 | Baker et al. | 710/1 |
| 6,738,388 B1 | 5/2004 | Stevenson et al. | |
| 6,758,168 B2 | 7/2004 | Koskinen et al. | 122/7 R |
| 6,760,782 B1 | 7/2004 | Swales | 709/224 |
| 6,774,786 B1 | 8/2004 | Havekost et al. | |
| 2002/0022894 A1 | 2/2002 | Eryurek et al. | |
| 2002/0029130 A1 | 3/2002 | Eryurek et al. | |
| 2002/0067370 A1 | 6/2002 | Forney et al. | 345/733 |
| 2002/0077711 A1 | 6/2002 | Nixon et al. | |
| 2002/0147511 A1 | 10/2002 | Eryurek et al. | |
| 2002/0161940 A1 | 10/2002 | Eryurek et al. | |
| 2002/0163427 A1 | 11/2002 | Eryurek et al. | |
| 2003/0002969 A1 | 1/2003 | Risser | 414/542 |
| 2003/0009572 A1 | 1/2003 | Thurner | 709/230 |
| 2003/0014500 A1 | 1/2003 | Schleiss et al. | |
| 2003/0028268 A1 | 2/2003 | Eryurek et al. | |
| 2003/0195934 A1 | 10/2003 | Peterson et al. | 709/206 |
| 2004/0075689 A1 | 4/2004 | Schleiss et al. | 700/83 |
| 2004/0181364 A1 | 9/2004 | Reeves et al. | |
| 2004/0249583 A1 | 12/2004 | Eryurek et al. | 702/183 |
| 2005/0007249 A1 | 1/2005 | Eryurek et al. | |
| 2005/0240289 A1 | 10/2005 | Hoyte et al. | 700/49 |

FOREIGN PATENT DOCUMENTS

| | | |
|---|---|---|
| CN | 1097804 | 1/1995 |
| CN | 1267373 | 9/2000 |
| DE | 35 40204 C1 | 9/1986 |
| DE | 40 08 560 A1 | 9/1990 |
| DE | 44 33 593 A1 | 6/1995 |
| DE | 195 02 499 A1 | 8/1996 |
| EP | 0 122 622 | 10/1984 |
| EP | 0 377 736 | 7/1990 |
| EP | 0 413 814 | 2/1991 |
| EP | 0 487 419 | 5/1992 |
| EP | 0 594 227 | 4/1994 |
| EP | 0 612 039 | 8/1994 |
| EP | 0 626 697 A1 | 11/1994 |
| EP | 0 644 470 | 3/1995 |
| EP | 0 723 4988 | 5/1995 |
| EP | 0 362 386 | 6/1995 |
| EP | 0 827 096 | 3/1998 |
| EP | 0 624 847 | 8/1999 |
| EP | 0 959 398 A1 | 11/1999 |
| EP | 0 961 184 A2 | 12/1999 |
| EP | 0 964 325 A1 | 12/1999 |
| EP | 0 965 897 A1 | 12/1999 |
| GB | 2 083 258 A | 3/1982 |
| GB | 2 294 129 | 4/1996 |
| GB | 2 294 793 | 5/1996 |
| GB | 2 347 234 A | 8/2000 |
| GB | 2 380 833 | 4/2003 |
| JP | 05-122853 | 5/1993 |
| JP | 0 624 2192 | 2/1994 |
| RU | 5868 U1 | 1/1996 |
| RU | 94030327 | 6/1996 |
| RU | 2103668 | 1/1998 |
| RU | 2114456 | 6/1998 |
| RU | 2154853 | 8/2000 |
| RU | 2178578 | 1/2002 |
| WO | WO 98/38585 | 9/1998 |
| WO | WO 99/13418 | 3/1999 |
| WO | WO 00/50851 | 8/2000 |
| WO | WO 02/23405 | 3/2002 |
| WO | WO 02/095633 A2 | 11/2002 |
| WO | WO 03/075206 A2 | 9/2003 |

OTHER PUBLICATIONS

European Examination Report, EP 02723319.6, dated Jul. 1, 2004.
European Examination Report, EP 02717514.0, dated Jun. 29, 2004.
Examination Report under Section 18(3) issued in GB 0308687.9 by the United Kingdom Patent Office on Mar. 11, 2005.
First Office Action issued in Chinese Application No. 02805854.2 on Nov. 11, 2005.
First Office Action issued in Chinese Application No. 02122060.3 on Feb. 4, 2005.
First Office Action issued in Chinese Application No. 02805785.6 on Nov. 11, 2005.
International Search Report of PCT/US02/05874, mailed Nov. 13, 2002.
International Search Report for PCT/US02/15901, mailed Jun. 17, 2003.
International Preliminary Examination Report of PCT/US02/05874, mailed Feb. 3, 2003.
International Preliminary Examination Report for PCT/US02/15901, mailed Sep. 10, 2003.
Lighthammer Illuminator™ Manufacturing Intelligence Brochure "Now you can see all your manufacturing information from a single interface—in real-time, from anywhere."
Lighthammer Software Development, "Illuminator™ The 1st 'Plant Information Portal'™" (Copyright 1999).
Mazaeda et al., "Supervision and Optimised Process Control in Sugar Beet Factories," Centre of Sugar Technology, Spain from www.univ-reims.fr/externes/avh10mazaeda.pdf.
Search Report under Section 17 issued in GB 0308687.9 by the United Kingdom Patent Office on Aug. 28, 2003.
Search Report under Section 17(5) issued in GB 0416908.2 application by the United Kingdom Patent Office, dated Oct. 13, 2004.
Systinet, "Introduction to Web Services", (Copyright 2001, 2002), www.systinet.com.
U.S. Appl. No. 60/273,164, filed Mar. 1, 2001, "Asset Utilization Expert in a Process Control Plant."
Written Opinion of PCT/US02/05874, mailed Nov. 13, 2002.
Written Opinion for PCT/US02/15901, mailed Jul. 16, 2003.
Web Services Architect, "What are Web Services", www.webservicesarchitect.com.
Zolera Systems, "A Brief Guide to Web Services Protocols" (Copyright 2001), www.zolera.com.
"GE Predictor Services: GE Predictor Services Overview", GE Industrial Systems, available at http://www.geindustrial.com/cwc/services?id=71 on Jul. 18, 2002.
"Electrical Equipment Coverage," GE Industrial Systems, avialable at http://www.geindustrial.com/cwc/services?id=72 on Jul. 18, 2002.
"Customer Impact," GE Industrial Systems, available at http://www.geindustrial.com/cwc/services?id=73 on Jul. 18, 2002.
"Predictor Services," GE Industrial Systems, available at http://www.geindustrial.com/cwc/services?id=74 on Jul. 18, 2002.
"Customer Benefits," GE Industrial Systems, available at http://geindustrial.com/cwc/services?id=75 on Jul. 18, 2002.
International Search Report for PCT/US02/16033, dated Jun. 17, 2003.
Written Opinion for PCT/US02/16033, mailed Jul. 21, 2003.
International Preliminary Examination Report for PCT/US02/16033, mailed Sep. 16, 2003.
International Search Report for PCT/US04/004939, issued Sep. 8, 2004.
Written Opinion for PCT/US04/004939, mailed Sep. 29, 2004.
Great Britain Examination Report under Section 18(3) issued Dec. 17, 2003 in Application No. GB 0126490.2.
Great Britain Search Report under Section 17 performed on Dec. 11, 2002 in Application No. GB 0212610.0.
Great Britain Examination Report under Section 18(3) issued on Sep. 16, 2004 in Application No. GB 0212610.0.
Search Report under Section 17 issued by Great Britain Patent Office, dated Jun. 11, 2002 in Application No. GB 012490.2 (UK 2083258).
International Search Report for PCT/US02/06577, dated Nov. 13, 2002.

Wernwe Kalkhoff, "Agent-Oriented Robot Task Transformation," Proceeding of the International Symposium on Intelligent Control, IEEE, pp. 242-247 (Aug. 27, 1995).

"Status Signals of Field Instruments," NAMUR Recommendation, NA 64, Feb. 1, 2001, pp. 1-8.

International Search Report issued in PCT/US03/06018 dated Jan. 28, 2008.

Official Action for Russian Patent Application No. 2004129311/09(031521), received Dec. 12, 2007.

Office Action for Japanese Patent Application No. 2003-573590, dated Dec. 9, 2008.

\* cited by examiner

|  | PI | VI | HI | UI |
|---|---|---|---|---|
| Unit | x |  | x | x |
| Sub Unit | x |  | x | x |
| Loop |  | x | x | x |
| Device |  | x | x |  |

FIG. 9

FCCU Health: 97.5

| Device Name | Index | Description | Weight |
|---|---|---|---|
| FV-111 | 100 | Leaking | 3 |
| TI-111 | 98 | Sticktion | 3 |
| LI-111 | 90 | 40 | 3 |
| MC-101 | 95 | Will burn up in 2 weeks | 3 |
| FV-111 | 96 | 0 | 1 |

FIG. 11

FCCU Variability: 12.1

| Device Name | Index | Weight |
|---|---|---|
| FV-101 | 0 | 3 |
| TI-111 | 2 | 3 |
| LI-111 | 40 | 3 |
| FV-111 | 0 | 3 |
| FV-112 | 0 | 1 |
| TI-222 | 2 | 1 |
| FI-101 | 7 | 3 |
| TI-111 | 6 | 3 |
| LI-111 | 7 | 3 |
| FI-111 | 7 | 3 |
| FI-112 | 7 | 1 |
| TI-222 | 7 | 1 |
| Sub unit: Reboiler RB101 | 15 | 2 |
| | | |

FIG. 12

INTEGRATED ALERT GENERATION IN A PROCESS PLANT

RELATED APPLICATIONS

The present application is a continuation-in-part of, and claims priority to, U.S. patent application Ser. No. 10/104,586, entitled "Integrated Device Alerts in a Process Control System," filed on Mar. 22, 2002, which is a continuation-in-part of, and claims priority to, U.S. patent application Ser. No. 09/896,967 entitled "Enhanced Hart Device Alerts in a Process Control System," filed on Jun. 29, 2001, which in turn is a continuation-in-part of, and claims priority to, U.S. patent application Ser. No. 09/861,790, entitled "Enhanced Fieldbus Device Alerts in a Process Control System," filed on May 21, 2001, which in turn is a non-provisional of, and claims priority to, U.S. Provisional Patent Application No. 60/273,164, entitled "Asset Utilization Expert in a Process Control Plant," filed on Mar. 1, 2001.

Additionally, the present application is a continuation-in-part of, and claims priority to, U.S. patent application Ser. No. 10/087,308 entitled, "Data Sharing in a Process Plant," filed on Mar. 1, 2002, which is a non-provisional of, and claims priority to, U.S. Provisional Application No. 60/273,164, entitled "Asset Utilization Expert in a Process Control Plant," filed on Mar. 1, 2001. U.S. patent application Ser. No. 10/087,308 also is a continuation-in-part of, and claims priority to, U.S. patent application Ser. No. 09/953,811, entitled "Fusion of Process Performance Monitoring with Process Equipment Monitoring and Control," filed on Sep. 17, 2001, which in turn is a continuation-in-part of, and claims priority to U.S. patent application Ser. No. 09/707,580, entitled "Integrated Alarm Display in a Process Control Network," filed Nov. 7, 2000, and which also is a continuation-in-part of, and claims priority to U.S. patent application Ser. No. 09/256,585, entitled "Diagnostics in a Process Control System," filed Feb. 22, 1999.

The above-referenced patent applications are hereby incorporated by reference herein in their entireties for all purposes.

FIELD OF TECHNOLOGY

This disclosure relates generally to process control and maintenance systems within process plants and, more particularly, to processing data received from multiple data sources within a process plant.

DESCRIPTION OF THE RELATED ART

Process control systems, like those used in chemical, petroleum or other processes, typically include one or more centralized or decentralized process controllers communicatively coupled to at least one host or operator workstation and to one or more process control and instrumentation devices, such as field devices, via analog, digital or combined analog/digital buses. Field devices, which may be, for example valves, valve positioners, switches, transmitters, and sensors (e.g., temperature, pressure and flow rate sensors), perform functions within the process such as opening or closing valves and measuring, process parameters. The process controller receives signals indicative of process measurements or process variables made by or associated with the field devices and/or other information pertaining to the field devices, uses this information to implement a control routine and then generates control signals which are sent over one or more of the buses to the field devices to control the operation of the process. Information from the field devices and the controller is typically made available to one or more applications executed by an operator workstation to enable an operator to perform desired functions with respect to the process, such as viewing the current state of the process, modifying the operation of the process, etc.

The DeltaV™ process control system sold by Fisher Rosemount Systems, Inc. uses function blocks located or installed in controllers or different field devices to perform control operations. The controllers and, in some cases, the field devices are capable of storing and executing one or more function blocks, each of which receives inputs from and/or provides outputs to other function blocks (either within the same device or within different devices) and performs some process control operation, such as measuring or detecting a process parameter, controlling a device or performing a control operation such as implementing a proportional-integral-derivative (PID) control routine. The different function blocks within a process control system are configured to communicate with each other (e.g., within a single device or over a bus) to form one or more process control loops, the individual operations of which may be distributed throughout the process control system. Also, as is well known, in addition to function blocks, FOUNDATION Fieldbus (hereinafter Fieldbus) devices may each have one or more associated resource blocks and/or transducer blocks that represent various capabilities of that device. For example, a Fieldbus temperature transmitter having two temperature sensing elements may include two transducer blocks (i.e., one for each sensing element) and a function block that reads the outputs of the two sensing elements (via the transducer blocks) to produce an average temperature value.

Typically, the function, transducer and resource blocks, or the devices in which these blocks are implemented, are configured to detect errors, faults or problems that occur within the process control loops, the units, the devices, etc. and to send a signal (either automatically, as is the case with Fieldbus devices or in response to polling, as is the case with HART devices) such as an alarm or alert message, to notify an operator at an operator workstation or other user interface that an undesirable condition exists within the process control system or a control loop of the process control system. Such alarms or alerts may indicate, for example, that a block is not communicating, that a block has received or generated an out of range input or output, that a block is undergoing a fault or other undesirable condition, etc. In current alarm processing and display systems, an application executed at, for example, an operator interface/workstation, may be configured to receive messages containing process alarms related to process operation and to display these process alarms in a coherent and manageable manner to thereby enable an operator to manage alarms in some organized or logical way. Such an operator interface system is described in U.S. Pat. No. 5,768,119, entitled "Process Control System Including Alarm Priority Adjustment," which is incorporated by reference herein.

In the past, conventional field devices were used in process control systems to send and receive analog signals, such as, for example, 4-20 milliamp (mA) signals to and from the process controller via an analog bus or analog lines. However, these 4-20 mA signals are limited in nature because they are only indicative of process measurements made by the device or of process control signals generated by the controller required to control the operation of the device during runtime. As a result, conventional 4-20 mA devices are incapable of generating alarms or alerts pertaining to the operational capability or status of the devices. Thus, alarms associated with the condition or status of these devices have generally not been available within process control systems.

More recently, smart field devices including a microprocessor and a memory have become prevalent in the process control industry. A number of open smart device communication protocols such as the Fieldbus, HART®, PROFIBUS®, WORLDFIP®, Device-Net®, and CAN protocols have been developed to enable smart field devices made by different manufacturers to be used together within the same process control network. In addition to performing a primary function within the process, a smart field device may store data pertaining to the device, communicate with the controller and/or other devices in a digital or combined digital and analog format and may perform secondary tasks such as self-calibration, identification, diagnostics, etc. Importantly, the devices conforming to at least some of these protocols (such as the HART and Fieldbus protocols) are capable of detecting problems within the device itself and are capable of generating and sending alarm or alert messages to indicate the detected problems to the appropriate operators, maintenance personnel, engineering personnel and related systems responsible for the operation of the process control system.

Fieldbus devices, for example, communicate alarm or alert information using a well known message format. Fieldbus device alarm messages include a block identification field, a relative identification field, a subcode field and a floating point number field. Generally speaking, the fields provided within a Fieldbus device alarm message specify, in increasing levels of particularity, the source of an alarm message and the nature of the alarm or alert conveyed thereby. In particular, the block identification field within a Fieldbus device alarm message identifies the block within the Fieldbus device from which the alarm message originated. Thus, a controller, workstation, etc. may use the block identification field within a Fieldbus device alarm message to determine which block generated the alarm message and whether the alarm message was generated by a function block, resource block or a transducer block.

The relative identification field of a Fieldbus device alarm message identifies what parameter within a particular block (e.g., a function block, resource block, or transducer block) caused the generation of the alarm message. A given block may have two or more parameters associated with it that can be distinguished from each other by using different values within the relative identification field. For example, a function block may have several inputs and outputs, each of which may be uniquely associated with a different relative identification field value.

The subcode field generally provides a numeric value that is indicative of the nature of the alarm message being transmitted by a device and that is predetermined by the device manufacturer. For example, the subcode field may be used to indicate that a sensor reading is outside of a normal operating range, that a sensor has failed completely, or any other failure that can occur within a Fieldbus device.

In Fieldbus devices the subcode field is device and manufacturer specific so that different types of failures within a particular block of a given Fieldbus device may result in different subcode field values and so that identical types of failures within different devices and/or within similar devices made by different manufacturers may also result in different subcode field values being sent within an alarm message. Because the subcode field is not user configurable and because the subcode field values for particular types of failures are device and/or manufacturer specific, manufacturers typically provide a list of subcodes and corresponding failure types so that the subcode values may be translated into failure types.

The floating point field typically contains a floating point number that is associated with the subcode being reported within the alarm message. Thus, in the case where a subcode field indicates that a sensor reading within a particular transducer block is outside of a normal operating range, the floating point field may contain a floating point value representing the actual out of range sensor reading.

As is commonly known, the blocks (i.e., the transducer, resource and function blocks) within Fieldbus devices are capable of providing an alarm notification or reporting parameter BLOCK_ALM and an alarm description or condition parameter BLOCK_ERR. Generally speaking, the BLOCK_ALM parameter enables a Fieldbus device to report via a controller and an operator workstation to a system user or operator that an alarm condition exists within that Fieldbus device. Whereas, the BLOCK_ERR parameter defines which ones of sixteen different possible alarm or alert conditions have been detected by the Fieldbus device that is reporting an active alarm condition via the BLOCK_ALM parameter. As is known, the BLOCK_ERR parameter includes sixteen bits, each of which represents one of sixteen predefined possible alarm or alert conditions that can occur in connection with a particular block of a particular Fieldbus device. The sixteen predefined alarm or alert conditions include a device needs maintenance soon condition, a device needs maintenance now condition, an input failure condition, an output failure condition, a memory failure condition, a lost static data condition, an other condition, etc. In addition to the sixteen predetermined detectable alert or alarm conditions, some Fieldbus device manufacturers provide Fieldbus devices that include diagnostics to detect other conditions. For example, a Fieldbus device may detect plugged valve lines or a valve drive failure, may provide a travel alarm, etc. and may report these other types of conditions by setting the "other" bit of the BLOCK_ERR parameter and reporting the other condition via the BLOCK_ALM parameter. Alternatively or additionally, some Fieldbus device manufacturers may report these other types of conditions (i.e., those conditions that are not one of the sixteen predefined conditions) using vendor specific alarms and/or parameters, which may vary significantly between device manufacturers.

Unfortunately, the sixteen predefined Fieldbus alarm or alert conditions are grouped together under the BLOCK_ERR parameter and any one active condition (i.e., an alert or alarm condition that has been detected by the device) will cause the BLOCK_ALM parameter to report that the device has an active alarm or alert. Thus, if a first alarm or alert condition becomes active within a traditional Fieldbus device, the BLOCK_ALM parameter reports that first alarm or alert and alarm or alert conditions that become active following that first alarm are not reported until the first reported alarm or alert is cleared or acknowledged. As a result, a relatively low priority alarm or alert condition may mask the reporting of a more serious condition until the system user or operator clears or acknowledges the first reported, lower priority condition. By way of example, a block within a Fieldbus device may detect and report a "device needs maintenance soon" condition using the BLOCK_ERR and BLOCK_ALM parameters. If the device subsequently detects "a device needs maintenance now" condition, that subsequently detected condition may be reflected (i.e., by setting the appropriate bit) within the BLOCK_ERR parameter. However, the BLOCK_ALM parameter will not be able to report the more serious "device needs maintenance now" condition until the alarm or alert reported in connection with the "device needs maintenance soon" condition is cleared or otherwise acknowledged by the system user.

Additionally, the monitoring, processing and reporting of smart field device alarms or alerts in a consistent manner is further complicated when multiple types of smart field devices are integrated within a single process control system. For example, devices conforming to the HART protocol (i.e., HART devices) are often used in conjunction with Fieldbus devices to carry out a process.

All HART devices are configured (according to the HART protocol) to report device status using eight standard conditions. Unfortunately, the eight standard status conditions defined by the HART protocol and provided by HART compatible devices are typically not consistent with the status conditions provided by Fieldbus compatible devices. As a result, reporting, organizing and managing alarm or alert information received from combinations of Fieldbus and HART devices in a consistent manner is very complicated, if not impossible. Furthermore, as is well known, HART devices also typically include one or more non-standard or device specific status conditions that are defined by the device manufacturer. These non-standard status conditions may vary between device types and manufacturers so that a particular type of device produced by different manufacturers or different types of devices produced by a single manufacturer may provide different sets of device specific status conditions. In any case, these non-standard HART device status conditions further complicate the integrated monitoring, processing, display and management of HART device status and Fieldbus device status information.

The non-standard nature of HART device status conditions and alarms or alerts combined with the numerous types of alarm or alert conditions that can be reported by Fieldbus devices, which are typically different from the conditions that are reported by HART devices, has complicated the integration of device alerts or alarms with the business systems that are typically used by a business enterprise in connection with the operation of one or more process control plants. More specifically, communicating device alert or alarm information to business systems to enable the business systems to respond in an appropriate manner is complicated by the fact that the business systems are not typically adapted to process alert or alarm information directly (e.g., Fieldbus alerts, HART alerts, etc.), much less the wide variety of alert or alarm information, which may be communicated using a variety of data formats, that are often used by the devices within a typical process control plant.

While a typical process control system has many process control and instrumentation devices, such as valves, transmitters, sensors, etc. connected to one or more process controllers which execute software that controls these devices during the operation of the process, there are many other supporting devices which are also necessary for or related to process operation. These additional devices include, for example, power supply equipment, power generation and distribution equipment, rotating equipment such as turbines, etc., which are located at numerous places in a typical plant. While this additional equipment does not necessarily create or use process variables and, in many instances, is not controlled or even coupled to a process controller for the purpose of affecting the process operation, this equipment is nevertheless important to and ultimately necessary for proper operation of the process. In the past however, process controllers were not necessarily aware of these other devices or the process controllers simply assumed that these devices were operating properly when performing process control.

Still further, many process plants have other computers associated therewith which execute applications related to business functions or maintenance functions. For example, some plants include computers which execute applications associated with ordering raw materials, replacement parts or devices for the plant, applications related to forecasting sales and production needs, etc. Likewise, many process plants, and especially those which use smart field devices, include applications which are used to help monitor and maintain the devices within the plant regardless of whether these devices are process control and instrumentation devices or are other types of devices. For example, the Asset Management Solutions (AMS) application sold by Fisher-Rosemount Systems, Inc. enables communication with and stores data pertaining to field devices to ascertain and track the operating state of the field devices. An example of such a system is disclosed in U.S. Pat. No. 5,960,214 entitled "Integrated Communication Network for use in a Field Device Management System." In some instances, the AMS application may be used to communicate with devices to change parameters within the device, to cause the device to ran applications on itself, such as self calibration routines or self diagnostic routines, to obtain information about the status or health of the device, etc. This information may be stored and used by a maintenance person to monitor and maintain these devices. Likewise, there are other types of applications which are used to monitor other types of devices, such as rotating equipment and power generation and supply devices. These other applications are typically available to the maintenance persons and are used to monitor and maintain the devices within a process plant. In many cases, however, outside service organizations may perform services related to monitoring process performance and equipment. In these cases, the outside service organizations acquire the data they need, run typically proprietary applications to analyze the data and merely provide results and recommendations to the process plant personnel. While helpful, the plant personnel have little or no ability to view the raw data measured or to use the analysis data in any other manner.

As is well known, business systems are typically used to monitor, control and/or manage the operation of one or more process control systems that may be distributed throughout a process control plant or a business enterprise. These business systems generally include enterprise asset management systems, abnormal situation management systems, etc. that may be implemented using any desired platforms such as, for example, workstations, web servers, cellular or other wireless communication devices such as, for example, personal data assistants (PDAs), phones, pagers, etc. More particularly, these business systems may include order processing systems, accounting systems, product shipping and administration systems, production and inventory control systems (e.g., materials resources planning tools), quality assurance systems, computerized maintenance management systems, procurement systems, material and energy control systems, production scheduling systems, etc.

Computerized maintenance management systems (CMMSs) are one particularly important and well known type of business system that may be used to notify plant personnel of a pending maintenance activity or need. These known CMMSs typically generate work orders requesting repair or replacement of failed or otherwise non-functional devices in response to device alerts or status conditions that are indicative of device failures only if that CMMS package has a direct connection to that failure information. Thus, these known CMMSs are not typically able to request replacement or other preventative maintenance of devices based on detection or prediction of an impending device failure. As a result, many CMMSs may only generate work orders requesting repair or replacement of a device in response to device alerts or alarms that indicate that a device has already failed. Unfortunately, repair or replacement of a failed device typically requires an unexpected, potentially dangerous and relatively costly stoppage or shut down of a process control system or plant.

To reduce the number of unexpected device failures and plant stoppages, many CMMSs provide preventative maintenance scheduling functions that use a calendar or time-based approach to replacing, repairing or otherwise performing preventative maintenance on devices throughout a process control plant, particularly those devices that are critical or essential to operation of the plant. In this manner, the operation of a process control plant or process control system may be stopped or shut down at scheduled times that minimize costs and maximize safety. However, the preventative maintenance scheduling functions used by known CMMSs are not typically based on actual device conditions and, thus, are not predictive in nature. Consequently, if devices do not perform as expected (e.g., fail prematurely), the time-based preventative maintenance functions will fail to avert unexpected device failures and plant stoppages or shut downs.

In the typical plant or process, the functions associated with the process control activities, the device and equipment maintenance and monitoring activities, and the business activities are separated, both in the location in which these activities take place and in the personnel who typically perform these activities. Furthermore, the different people involved in these different functions generally use different tools, such as different applications run on different computers to perform the different functions. In many instances, these different tools collect or use different types of data associated with or collected from the different devices within the process and are set up differently to collect the data they need. For example, process control operators who generally oversee the day to day operation of the process and who are primarily responsible for assuring the quality and continuity of the process operation typically affect the process by setting and changing set points within the process, tuning loops of the process, scheduling process operations such as batch operations, etc. These process control operators may use available tools for diagnosing and correcting process control problems within a process control system, including, for example, autotuners, loop analyzers, neural network systems, etc. Process control operators also receive process variable information from the process via one or more process controllers which provide information to the operators about the operation of the process, including alarms generated within the process. This information may be provided to the process control operator via a standard user interface.

Still further, it is currently known to provide an expert engine that uses process control variables and limited information about the operating condition of the control routines or function blocks or modules associated with process control routines to detect poorly operating loops and to provide information to an operator about suggested courses of action to correct the problem. Such an expert engine is disclosed in U.S. patent application Ser. No. 09/256,585 entitled "Diagnostics in a Process Control System," which was filed on Feb. 22, 1999 and in U.S. patent application Ser. No. 09/499,445 entitled "Diagnostic Expert in a Process Control System," which was filed on Feb. 7, 2000, both of which are hereby expressly incorporated by reference herein. Likewise, it is known to run control optimizers, such as real time optimizers, within a plant to optimize the control activities of the process plant. Such optimizers typically use complex models of the plant to predict how inputs may be changed to optimize operation of the plant with respect to some desired optimization variable such as, for example, profit.

On the other hand, maintenance personnel who are primarily responsible for assuring that the actual equipment within the process is operating efficiently and for repairing and replacing malfunctioning equipment, use tools such as maintenance interfaces, the AMS application discussed above, as well and many other diagnostic tools which provide information about operating states of the devices within the process. Maintenance persons also schedule maintenance activities which may require shut down of portions of the plant. For many newer types of process devices and equipment, generally called smart field devices, the devices themselves may include detection and diagnostic tools which automatically sense problems with the operation of the device and automatically report these problems to a maintenance person via a standard maintenance interface. For example, the AMS software reports device status and diagnostic information to the maintenance person and provides communication and other tools that enable the maintenance person to determine what is happening in devices and to access device information provided by devices. Typically, maintenance interfaces and maintenance personnel are located apart from process control operators, although this is not always the case. For example, in some process plants, process control operators may perform the duties of maintenance persons or vice versa, or the different people responsible for these functions may use the same interface.

Still further, persons responsible and applications used for business applications, such as ordering parts, supplies, raw materials, etc., making strategic business decisions such as choosing which products to manufacture, what variables to optimize within the plant, etc. are typically located in offices of the plant that are remote from both the process control interfaces and the maintenance interfaces. Likewise, managers or other persons may want to have access to certain information within the process plant from remote locations or from other computer systems associated with the process plant for use in overseeing the plant operation and in making long term strategic decisions.

Still further, in many cases, some of the tasks, such as monitoring equipment, testing the operation of devices, determining if the plant is running in an optimal manner, etc. are performed by outside consultants or service companies who measure the data needed, perform an analysis and then provide only the results of the analysis back to the plant personnel. In these cases, the data is typically collected and stored in a proprietary manner and is rarely made available to the plant personnel for other reasons.

Because, for the most part, very different applications used to perform the different functions within a plant, e.g., process control operations, maintenance operations and business operations are separated, the different applications used for these different tasks are not integrated and, thus, do not share data or information. In fact, many plants only include some, but not all, of these different types of applications. Furthermore, even if all of the applications are located within a plant, because different personnel use these different applications and analysis tools and because these tools are generally located at different hardware locations within the plant, there is little if any flow of information from one functional area of the plant to another, even when this information may be useful to other functions within the plant. For example, a tool, such as a rotating equipment data analysis tool, may be used by a maintenance person to detect a poorly functioning power generator or piece of rotating equipment (based on non-process variable type data). This tool may detect a problem and alert the maintenance person that the device needs to be calibrated, repaired or replaced. However, the process control operator (either a human or a software expert) does not have the benefit of this information, even though the poorly operating device may be causing a problem that is affecting a loop or some other component which is being monitored by the process control operation. Likewise, the business person is not aware of this fact, even though the malfunctioning device may be critical to and may be preventing optimization of the plant in a manner that the business person may desire. Because the process control expert is unaware of a device problem which may be ultimately causing poor performance of a loop or unit in the process control system and because the process control operator or expert assumes that this equipment is operating perfectly, the process control expert may misdiagnose the problem it detects within the process control loop or may try to apply a tool, such as a loop tuner, which could never actually correct the problem. Likewise, the business person may make a business decision to run the plant in a manner that will not achieve the desired business effects (such as optimizing profits) because of the malfunctioning device.

Due to the abundance of data analysis and other detection and diagnostic tools available in the process control environment, there is a lot of information about the health and performance of devices available to the maintenance person which could be helpful to the process operator and the business persons. Similarly, there is a lot of information available to the process operator about the current operational status of the process control loops and other routines which may be helpful to the maintenance person or to the business person. Likewise, there is information generated by or used in the course of performing the business functions which could be helpful to the maintenance person or the process control operator in optimizing the operation of the process. However, in the past, because these functions were separated, the information generated or collected in one functional area was not used at all, or not used very well in other functional areas which led to an overall sub-optimal use of the assets within process plants.

SUMMARY

The integrated priority generation and technique described herein enables operational information associated with various process entities in a process plant to be mapped into a plurality of common status conditions. Because the operational information from the various process entities is converted to the common status conditions, the relative importance of the operational information can be more readily ascertained. A mapping system receives operational information associated with a process entity in a process plant. For example, the mapping system may receive operational information associated with field devices, process control software, hardware devices (e.g., process controllers, input/output devices, operator workstations, etc), monitoring and/or diagnostic systems, etc. The mapping system may then map the operational status condition into one of a plurality of status conditions. The corresponding status condition may be based on the operational status information as well as additional factors (e.g., the location of the process entity or the section of the process plant in which the process entity is located, the rate at which a field device, process control software module, etc. is generating alerts, alarms, status conditions, etc., the type of a field device, etc.). Then, an alert message associated with the process entity may be generated, where the alert message is indicative of the one status condition of the plurality of status conditions.

BRIEF DESCRIPTION OF THE DRAWINGS

FIG. 9 is an exemplary table that illustrates one manner in which indexes may be generated for different levels of a system hierarchy;

FIG. 11 is an exemplary table that illustrates one manner in which index values may be used to calculate a new index value as a weighted average of the index values;

FIG. 12 is an exemplary table that illustrates one manner in which a variability index may be calculated for a unit;

DETAILED DESCRIPTION

Figure 1:
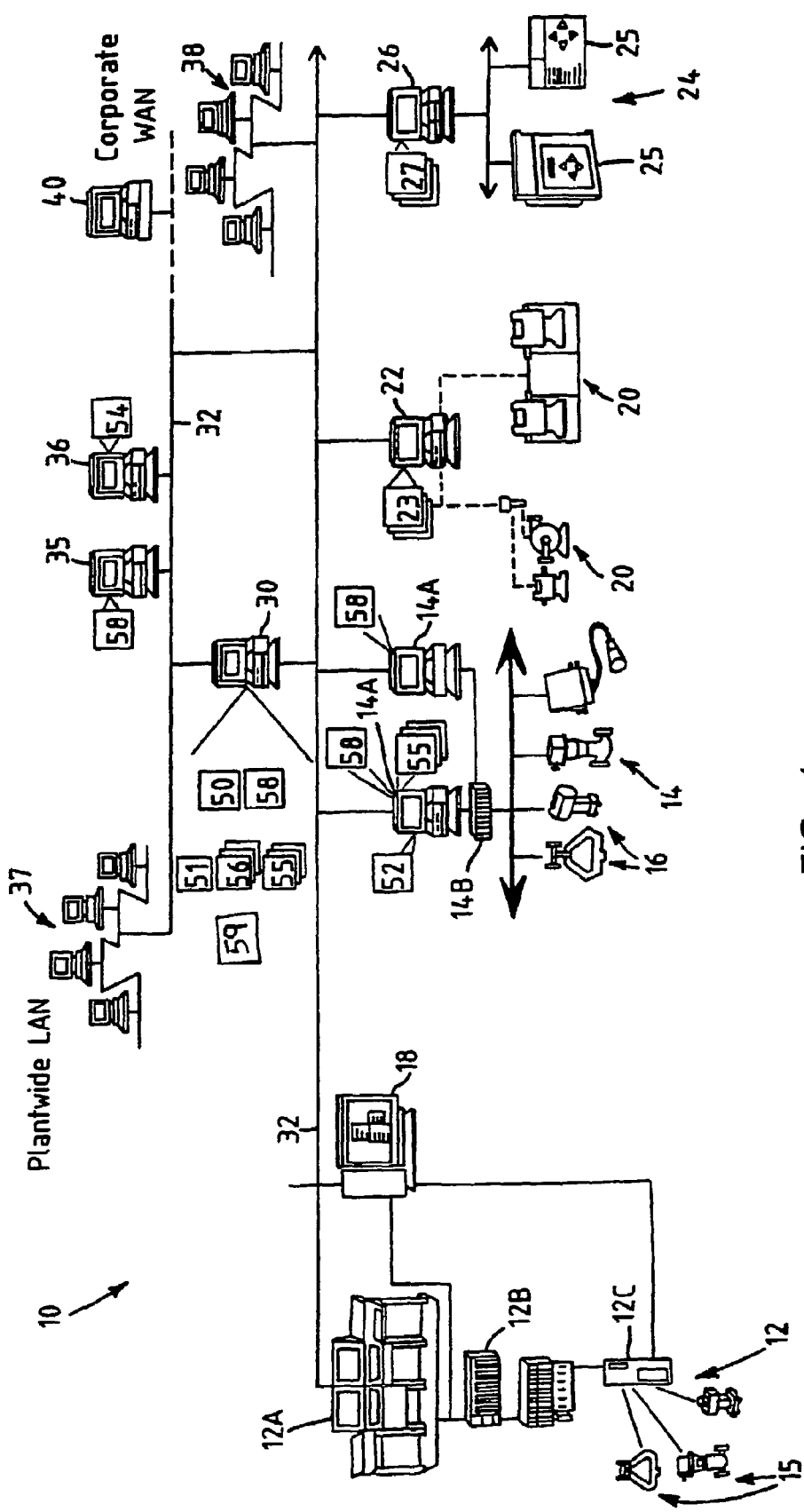
FIG. 1 is a block diagram of a process control plant having numerous equipment and process monitoring devices configured to receive and send data to one or more data collection and distribution stations, which may send this data to viewing and diagnostic routines that use the collected data to provide numerous benefits in the process control plant.

Referring now to FIG. 1, a typical process control plant 10 includes a number of business and other computer systems interconnected with a number of control and maintenance systems by one or more communication networks. The illustrated process control plant 10 also includes one or more process control systems 12 and 14. The process control system 12 may be a traditional process control system such as a PROVOX or RS3 system or any other DCS. The system 12 illustrated in FIG. 1 includes an operator interface 12A coupled to a controller 12B and to input/output (I/O) cards 12C which, in turn, are coupled to various field devices such as analog and Highway Addressable Remote Transmitter (HART) field devices 15. The process control system 14, which may be a distributed process control system, includes one or more operator interfaces 14A coupled to one or more distributed controllers 14B via a bus, such as an Ethernet bus. The controllers 14B may be, for example, DeltaV™ controllers sold by Fisher Rosemount Systems, Inc. of Austin, Tex. or any other desired type of controllers. The controllers 14B are connected via I/O devices to one or more field devices 16, such as for example, HART or Fieldbus field devices or any other smart or non smart field devices including, for example, those that use any of the PROFIBUS®, WORLDFIP®, Device Net®, AS Interface and CAN protocols. As is known, the field devices 16 may provide analog or digital information to the controllers 14B related to process variables as well as to other device information. The operator interfaces 14A may store and execute tools available to the process control operator for controlling the operation of the process including, for example, control optimizers, diagnostic experts, neural networks, tuners, etc.

Still further, maintenance systems, such as computers executing the AMS application or any other device or equipment monitoring and communication applications may be connected to the process control systems 12 and 14 or to the individual devices therein to perform maintenance and monitoring activities. For example, a maintenance computer 18 may be connected to the controller 12B and/or to the devices 15 via any desired communication lines or networks (including wireless or handheld device networks) to communicate with and, in some instances, reconfigure or perform other maintenance activities on the devices 15. Similarly, maintenance applications such as the AMS application may be installed in and executed by one or more of the user interfaces 14A associated with the distributed process control system 14 to perform maintenance and monitoring functions, including data collection related to the operating status of the devices 16.

The illustrated process control plant 10 also includes various rotating equipment 20, such as turbines, motors, etc. which are connected to a maintenance computer 22 via some permanent or temporary communication link (such as a bus, a wireless communication system or hand held devices which are connected to the equipment 20 to take readings and are then removed). The maintenance computer 22 may store and execute known monitoring and diagnostic applications 23 provided by, for example, CSI Systems or other any other known applications used to diagnose, monitor and optimize the operating state of the rotating equipment 20. Maintenance personnel usually use the applications 23 to maintain and oversee the performance of rotating equipment 20 in the plant 10, to determine problems with the rotating equipment 20 and to determine when and if the rotating equipment 20 must be repaired or replaced. In some cases, outside consultants or service organizations may temporary acquire or measure data pertaining to the equipment 20 and use this data to perform analyses for the equipment 20 to detect problems, poor performance or other issues effecting the equipment 20. In these cases, the computers running the analyses may not be connected to the rest of the system 10 via any communication line or may be connected only temporarily.

Similarly, a power generation and distribution system 24 having power generating and distribution equipment 25 associated with the plant 10 is connected via, for example, a bus, to another computer 26 which runs and oversees the operation of the power generating and distribution equipment 25 within the plant 10. The computer 26 may execute known power control and diagnostics applications 27 such a as those provided by, for example, Liebert and ASCO or other service companies to control and maintain the power generation and distribution equipment 25. Again, in many cases, outside consultants or service organizations may temporary acquire or measure data pertaining to the equipment 25 and use this data to perform analyses for the equipment 25 to detect problems, poor performance or other issues effecting the equipment 25. In these cases, the computers (such as the computer 26) running the analyses may not be connected to the rest of the system 10 via any communication line or may be connected only temporarily.

Of course, any other equipment and process control devices could be attached to or be part of the plant 10 and the system described herein is not limited to the equipment specifically illustrated in FIG. 1 but can, instead or in addition, include any other types of process control equipment or devices.

In the past, the various process control systems 12 and 14 and the power generating and maintenance systems 22 and 26 have not been interconnected with each other in a manner that enables them to share data generated in or collected by each of these systems in a useful manner. As a result, each of the different functions such as the process control functions, power generation functions and rotating equipment functions have operated on the assumption that the other equipment within the plant which may be affected by or have an affect on that particular function is operating perfectly which, of course, is almost never the case. However, because the functions are so different and the equipment and personnel used to oversee these functions are different, there has been little or no meaningful data sharing between the different functional systems within the plant 10.

To overcome this problem, a data collection and distribution system is provided to acquire data from the disparate sources of data, format this data to a common data format or structure and then provide this data, as needed to any of a suite of applications run at, for example, a computer system 30, or disbursed between workstations throughout the process control network. The suite of applications is provided to fuse or integrate the use of data from previously disparate and separate systems to provide a better measurement, viewing, control and understanding of the entire plant 10. As illustrated in FIG. 1, the computer system 30 is communicatively connected to the computers or interfaces associated with the various functional systems within the plant 10, including the process control functions 12 and 14, the maintenance functions such as those implemented in the computers 18, 14A, 22 and 26 and the business functions such as performing process performance monitoring. In particular, the computer system 30 is communicatively connected to the traditional process control system 12 and to the maintenance interface 18 associated with that control system, is connected to the process control and/or maintenance interfaces 14A of the distributed process control system 14, is connected to the rotating equipment maintenance computer 22 and to the power generation and distribution computer 26, all via a bus 32. The bus 32 may use any desired or appropriate local area network (LAN) or wide area network (WAN) protocol to provide communications. Of course the computer system 30 could be connected to these different parts of the plant 10 via other communication links including fixed or intermittent links, hard wired or over the air links or any physical medium such as one of wired, wireless, coaxial cable, telephone modem, fiber optic, optical, meteor burst, satellite medium using one of a Fieldbus, IEEE 802.3, blue tooth, X.25 or X.400 communication protocol, etc.

As illustrated in FIG. 1, the computer 30 may also be connected via the same or a different network bus 32 to business system computers and maintenance planning computers 35 and 36, which may execute, for example, enterprise resource planning (ERP), material resource planning (MRP), process modeling for performance modeling, accounting, production and customer ordering systems, maintenance planning systems or any other desired business applications such as parts, supplies and raw materials ordering applications, production scheduling applications, etc. The computer 30 may also be connected via, for example, the bus 32, to a plantwide LAN 37, a corporate WAN 38 as well as to a computer system 40 that enables remote monitoring of or communication with the plant 10 from remote locations.

The data collection and distribution system mentioned above may also be provided in the computer 30 or may be dispersed at numerous locations throughout the process network 10 to acquire and process data from any source of data such as the controller systems 12 and 14, the monitoring systems 22 and 26, the financial systems 35, 36, etc. If the data collection and distribution system is located in the computer 30, it may receive data from the disparate sources of data, such as the controllers, equipment monitoring and financial applications separately using different data formats, or using a common format. In one embodiment, the communications over the bus 32 occur using the XML protocol. Here, data from each of the computers 12A, 18, 14A, 22, 26, 35, 36, etc. is wrapped in an XML wrapper and is sent to an XML data server which may be located in, for example, the computer 30. Because XML is a descriptive language, the server can process any type of data. At the server, if necessary, the data is encapsulated and mapped to a new XML wrapper, i.e., this data is mapped from one XML schema to one or more other XML schemas which are created for each of the receiving applications. One method of providing this communication is described in co pending U.S. patent application Ser. No. 09/902,201 filed Jul. 10, 2001, entitled "Transactional Data Communications for Process Control System," which is hereby expressly incorporated by reference herein. With this system, each data originator can wrap its data using a schema understood or convenient for that device or application, and each receiving application can receive the data in a different schema used for or understood by the receiving application. The server is configured to map one schema to another schema depending on the source and destination(s) of the data. If desired, the server may also perform certain data processing functions or other functions based on the receipt of data. The mapping and processing function rules are set up and stored in the server prior to operation of suite of data integration applications described herein. In this manner, data may be sent from any one application to one or more other applications.

In another embodiment, the data collection and distribution applications may be dispersed throughout the network 10 and collection of data may be accomplished at distributed locations. The collected data may then be converted to a common format at the distributed locations and sent to one or more central databases for subsequent distribution. Thus, generally speaking, one or more data collection routines are provided to collect the data from disparate sources of data and to provide this data in a common or consistent format to the suite of applications which may use this data, such as the applications within the computer 30. The data collection and distribution applications are referred to herein as a data collection and distribution system while the applications which use the collected data (e.g. that integrate this data) are referred to herein collectively as an asset utilization suite 50.

The applications within the asset utilization suite 50 use the collected data and other information generated by the process control systems 12 and 14, the maintenance systems 18, 22 and 26 and the business and process modeling systems 35 and 36 as well as information generated by data analysis tools executed in each of these systems. Generally speaking, the asset utilization suite 50 may include one or more user display applications such as those disclosed in U.S. patent application Ser. Nos. 09/256,585 or 09/499,445, and one or more diagnostic experts or other type of expert system applications based on, for example, the OZ expert system currently provided by NEXUS. However, the asset utilization suite 50 may use any other desired type of expert system including, for example, any type of data mining system. The asset utilization suite 50 may also include other applications which integrate data from various functional systems for any other purpose, such as for user information purposes, for diagnostic purposes and for taking actions within the process plant, such as process control actions, equipment replacement or repair actions, altering the type or amount of product produced based on financial factors, process performance factors, etc.

For instance, the asset utilization suite 50 may include an asset utilization expert 59 that collects data and other information generated by the process control systems 12 and 14, the maintenance systems 18, 22, and 26, and the business systems 35 and 36 as well as information generated by data analysis tools executed in each of these systems. The asset utilization expert 59 may be based on, for example, the OZ expert system currently provided by NEXUS. However, the asset utilization expert 59 may be any other desired type of expert system including, for example, any type of data mining system. Importantly, the asset utilization expert 59 operates as a data and information clearinghouse in the process plant 10 and is able to coordinate the distribution of data or information from one functional area, such as the maintenance area, to other functional areas, such as the process control or the business functional areas. The asset utilization expert 59 may also use the collected data to generate new information or data which can be distributed to one or more of the computer systems associated with the different functions within the plant 10. Still further, the asset utilization expert 59 may execute or oversee the execution of other applications that use the collected data to generate new types of data to be used within the process plant 10. The asset utilization expert 59 may also be implemented as part of the data collection and distribution system.

Thus, the data collection and distribution system may, in one sense, operate as a data and information clearinghouse in the process plant 10 to coordinate the distribution of data or information from one functional area, such as the maintenance area, to other functional areas, such as the process control or the business functional areas. As a result, the asset utilization suite 50 may use the collected data to generate new information or data which can be distributed to one or more of the computer systems associated with the different functions within the plant 10 and may execute or oversee the execution of other applications that use the collected data to generate new types of data to be used within the process control plant 10.

In one case, the asset utilization suite 50 may provide a number of applications which use data from the process control functions and the equipment monitoring functions and, if desired, from process performance monitoring functions performed within a process control network. These applications may provide a coordinated user display for display of information or attributes about the plant that use two or more of process control data, process performance modeling data, or equipment monitoring data. An application associated with the asset utilization suite 50 may also diagnose conditions or problems within the process control plant 10 based on data from two or more of process control monitoring applications, process performance monitoring applications, and equipment monitoring applications. Still further, the applications associated with the asset utilization suite 50 may take actions within the process plant 10 in response to a diagnosed or detected problem or may recommend actions to be taken to a user, which may be any of, for example, a process control operator, a maintenance technician or a business person in the "front office" of the plant 10 who is responsible for the overall operation of the plant 10.

More particularly, in one embodiment, the asset utilization suite 50 may include or execute index generation software 51 that collects or creates indexes associated with devices, like process control and instrumentation devices, power generation devices, rotating equipment, units, areas, etc, or that are associated with process control entities, like loops, etc. within the plant 10. These indexes can then be provided to the process control applications to help optimize process control and can be provided to the business software or business applications to provide the business persons more complete or understandable information associated with the operation of the plant 10. In one embodiment, the index generation software 51 may be implemented as part of the asset utilization expert 59.

The asset utilization suite 50 can also provide maintenance data (such as device status information) and business data (such as data associated with scheduled orders, timeframes, etc.) to a control expert 52 associated with, for example, the process control system 14 to help an operator perform control activities such as optimizing control. The control expert 52 may be located in, for example, the user interface 14A or any other computer associated with the control system 14 or within the computer 30 if desired.

If desired, the control expert 52 may be, for example, the control expert described in U.S. patent application Ser. Nos. 09/256,585 and 09/499,445 identified above. However, these control experts may additionally incorporate and use data related to the status of devices or other hardware within the process control plant 10 or of performance data generated using process performance models in the decision making performed by these control experts. In particular, in the past, the software control experts generally only used process variable data and some limited device status data to make decisions or recommendations to the process operator. With the communication provided by or collected by the asset utilization suite 50, especially that related to device status information such as that provided by the computer systems 18, 14A, 22 and 26 and the data analysis tools implemented thereon, the control expert 52 can receive and incorporate device status information such as health, performance, utilization and variability information into its decision making along with process variable information.

Additionally, the asset utilization suite 50 can provide information pertaining to states of devices and the operation of the control activities within the plant 10 to the business systems 35 and 36 where, for example, a work order generation application or program 54 can automatically generate work orders and order parts based on detected problems within the plant 10 or where supplies can be ordered based on work being performed. Similarly, changes in the control system detected by the asset utilization expert 59 may cause the business systems 35 or 36 to run applications that perform scheduling and supply orders using, for example, the program 54. In the same manner, changes in customer orders etc. can be entered into the business systems 35 or 36 and this data can be sent to the asset utilization suite 50 and sent to the control routines or control expert 52 to cause changes in the control to, for example, begin making the newly ordered products or to implement the changes made in the business systems 35 and 36. Of course, if desired, each computer system connected to the bus 32 may have an application therein that functions to obtain the appropriate data from the other applications within the computer and to sending this data to, for example, the asset utilization expert 59.

Additionally, the asset utilization suite 50 can send information to one or more process models used by, for example, optimizers 55 within the plant 10. For example, a process model 56 and a control optimizer 55 can be located in the computer 14A and can run one or more control optimization routines 55A, 55B, etc. Additionally or alternatively, process models 56 and optimizer routines 55 could be stored in and executed by the computer 30 or any other computer, and the data necessary therefore could be sent by the asset utilization expert 59. The results of the models 56 can be input to the asset utilization expert 59 or a control or other expert such as the control expert 52 to perform modeling functions, the purpose of which will be described in more detail herein. Generally speaking, however, the models 56 can be used to determine process unit or area performance that can then be input to the optimizer routines 55 or displayed to a user or used for other purposes. The models 56 may be models such as those created by and sold by MDC Technology located in Teeside, England or may be any other desired types of models. There are, of course, many other applications that can be provided within the plant 10 and that can use the data from the asset utilization expert 59 and the system described herein is not limited to the applications specifically mentioned herein. Overall, however, the asset utilization suite 50 helps to optimize the use of all of the assets within the plant 10 by enabling the sharing of data and coordination of assets between all of the functional areas of the plant 10.

Also, generally speaking, one or more user interface routines 58 can be stored in and executed by one or more of the computers within the plant 10. For example, the computer 30, the user interface 14A, the business system computer 35 or any other computer may run a user interface routine 58. Each user interface routine 58 can receive or subscribe to information from the asset utilization suite 50 and may provide information to the asset utilization suite 50 and either the same or different sets of data maybe sent to each of the user interface routines 58. Any one of the user interface routines 58 can provide different types of information using different screens for different users if so desired. For example, one of the user interface routines 58 may provide a screen or set of screens to a control operator or to a business person to enable that person to set constraints or to choose optimization variables for use in a standard control routine or in a control optimizer routine. The user interface routine 58 may provide a control guidance tool that enables a user to view the process performance and indexes created by the index generation software 51 or process performance models 56 in some coordinated manner. This operator guidance tool may also enable the operator or any other person to obtain information about the states of devices, control loops, units, etc. and to easily see the information related to the problems with these entities, as that information has been detected by other software within the process plant 10. The user interface routine 58 may also provide performance monitoring screens using performance monitoring data provided by or generated by the tools 23 and 27, the maintenance programs such as the AMS application or any other maintenance programs, or as generated by the models in conjunction with the asset utilization suite 50. Of course, the user interface routine 58 may provide any user access to and enable the user to change preferences or other variables used in any or all functional areas of the plant 10.

Figure 2:
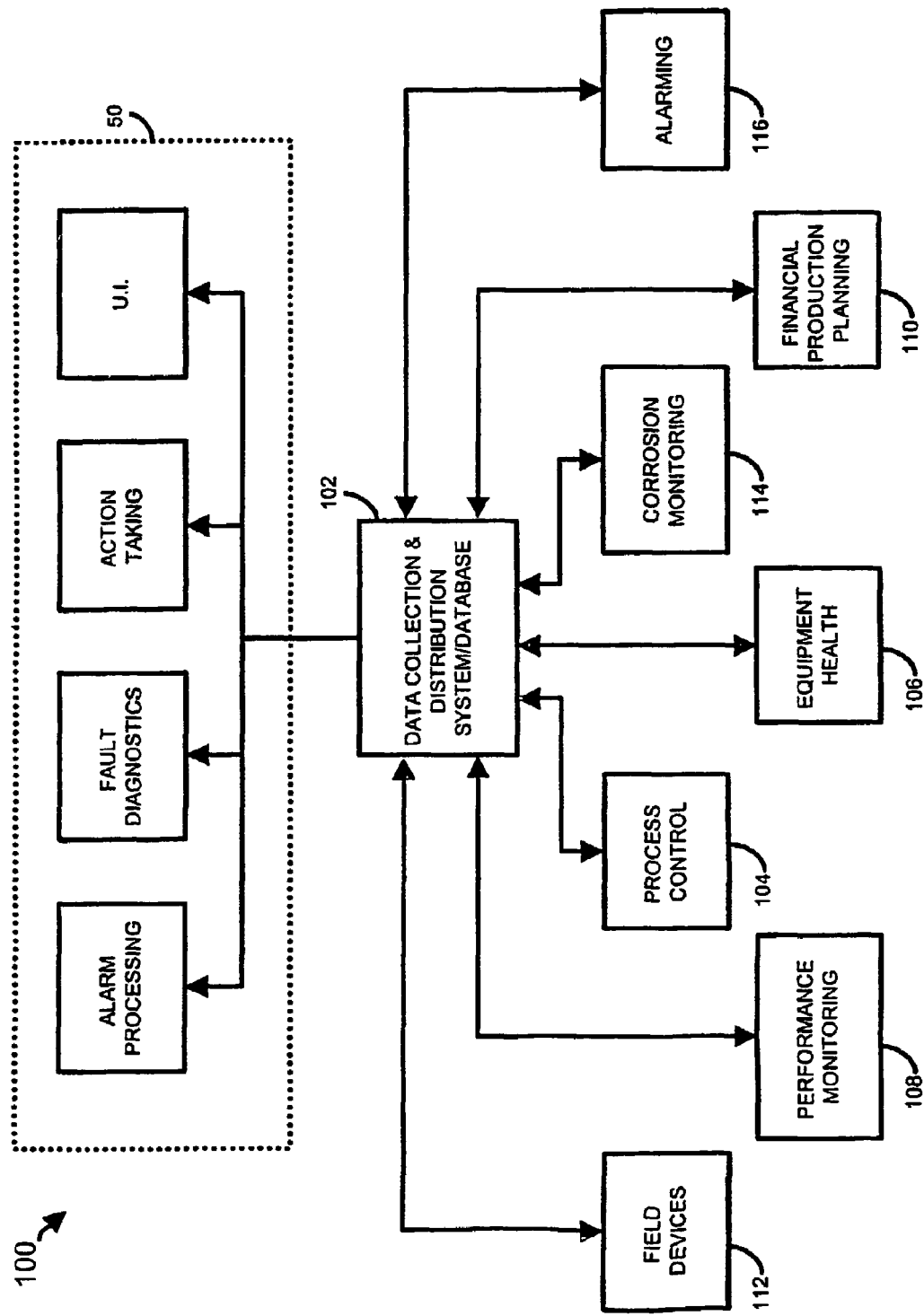
FIG. 2 is a functional diagram illustrating data flow between various data sources and applications which combine this data to perform various functions.

Referring now to FIG. 2, a simplified functional block diagram 100 illustrates data flow and communication associated with or used by a data collection and distribution system 102 described herein to enable data from disparate data sources to be used by the asset utilization suite 50. In particular, the diagram 100 includes the data collection and distribution system 102 which receives data from numerous sources of data. For example, a process control data source 104 (which may include traditional process control activities and applications such as process control and monitoring applications, process control diagnostic applications, process control alarming applications, etc.) provides data to the data collection and distribution system 102. The block 104 may send data acquired by or generated by traditional or stand alone process controllers, by DCSs, by the DeltaV system, by PLCs, etc. within the process control environment.

An equipment or process health data source 106 (which may include traditional equipment monitoring applications, equipment diagnostic applications, equipment alarming applications, abnormal situation analysis applications, environmental monitoring applications, etc.) also sends data to the data collection and distribution system 102. As a result, the source 106 may send data acquired by or generated by any type of traditional equipment monitoring and diagnostic applications or sources, such as those provided by CSI, the AMS application sold by Fisher Rosemount Systems, Inc., Nexis applications, etc.

A performance monitoring data source 108 (which may include performance monitoring applications such optimization applications, process models used to monitor or model process operation, process or equipment health, etc.) also provides data to the system 102. The data source 108 may include or provide data acquired by or generated by any type of performance monitoring equipment or applications. Still further, a financial or production planning data source 110 (which may include applications that perform financial or cost type analysis functions within the process control system, such as deciding how to run the plant to maximize profits, to avoid environmental fines, deciding what or how much of a product to make, etc.) is connected to the system 102. Both the financial planning and the process control applications may utilize information provided by the same or different process models.

Field devices 112, such as smart field devices, may provide still further data to the data collection and distribution system 102. Of course, the data provided by the field devices 112 may be any data measured by or generated by these field devices, including alarms, alerts, measurement data, calibration data, etc. Likewise, a corrosion monitoring data source 114 may provide data collected by or generated by corrosion monitoring services or applications to the collection system 102. Likewise, an alarming data source 116 may provide data collected by or generated by advanced alarming applications or services to the system 102. The alarming data source 116 may include applications or services which measure or take samples, perform lab analyses and generate alarms or other information based on these analyses.

It should be noted that still other data may be provided from any other sources of data in addition or instead of the sources of data illustrated in FIG. 2. Furthermore, the data provided by the data sources of FIG. 2 can be raw measured data, can be data generated by an analysis or other routine based on measured data or some combination of the two. Still further, it will be understood that the data provided from any or all of the data sources of FIG. 2 can be measured, generated or communicated in any format, including proprietary formats used by the different organizations or applications which might measure or generate this data. Thus, for example, different field devices 112 may collect and generate data in different formats and then send this data to the data collection and distribution system 102. Likewise, the financial data sources 110, the corrosion data sources 114, the, alarming data sources 116, etc. may provide data measured in or generated in any standard or proprietary format, and may use any proprietary or open code applications to measure or generate the data. Generally speaking, therefore, any applications or devices now used (or developed in the future for use) in a process control environment to measure or generate data, results, conclusions, recommendations, etc. may act as a data source to the data collection and distribution system 102 even if these data sources are partially or completely proprietary in nature.

The data collection and distribution system 102 will collect the data from the different data sources in a common format or will convert that data, once received, to a common format for storage and use later by other elements, devices or applications in the process control system. In one embodiment, the different data sources may use a data conversion protocol, such as OPC, PI, Fieldbus, etc. to communicate the data to the data collection and distribution system 102. Of course, the OPC or other conversion interface may be stored in the data collection and distribution system 102 or in the data sources themselves. Further, if desired, any of the data sources may convert its data to a common format used by the data collection and distribution system 102 and communicate that converted data to the system 102. Of course, the data collection and distribution system 102 may convert the data sent by the different data sources to any common format or protocol and store and organize that data in a database in any desired manner. The data collection and distribution system 102 may receive the data from the different data sources in a periodic or a periodic manner, continuously, or intermittently, synchronously or asynchronously, or at any desired time.

Once received and converted the data is stored in a database in some accessible manner and is made available to applications or users within the asset management suite 50. For example, applications related to process control, alarming, device maintenance, fault diagnostics, predictive maintenance, financial planning, optimization, etc. may use, combine and integrate the data from one or more of the different data sources to operate better than these applications have been able to operate in the past without data from vastly different or previously inaccessible data sources. The applications illustrated in FIG. 2 as being part of the asset utilization suite 50 may be any of the applications described in FIG. 1 or can be any other types of applications if so desired. Of course, both the data sources and the applications which use the collected data illustrated in FIG. 2 are exemplary in nature and more, less or different data sources and applications may be used. Likewise, the data sources themselves may be configured to receive data collected by the data collection and distributions system 102. In this manner, different vendors or service providers, who may have proprietary applications, may collect certain data that they had not or were incapable of previously acquiring from the data collection and distribution system 102 which may enhance the products or services being offered by these service providers.

In one embodiment, it is expected that traditional process control service providers, who in the past have collected and generated data apart from the process control network using typically proprietary applications, will now provide the collected or generated data to the data collection and distribution system 102 which will then make that data available to other applications. These other applications can be applications executed within computers communicatively connected to the process control environment, such as applications within host devices, user interfaces, controllers, etc. Additionally, these other applications may be applications provided by or used by the traditional service organizations. In this manner, any application can now be designed to use any data generated within the process control system in any manner, whether by applications owned by the process system owners or applications owned and managed by service providers. As a result, there are many, many instances in which applications can be enhanced because they can use data that was previously unavailable to them. For example, a corrosion analysis service provider may be able to use data collected by a proprietary process control system or proprietary equipment monitoring application to enhance the reliability or predictability of the corrosion analysis. Such cross pollination of data from vastly different types of service providers and applications was previously unavailable.

Figure 3:
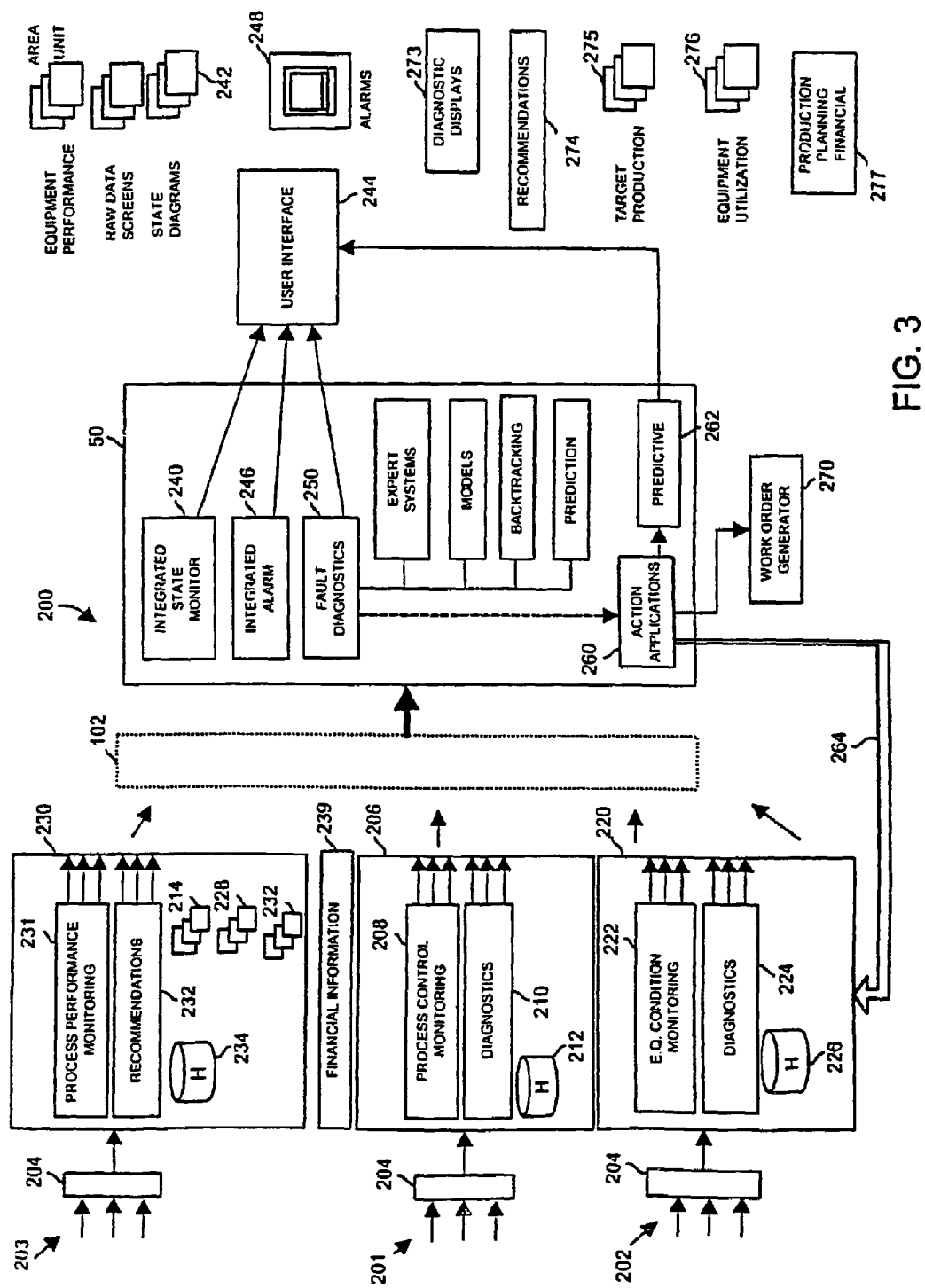
FIG. 3 is a more detailed data flow diagram illustrating the data flow from numerous sources of equipment monitoring, process device monitoring and process performance monitoring data to a data collection and distribution system which then provides this data to an asset utilization and production planning suite that fuses the collected data to create more complete views and/or better diagnostics for a process control plant.

Referring now to FIG. 3, a more detailed data flow diagram 200 illustrating data flow within the process control plant 10 is provided. Beginning at the left side of the diagram 200, data associated with the process plant 10 is collected by or at different functional areas or data sources within the plant 10. In particular, process control data 201 is collected by, for example, typical process control devices such as field devices, input/output devices, handheld or remote transmitters, or any other devices which may be, for example, communicatively connected to process controllers. Likewise equipment monitoring data 202 associated with traditional equipment monitoring activities is collected by, for example, sensors, devices, transmitters, or any other devices within the plant 10. Process performance data 203 may be collected by the same or other devices within the plant 10. If desired, financial data may be collected by other applications run in computers in the process control plant as part of the performance monitoring data In some instances, the collected data may be from applications or sources outside of the traditional process control network, such as applications owned and operated by service organizations or venders. Of course the data collected may be any of, but is not limited to rotating equipment angular position, velocity, acceleration data (as well as transforms of this data to provide power spectral density, frequency amplitude, etc.), equipment stress data, strain data, wall thickness data, corrosion extent and rate of corrosion progress data, corrosivity of process fluids data, lubrication and wear data, bearing and seal data, leakage presence rate and composition of escaping liquids and gasses data including but not limited to data about volatile organic and inorganic compounds, bearing temperature data, acoustic transducer data, process physical and compositional measurement data, etc. This data may be collected in any manner including automatically or manually. Thus, data collectors may include hand held collection devices, laboratory chemical and physical measurements, fixed or temporary on line devices, devices which periodically (e.g., RF) telemeter data from remote process and equipment measurement devices, on line device inputs or remote multiplexers and/or concentrators or any other data collection devices.

The process control data, equipment monitoring data and process performance data may be reconciled, verified, validated and/or formatted by data collection and reconciliation applications 204 (which may be part of the data collection and distribution system 102 of FIG. 2) run within the data collection device or within any other device such as at a central data historian, process controllers, equipment monitoring applications, etc. or any other device which receives or processes this data. Of course, the collected data may be reconciled or massaged in any known or desired manner. For example, the data may be put into a common format or scale, may be converted to different or standard (common) units, may be scanned for outliers, erroneous or incorrect data, may be verified or validated in any known or desired manner, etc. There are many known methods or techniques of performing data reconciliation and method of reconciling, messaging, verifying or collecting data may be used. Still further, the different types of data may be collected by a common collector or data collector routines even though this data may be in different formats, protocols, etc.

After being reconciled in any known or desired manner or, in some cases, not being reconciled at all, the collected data may be provided to one or more applications typically associated with the different functional areas of the process control system 10. For example, as is known, different process controller or control applications 208 illustrated in FIG. 3 as part of the process control function block 206 may use the collected process control data 201 for a number of reasons or purposes. These process control applications may include, for example, traditional DCS, PLC and SCADA systems, computer control systems, hybrid systems and digital control systems of any type now known or developed in the future. Thus, the process controller applications 208, using any known or desired process control software or techniques, use the process control data 201 to monitor and control ongoing process functions. Such applications may perform any type of process control, including for example, PID, fuzzy logic, model predictive, neural network, etc. process control activities. The process control applications 208 may create, generate or pass alarm data or alarm messages to a process operator, may detect problems or concerns or perform audits associated with regulatory agencies, such as environmental protection agency (EPA) constraints, food and drug administration (FDA) constraints, and may perform other known process control functions which are too numerous to list here. Still further, one or more diagnostic applications 210 may use the collected process control data 201 to perform process control diagnostics. Such diagnostic applications may include, for example, applications which help an operator pinpoint problems within process control loops, instruments, actuators, etc., such as that disclosed in U.S. patent application Ser. No. 09/256,585, entitled "Diagnostics in a Process Control System," which was filed Feb. 22, 1999, is assigned to the assignee of the present application, and is hereby expressly incorporated by reference herein. The diagnostic applications 210 may also include expert diagnostic engines such as that disclosed in U.S. patent application Ser. No. 09/499,445, entitled "Diagnostic Expert in a Process Control System," which was filed Feb. 7, 2000, is assigned to the assignee of the present application, and is hereby expressly incorporated by reference herein. Of course, the process diagnostic applications 210 can take the form of any other typical or standard process diagnostic applications and are not limited to these specifically mentioned herein. Still further, the outputs of these diagnostic applications 210 can take any form and may, for example, indicate faulty or poorly performing loops, functions blocks, areas, units, etc. within the process control system, may indicate where loops need to be tuned, etc.

As also indicated in FIG. 3, a process control historian 212 may be used to store previously collected process control data 201, or outputs of the process control monitoring applications 208, the process control diagnostic applications 210 or any other desired process data. Of course, the process control monitoring applications 208 and the diagnostic applications 210 may use the data stored in the historian 212 in any known or desired manner. Still further, the applications 208 and 210 may use process models 214 (which may be part of the models 56 of FIG. 1 and part of a performance monitoring functional area) which may be created to model all or part of the process units or areas within the process 10.

Still further, an equipment monitoring functional block 220 receives the equipment condition data 202 or the reconciled version of such data if reconciliation is performed on that data. The equipment monitoring functional block 220 includes equipment or condition monitoring applications 222 which may, for example, accept or generate alarms indicating problems with various pieces of equipment, detect poorly performing or faulty equipment within the plant 10 or detect other equipment problems or conditions which may be of interest to a maintenance person. Equipment monitoring applications are well known and typically include utilities adapted to the different specific types of equipment within a plant. As such, a detailed discussion of these applications is not necessary. Likewise, equipment diagnostic applications 224 may be implemented to detect and diagnose equipment problems based on raw data measured pertaining to the equipment. Such equipment diagnostic applications 224 may include, for example, vibration sensor applications, rotating equipment applications, power measurement applications, etc. Of course, there are many different types of known equipment condition monitoring and diagnostic applications which can produce many kinds of different types of data associated with the state or operating condition of different pieces of equipment within a process control plant. Still further, a historian 226 may store raw data detected by equipment monitoring devices, may store data generated by the equipment condition monitoring and diagnostic applications 222 and 224 and may provide data to those applications as needed. Likewise, equipment models 228 (which may be part of the models 56 of FIG. 1 and thus part of the performance monitoring functional area) may be provided and used by the equipment condition monitoring and diagnostic applications 222 and 224 in any desired manner. The creation and use of such models is well known in the art and need not be described further herein.

Likewise, a process performance monitoring functional block 230 illustrated in FIG. 3 receives process performance data 203 which may or may not be reconciled, formatted, etc. by the data collector 204. The process monitoring functional block 230 includes process performance monitoring applications 231 which may, for example, use process control models 214, process equipment models 228 or performance models 232 to perform process performance monitoring in any known or desired manner. Another set of applications 233 may use the output of the process performance monitoring to make recommendations to a user or to advise the user how to change process equipment configuration to perform better overall use of the process or to produce a process which operates more efficiently or makes more money. A process performance monitoring historian 234 may store raw data detected by the process performance monitoring devices, may store data generated by the process performance monitoring applications 231 and the recommendation applications 233 and may provide this data to other applications as needed. The creation and use of process models and process performance monitoring applications is known and will not be described further herein.

To overcome the limitation of limited or no access to data from various external sources, the data collection and distribution system 102 is provided to collect data, convert that data if necessary into a common format or protocol that can be accessed and used by applications within the asset utilization suite 50 illustrated in FIG. 3. In this manner, the applications within the asset utilization suite 50 receive the different types of data from the different functional areas or data sources including the process control functional area 206, the equipment monitoring functional area 220 and the performance monitoring functional area 230, and integrates this data in any of a number of ways to the direct benefit of the operation of the plant 10. The goal of the asset utilization suite 50 may be to produce a better view of the plant 10, enable better understanding of the overall condition of the plant 10, and allow better decisions to be made regarding the control or use of the plant 10 or the assets of the plant 10 based on all of the data in the plant and, overall, to run the plant 10 more optimally. The integration of the different types of functional data may provide or enable improved personnel safety, higher process and equipment uptime, avoidance of catastrophic process and/or equipment failures, greater operating availability (uptime) and plant productivity, higher product throughput stemming from higher availability and the ability to safely and securely run faster and closer to design and manufacturing warrantee limits, higher throughput stemming from the ability to operate the process at the environmental limits, and improved quality due to the elimination or minimization of equipment related process and product variations. To the contrary, in the past, the different functional areas, e.g., the process monitoring, the equipment monitoring and the performance monitoring, were performed independently and each tried to "optimize" their associated functional area without regard to the effect that given actions might have on the other functional areas. As a result, for example, a low priority equipment problem may have been causing a large problem in achieving a desired or critical process control performance, but was not being corrected because it was not considered very important in the context of equipment maintenance. With the data collection and distribution system 102 providing data to the asset utilization suite 50, however, persons can have access to a view of the plant 10 based on two or more of equipment monitoring data, process performance data, and process control monitoring data. Similarly, diagnostics performed for the plant 10 may take into account data associated with process operation and the equipment operation and provide a better overall diagnostic analysis. Thus, applications within the asset utilization suite 50 may use the process control, equipment monitoring and process performance data to make better or more complete decisions that, while not being strictly optimal for one functional area, may optimize the overall plant operation in a way that the independent operation of the different functional areas does not allow.

While the data collection and distribution system 102 can be located between the functional data collection or generation sources 206, 220, 230 and 239 and the asset utilization suite, it can also or instead be located elsewhere in the system 10 depending on what the different data sources which are collecting the disparate data are. In fact, the data collection and distribution system 102 can be located anywhere in the flow diagram of FIG. 3 depending on what the data sources are and which sources are already integrated or provide data in a standard or recognizable format. As indicated above, the data collection and distribution system 102 may be located between the asset utilization suite 50 and the functional areas 206, 220, 230 and 239, which will normally be the case. However, the data collection and distribution system 102 may be located in front of any or all of the functional areas 206, 220, 230 or 239 or some combination of these two. Still further, while the data collection and distribution system 102 has been illustrated as being centralized, i.e., in one place, it could be spread out and implemented at multiple places in the system 10. Thus components of this data collection and distribution software could be executed in multiple different devices in order to be able to collect more or better data from disparate data sources. Each of these multiple data collection applications could operate to collect data from one or more sources, depending on the collection needs and placement of these applications and each application could then provide the collected and formatted data to one or more centralized databases within the system from which this data can be accessed by other applications.

Referring again to FIG. 3, the asset utilization suite 50 is illustrated as including a number of applications which use data collected from different functional areas or data sources within the process control plant 10 including, for the sake of illustration, the performance monitoring functional area 230, the process control functional area 206, and the equipment monitoring functional area 220. Of course, the asset utilization suite 50 may receive any of the data from these areas including the raw data, the reconciled data, the data stored in the historians 212, 226 and 234, the data produced by the monitoring applications 208 and 222, the data produced by the performance models 232, and the data produced by the diagnostic applications 210 and 224. If desired, the asset utilization suite 50 may also use the process models 214 and the equipment models 228. It will be understood that while the asset utilization suite 50 is illustrated as including a specific number of applications, the suite 50 could include any number of applications including one or more which perform any one or more of the functions described herein.

In particular, the asset utilization suite 50 illustrated in FIG. 3 may include one or more integrated plant state monitor applications 240. Such plant state monitor applications 240 may include the index generation application 51 of FIG. 1 that creates indexes associated with devices, like process control and instrumentation devices, power generation devices, rotating equipment, units, areas, etc. and/or associated with process control entities, like units, loops, areas, etc. within the plant 10 based on two or more of process control information and device information and performance information. The generation and display of these indexes will be described in more detail later. However, generally speaking these indexes may be based on process control data as well as process performance and equipment monitoring data and may be displayed in a consistent format to a user via an integrated display.

As illustrated in FIG. 3, the asset utilization suite 50 may include or use an integrated display application 244 (which may be any or all of the interface applications 58 of FIG. 1) that displays different data to any user in an integrated or common manner. Generally speaking, the display application 244 is configured to provide different information to any user, wherein the displayed information reflects or is based on two or more of the process control data 201, the equipment monitoring data 202 and the process performance data 203. The application 244 receives inputs from other applications within the suite 50 and may enable a user to view the raw data 201, 202 and 203, may enable a user to go from screen to screen to view different parts or aspects of the plant 10 based on the raw data or processed data, may enable a user to view processed data, such as data generated by the equipment condition, process monitoring or performance monitoring applications 222, 208 and 231 the process models 214, the equipment or process diagnostic applications 224 and 210, or data generated by other applications within the asset utilization suite 50.

The asset utilization suite 50 may also include an integrated alarming application 246 which may receive both process and device alarms and may display these alarms in a consistent format to a user. Such an integrated alarm display application is disclosed in U.S. patent application Ser. No. 09/707,580, entitled "Integrated Alarm Display in a Process Control Network," which was filed Nov. 7, 2000, is assigned to the assignee of this application and which is expressly incorporated by reference herein. The integrated alarm application 246 may produce user displays 248 which provide information on the received alarms, provide an alarm banner integrating the alarms, etc.

The asset utilization suite 50 may also include one or more integrated diagnostic applications 250 which integrate the process control data 201, the process performance data 205 and the equipment condition data 202 to perform diagnostics on a plant wide basis. For example, there are many instances when process equipment data and process control data can be combined to produce a better diagnostic analysis about a condition within the plant 10 than the use of just one of those types of data. Likewise, the output of an equipment condition diagnostic application 224 and the output of a process control diagnostic application 210 can be combined to produce a more complete diagnostic analysis for a process plant than the output of either of the individual applications. The integrated diagnostic applications 250 may include expert engines of any desired types, process and/or equipment models and predictive applications that make predictions about conditions in the plant 10 based on data received or other diagnostic decisions made from other applications. Of course, the integrated diagnostic application 250 may provide a user display via the interface application 244 to indicate different diagnostic analyses. Further, the integrated diagnostic application 250 may enable a user to, configure the application 250 to thereby create specific integrated diagnostic determinations. For example, a user may be presented a configuration screen in which the user selects different diagnostic applications to be performed (including for example, both process diagnostic applications 210 and equipment monitoring applications 224) and may then combine or make other diagnostic decisions based on the outputs of these selected diagnostic applications. In this case, the user may connect the outputs of certain known process and equipment monitoring or diagnostic applications to a new function (which may be, for example, a process performance function) which combines or evaluates these outputs in some way to male a diagnostic determination. Alternatively, a new diagnostic application using both process control data 201 and equipment monitoring data 202 may be created to perform plant diagnostics. In these examples, the diagnostic application 250 may output to a user display via, for example, the user interface application 244.

The fault diagnostic applications 250 may also include a backtracking application that uses both process control data 201 and equipment condition data 202 to determine the source of a detected problem. Backtracking applications which try to locate sources of detected problems based on either process control data or equipment conditioning data exist, but no such backtracking application has been used to pinpoint the problems in a plant based on both process control data and equipment conditioning data. The use of a backtracking application using both process and equipment data may provide a better or more complete answer as to the cause of a problem or condition within the process plant 10 than previous backtracking applications that use only one of process or equipment data. Of course, these backtracking applications integrate process control and equipment monitoring data and, if desired, process performance data to determine a cause of a problem. Such a cause may be a combination of factors that may be weighted differently, a detection of process and equipment conditions that should not exist simultaneously (such as a pump running and a shutoff valve closed), etc. The presentation of these problems may be in terms of probabilities, weighting, predicate condition states, etc. These backtracking or other diagnostic applications may use formal models of the process and equipment, as well as the derivatives of the input and output variables and actual measurements of these variables to compute the total derivative of the output variables with respect to the input variables and evaluate this total derivative using real process measurements to compute the causal contributions of different potential sources. The causal data may also be verified, validated and reconciled with the actual output data from the plant 10 to determine how well the predictions held out.

In any event, one or more other action applications 260 may be provided to take some action with respect to diagnostic decisions made by the integrated diagnostic application 250 or in response to alarms or other conditions. For example, the application 260 may provide a list of potential actions or recommendations to a user via the user interface application 244, or to a predictive application 262 which may predict the result of such recommendations and display such results to a user via the integrated display application 244. These recommendations may, for example, be designed to take actions to correct a problem, to get longer life out of the plant 10, to run the plant 10 more economically or within set financial or EPA constraints, to avoid future problems based on current or predicted process and equipment functionality, etc. The application 260 may also enable the user to run simulations of the plant 10 based on proposed actions to see the simulated effect of these applications prior to implementing the action. The application 260 may take actions to collect more or better data in the act of making a better diagnostic decision. This data collection may entail automatically causing the equipment condition monitoring or the process monitoring applications or the performance monitoring applications to collect more or different types of data.

The application 260 may also, if so configured, automatically take actions within the plant 10, such as resetting set points, tuning loops, reconfiguring equipment, etc. as indicated by the feedback path 264 based on the diagnostic decisions made by the application 250, alarms, etc. These actions may or may not involve using process control applications, equipment monitoring and control applications to implement changes to the system. These actions may also entail reconfiguring the plant 10 to make a different or more of one type of product over another or to otherwise reconfigure the plant 10 to maximize financial gains or effect other concerns. Still further, the application 260 may call other applications, such as an automatic work order generation application 270 (which may be the application 54 of FIG. 1) to order parts needed for equipment, to order raw materials needed to produce new products, etc. Of course, the application 260 may, use integrated alarming, financial constraints or directives or other data to take emergency actions, to perform control to cause automatic or manual changes to be made to the plant 10 to effect directives etc. as necessary.

As will be understood, the user interface 244 can display any or all of a number of different types of user screens based on the application within the suite 50 being executed. Thus, for example, the user interface 244 may display equipment performance screens, raw data screens, sates diagrams 242, etc. The user interface 244 may also display integrated alarm screens 248 produced by the integrated alarm application 246. Similarly, diagnostic displays 273, recommendation screens 274, and screens indicating target production and equipment utilization 275 and 276 may be created by any of the fault diagnostics applications 250. Likewise, production planning and financial screens 277 of any nature may be created by the action taking applications 260. Of course, other types of screens and displays may be created by these and other applications based on data from numerous data sources.

It will be noted that, while FIG. 3 illustrates the process control, the equipment monitoring and diagnostic, and the performance monitoring applications as being separate from the suite of applications 50, these specific applications could be part of or used by the suite of integration applications 50 if so desired. Further, while FIG. 3 illustrates data associated with one embodiment of a plant 10, FIG. 3 is not meant to indicate physical locations of any of the applications within the suite of applications 50. Thus, any and all of the applications and hardware illustrated in FIG. 3 can be located at any desired places within the plant (or even away from the plant 10 if so desired) and these applications need not be located in the same place. Still further, the flow of data between data collectors and the data collection and distribution system 102 as well as between the data collection and distribution system 102 and the applications illustrated in FIG. 3 may occur over any desired network, such as a LAN or WAN, the Internet, any Intranet, etc. Data may be transported in any desired manner using any desired hardware including, for example, any physical medium, any dedicated or shared information transport method including without limit the use of wired, wireless, coaxial cable, telephone modem, fiber optic, optical, meteor burst, satellite, etc. devices. This communication may also use any desired protocol including without limit, Fieldbus, XML, TCP/IP, IEEE 802.3, blue tooth, X.25, X.400, protocols or any other protocol now known or developed in the future.

Moreover, the data may be conditioned or compressed in any stage of being sent to, used by or sent from the integration applications 50. Of course, any known or desired compression may be used including, for example, wavelet signal representation, Fourier, Hadamard, etc. transformation, communication of Fourier etc. coefficients, exception processing, swinging door data compression, etc.

Still farther, the integration applications 50 such as the diagnostic application 250 may use any joint models of process equipment and behavior to make diagnostic or predictive decisions including, for example, formal mathematical models, statistical correlations, Kalman filter based estimators, neural networks, fuzzy logic based models or any combination of these or other models.

In one embodiment, the diagnostic application 250 may enable a user to view the characteristics of the waveforms of process or condition monitoring sensor outputs and trend and/or alarm and/or invoke control changes when these patterns change. This functionality can be implemented by pattern recognition with alarm bounds on the feature set, or by looking at the Fourier components and providing trending and/or alarming and/or control initiation based on limits set on the individual Fourier coefficients or a weighted combination of the Fourier coefficients or some function thereof (e.g. the square, total AC power, the PSD coefficients etc.) In one embodiment, one or more cards, such as input/output (I/O) cards connected to one or more of the process controllers 12 or 14 of FIG. 1 may be provided to collect, convert and process or buffer condition monitoring inputs from process and equipment monitoring activities and thus, these cards may implement part or all of the data collection and distribution system 102. These I/O cards (which may be subassembly processors having data collection routines implemented thereon) may perform data collection activities for some or all of the devices, areas, etc. of the process plant 10 to provide the data needed by the integrated applications within the plant 10. These cards may be configured to collect any or all of the process control data, equipment monitoring data or process performance data from various and multiple and different device types or sources within the process control system. Again, such data sources may include, for example, hand held collection devices, laboratory chemical and physical measurement sources, direct on line input sources and remote sources. Still further, another card, such as an I/O card connected to a controller may be provided to store and implement the one or more of the integrated applications described herein. Thus, while FIG. 1 illustrates the data collection and distribution applications, as well as the integrated applications within the asset utilization suit being implemented in a centralized computer 30, these applications, and the data collection activities for these applications may be implemented in one or more dedicated cards or other devices distributed throughout the process plant 10. These cards or subassembly processors could be connected directly to a user interface and controller via a system bus such as the bus 32 of FIG. 1 or could be part of an input/output system associated with one or more of the controllers, or could be located elsewhere. Of course, one such dedicated card could run all of the integrated applications or any subset thereof depending on the configuration and nature of the process plant 10 in which it is being used. In some cases, some preprocessing of data collected at the controller level may be performed and this preprocessed or partially processed data may then be provided to another device, such as the computer system 30, which may complete the integrated processing. In this manner, the integrated applications 50 may be distributed in nature when implemented within a plant environment.

One method of collecting and integrating data from disparate data sources will now be discussed with reference to FIGS. 4-6. In this example, it will be understood the data collected from disparate sources of data is converted into a format being used by the process control system which is implemented using the DeltaV™ process control system sold by Fisher Rosemount Systems, Inc. As a result, the process control data is not a remote data source. However, other data, such as maintenance data, performance monitoring data, process model data, financial data, etc. is from external data sources. Generally speaking, this system is configured using a configuration system that stores data about and tracks the configuration of the system. In the past, such a configuration system was limited to the placement and interaction of process control devices, software and strategies and, to a limited extent, included maintenance information about certain devices such as field devices. However, because the main focus of the system was to cater to process control operators, the information displayed to the user and tracked by the configuration system was generally limited to process control data. In this known system, a configuration data base stored, and an explorer application displayed information pertaining to the process control devices and the data collected by and generated by these devices.

Generally, in order to enable data from different data sources to be collected and used in a single system, a configuration database or other integrated configuration system is now provided to enable different data sources to provide data to the system for use as a single data source. Such a configuration database is used to collect and store data from other, disparate sources of data and an explorer type display or hierarchy is provided to allow the manipulation, organization and use the collected data to thereby make that data available to different applications.

Figure 4:
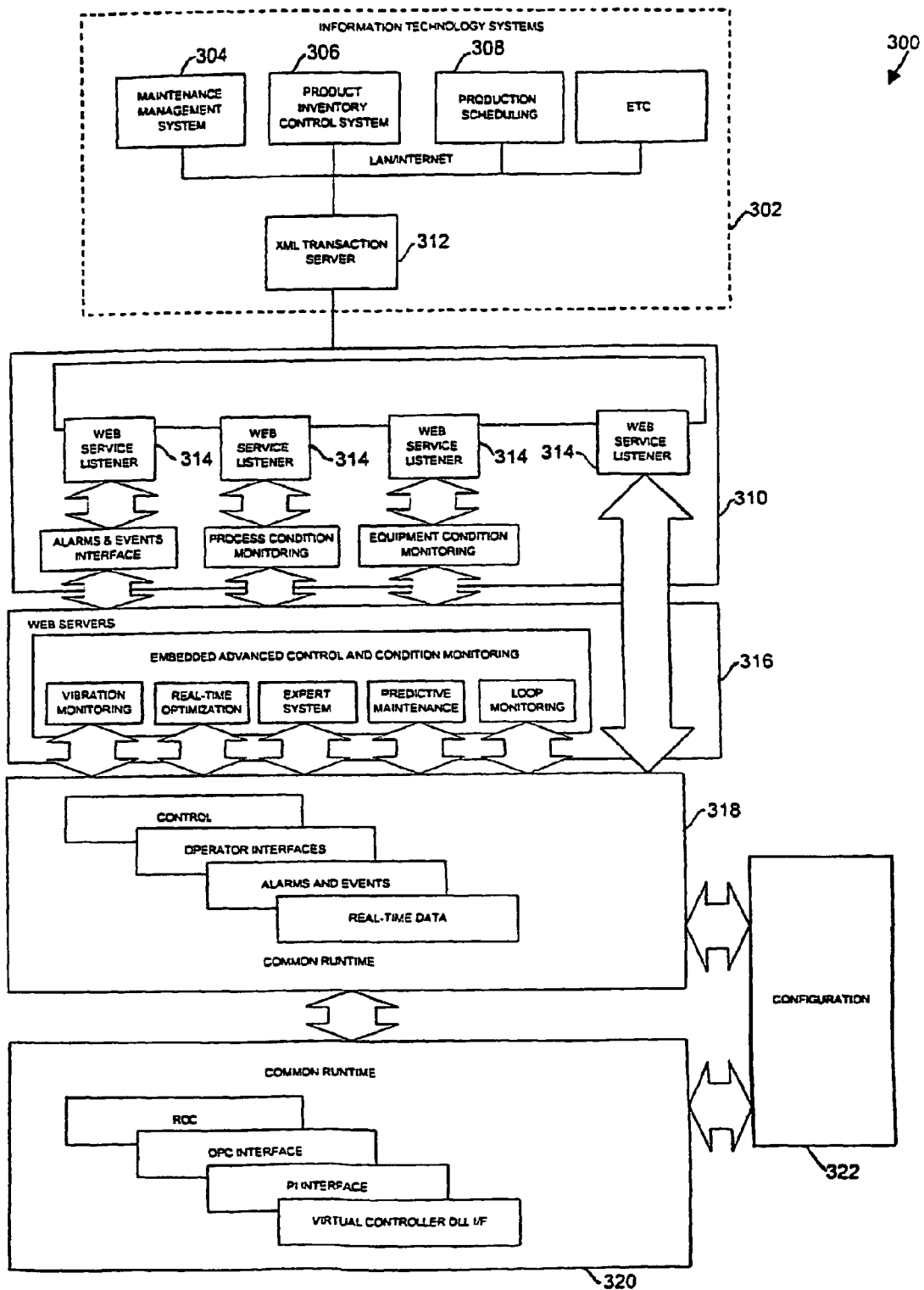
FIG. 4 is a block diagram illustrating an architecture for one embodiment of a process control environment that implements a data collection and distribution system associated with multiple disparate data sources.

FIG. 4 illustrates an architectural overview of a system 300 which implements the collection of data from disparate data sources with a process control system. Generally, the system 300 includes an information technology systems (ITS) section 302 which may include a maintenance management system 304, a product inventory control system 306, a production scheduling system 308, as well as other systems connected by a LAN, the Internet, etc. The ITS 302 is connected to a web services section 310 via an XML transaction server 312. The server 312 sends XML wrapped data to the web services 310 indicative of the data used by or generated by the blocks 304, 306, and 308.

The web services 310 includes a series of web service listeners 314 which listen for or which subscribe to certain data from other data sources and provide this data to the subscribing applications. The subscribing applications may be associated with the applications within the ITS 302 or a process control system. The web listening services (which may be part of the data collection and distribution system 102) may listen for and redistribute alarms and events data, process condition monitoring data and equipment condition monitoring data. Interfaces for this data are used to convert the data to a standard format or protocol, such as the Fieldbus or DeltaV protocol or to XML as desired.

The web services 310 are in contact with and receive data from other external data sources via web servers 316. These external sources may include vibration monitoring data sources, real time optimization data sources, expert system analysis data sources, predictive maintenance data sources, loop monitoring data sources or other data sources. Of course, each source maybe connected via a different external server or the two or more of the data sources may share servers where possible. Likewise, these data sources may be embedded in the process control environment or may be separate from it and connected to the external servers via the Internet or other LAN or WAN. In any event, the web servers 316 may implement some of the functionality of the data collection and distribution system 102 by formatting the received data, if desired.

A process control runtime system 318 is in contact with the web services 310 and the external servers 316. The runtime system 318 includes control applications, operator interface applications, alarms and events applications and real time data applications any of which can use the data from the external servers or from the web services (and thus from the ITS 302). An Interop system 320 is provided to organize and collect the data from the web servers 316 and web services 310 to make this data available in a common or consistent format useable by the process control runtime system 318. The Interop system 320 may include conversion interfaces such as ROC, OPC, PI and Virtual Controller DLL I/F interfaces which can perform data conversion and recognition on the data received from the web servers 316 and the web service listeners 314.

Finally, a configuration database 322 is used to store and organize the data from the Interop system 320 and the process control runtime system 318, including any data from the remote data sources, such as from the external web servers 316 and the ITS 302. Of course, the ITS 302 may also subscribe to and get data from the process control system and the remote data sources via the web services 310.

Figure 5A:
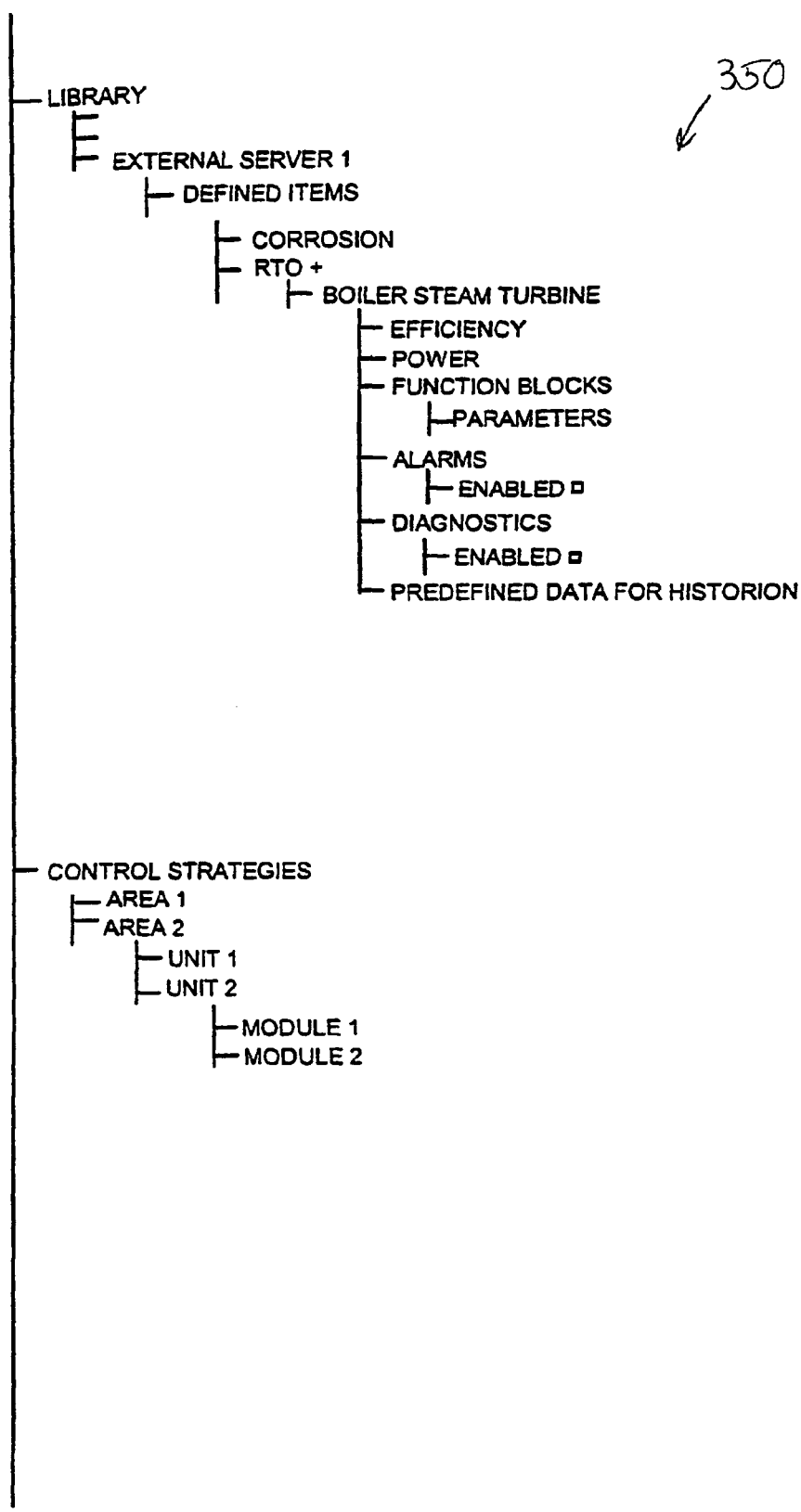
FIGS. 5A and 5B depict one manner of organizing and storing data collected from numerous data sources in a configuration database in a manner that makes this data commonly available to other applications.
Figure 5B:
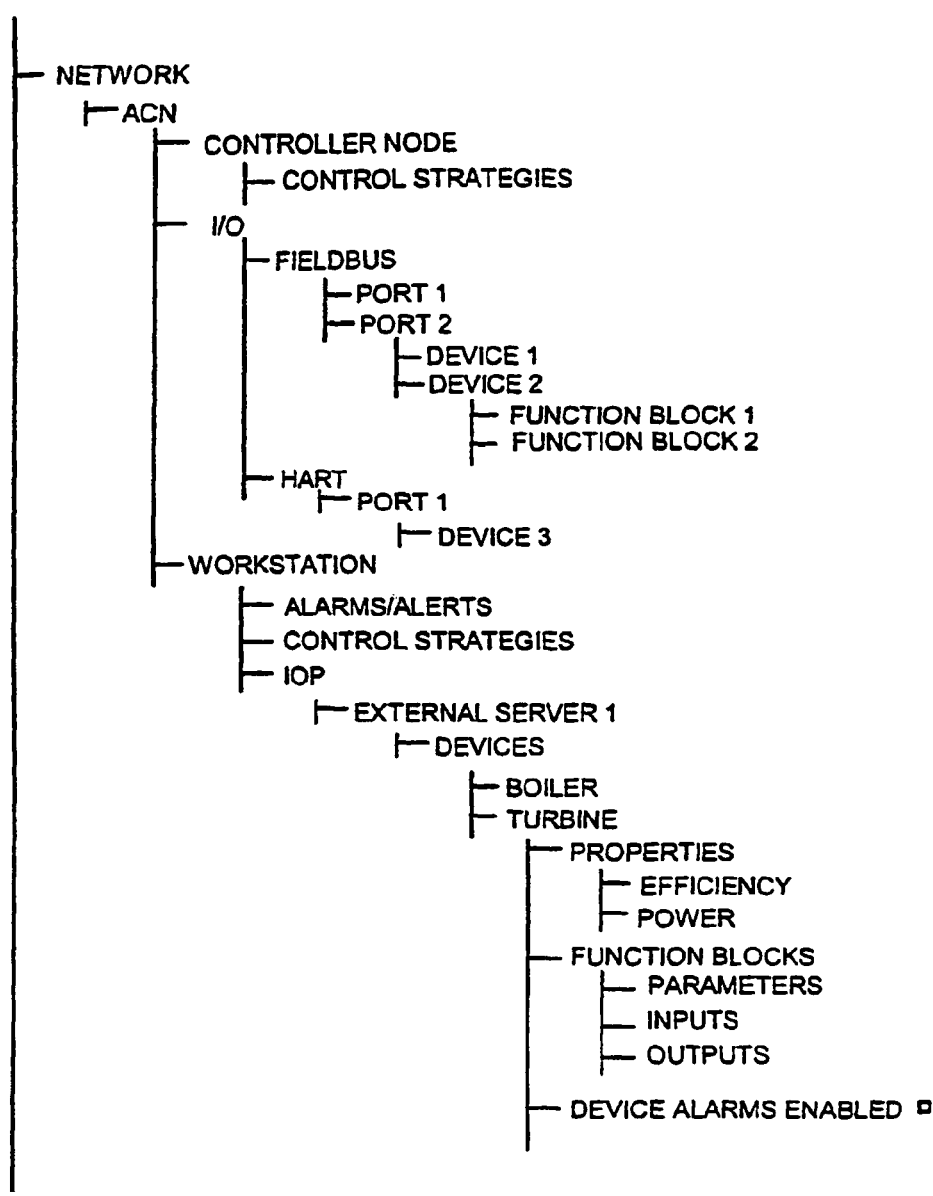

FIGS. 5A and 5B illustrate an example display 350 generated by an explorer type navigation tool which may be used to store, organize and access the data collected by the data collection and distribution system 102 as stored in the configuration database 322. The display or hierarchy 350 includes numerous different sections which can be used for different purposes. However, the hierarchy 350 represents an organization of, illustrates an overview of and provides access to the data or other elements available to the system. Thus, the hierarchy 350 is used to represent the data stored in the configuration database as well as to manipulate that data so as to change the configuration of the system in some manner. As can be seen, the example hierarchy of FIG. 4 includes a number of different sections including a "library" section, a "control strategies" section and a "network" section, each of which can be used for different purposes or to represent different data or different organizations of the data stored in or available to the configuration database.

Generally speaking the library section includes lists of and provides access to different elements stored in or associated with the configuration. These elements may be hardware or software elements including, for example, template software modules, field devices, controllers, workstations, etc. To represent, organize and provide access to data from disparate data sources, the library may also include one or more external servers which will be used as data flow conduits from the disparate data sources to the integrated system. These servers are illustrated in FIG. 4 as the web servers 316. As used herein, the integrated system includes all of the hardware and software elements above the data collection and distribution system 102 of FIG. 2. Put another way, the integrated system includes the elements that use the same data format within the system 10.

Beneath each external server and, therefore, associated with it, are defined elements or parameters of the data source using that server as a conduit of data. The defined parameters of the server and, therefore, the data source, may be icons representing applications or hardware devices connected to or stored in the server. These defined parameters may be populated by XML scripts provided by the actual external servers and associated with the different data sources. In some cases, the owners or persons who created the data sources, such as service providers or application creators, may provide the XML scripts defining the operational capability of the servers or data sources associated therewith. Conversely, a user or an operator within the integrated system may populate the library with the information defining the purpose and attributes of the external server.

An example data source illustrated as being associated with an external server in FIG. 4 is the RTO+ application. Generally speaking, the RTO+ application is an optimization application provided and generally implemented by a process control system service provider. This application is usually tailored to a particular process control system and uses models to model the process control plant for the purpose of optimizing the control of the plant. Under the RTO+ icon, which is physically located on the data source side of the external server, the RTO+ application is illustrated as being concerned with a boiler steam turbine. The RTO+ application provides such information as efficiency of that turbine, the power output by that turbine, and other parameters or data measured by or generated by the RTO+ software regarding the turbine. Further, other elements related to the boiler steam turbine, as provided by the RTO+ software, are illustrated in the library. For example, function blocks defined for or associated with the turbine or listed here as well as parameters of those functions blocks. Likewise, alarms associated with the turbine are illustrated and may be enabled (turned on) or disabled (turned off) here. Likewise, an indication of whether other applications, such as diagnostic applications, which may need to collect data from the turbine via the RTO+ software, are enabled or disabled. Still further, other predefined history data collections, which define data to be collected and stored about the turbine, is listed in this section of the library. It is to be noted that the alarms and other services such as the diagnostic services are not actually parts of the boiler steam turbine. However, they are listed in the library under this element, because they acquire data from the turbine and therefore support the turbine.

Referring now to the control strategies portion of the hierarchy 350, the control strategies are organized by, for example, geographical areas such as Area 1, Area2, etc. Each area may be broken down into different units such as Unit1, Unit2, etc. Still further, each unit then can have numerous modules associated therewith. These modules may be any modules, such as modules developed within the process control network in the consistent format or modules associated with disparate data sources. These modules are generally used to configure how different applications operate in conjunction with each other and communicate with each other. This functionality will be described in more detail with respect to FIG. 6.

The control strategies section illustrates information, as stored in the configuration database, regarding the current configuration of the system 10, including the location and interaction of different hardware in the system 10, the location and interaction of different software elements within the system 10, etc. An operator or user can manipulate the configuration of the system by manipulating the elements within the display 350. For example, to download a piece of software into a hardware device, the user may drag and drop an icon representing that software onto the hardware element. Placing a new device icon into the hierarchy 350 reflects a new device being physically added to the system.

Generally speaking, the configuration database is designed to store and allow manipulation of the modules illustrated in the control strategies sections. Other elements, either hardware or software elements, may be represented by a single module or by a combination of interconnected modules. Thus, when a user is manipulating the icons within the display 350, that user is actually manipulating modules within the configuration database or other databases or memories in which these modules are located.

To enable the collection and use of data from different data sources, the display or hierarchy 350 represents the different data sources as modules or combination of modules. Such modules can then be placed in the configuration hierarchy and can be manipulated in the same manner that modules associated with entities within the integrated system, such as process control modules, are manipulated in the configuration database. When creating a module for a previously unknown or unconnected data source, the user defines the type, nature or meaning of data to be received from that data source in the context of a module. Using this information construct, the data actually received from that data source can then be categorized, labeled, recognized and used within the integrated system in the same manner as data from other modules of elements within the integrated system. In this manner, any type of data that is received from a disparate data source can be collected and stored, even if an organization or person completely unassociated with the integrated system has created the application or device that actually generates the data. Of course it will be understood that the data from the data source is communicated to the configuration database after being converted by a data conversion technique, such as OPC, PI, Fieldbus, etc. As indicated above, this function is performed by the data collection and distribution system 102, not actually shown in the hierarchy 350 of FIG. 5. A more detailed description of modules for the steam turbine is provided with respect to FIG. 6.

The network section of the hierarchy 350 illustrates the physical and operational interconnections of the network. Of course, there will generally be many different types of devices and elements associated with the network. However, one illustrated element is an ACN (Area Control Node) which includes a controller node. The controller node, in turn, has control strategies, such as control and communication software stored therein. The ACN also includes one or more input/output (I/O) devices which may be Fieldbus I/O devices, HART I/O devices, etc. Of course each I/O device may have different ports, devices, function blocks, etc. connected thereto or communicatively tied to the I/O device. One or more workstations may also be associated with the ACN. These workstations may be user interfaces or other types of workstations. The workstation illustrated in FIG. 5 supports or implements numerous applications or other functional elements including, in this example, alarms and alerts processing or display applications and control strategy applications, such as those which are used to configure the controller, field devices, etc., to get information about the controller and field devices.

To enable the collection of data from different or disparate data sources, an Interoperation (IOP) section is also provided or executed by this workstation. The IOP section (which is also illustrated in FIG. 4) includes one or more of the external servers identified in library section of the hierarchy 350. Here, the RTO+ external server (called external server 1) is supported by the workstation illustrated in the ACN. Of course, other external servers associated with other data sources such as those described with respect to FIGS. 2 and 3 may be provided in this workstation, in other workstations in this ACN or in other ACNs, as desired. Any reasonable number of devices may be supported by the external server. While all of these devices may be associated with the RTO+ application or service, not all devices supported by a server need to be associated with one particular data source. In this manner, a single server can support many different data sources.

In this example, one of devices being supported by the external server 1 is the boiler steam turbine discussed previously. As similarly indicated in the library section, the boiler steam turbine may include properties, such as efficiency, power, etc., function blocks, alarms, etc. Also similar to the library section, the user may configure to receive or enable alarms such as device alarms in this location of the hierarchy by selecting the alarm of the turbine device and enabling it here. Still further, the user can access the alarms, properties (such as efficiency and power), function blocks and parameter data in this location of the hierarchy 350.

In this manner, using the IOP section of the hierarchy 350, a user can define and then provide access to data from devices, applications, etc. associated with data sources that were previously unconnected to the integrated system. In some cases, the user will define one or more modules for the external data sources, such as for external devices or applications, and uses these modules to organize and make the data collected from the disparate data sources available to other applications. As part of this process, the user may device function blocks, parameters, alarms, etc. associated with the external data sources. This is the case even though the modules or function blocks for the external data sources do not actually exist within the external data sources but are, instead, located within the data collection and distribution system 102 as implemented by the workstation and external server connected to that external data source.

Using the configuration hierarchy 350 of FIG. 5, the user defines or imports modules associated with data sources, such as devices or applications, connected through external servers supported by the IOP services. FIG. 6 illustrates a configuration screen presented by a configuration application which enables modules to be created and manipulated so as to be connected to other modules within the integrated system. Using this configuration screen, modules for applications and devices within the integrated system and modules for applications and devices outside of the integrated system, i.e., associated with the disparate data sources, can be connected together so as to communicate with one another. This connectedness then defines the data flow between modules and, thus, the data flow between external data sources and applications within the integrated system or vice versa.

Modules may be created by dragging one of a plurality of module templates 360 (on the left side of the screen of FIG. 6) and placing the selected template into the configuration screen 362. The module may then be assigned to a particular device or data source, such as the turbine device within the IOP services or within the library of the hierarchy of FIG. 5 using pop up properties boxes and the like. Once connected with a particular external device or data source via an IOP service and external server, the module may be defined to include certain parameters associated with that device. Such parameters may be properties of the module that are available from the module such as, by way of example, outputs from the module. Some or all of the defined module parameter data may be reflected as associated with the external device or data source in the hierarchy 350 of FIG. 5.

In this case, a steam turbine module 364 includes an efficiency parameter 366 and a power parameter 368 which are available as outputs from the module. The other elements of the module 364 reflected in the hierarchy 350 of FIG. 5 are also provided as part of the module including the function blocks, the device inputs and outputs, alarms associated with the device, etc. The turbine module 364 associated with or created for the boiler steam turbine of the hierarchy 350 of FIG. 5 also includes alarms, which are the alarms identified by or enabled by the user in the IOP or library sections of the hierarchy 350. One of these alarms is available as an output. The outputs of the module are data associated with the turbine device that are provided through the external server from the device itself or other software associated with the device. These outputs may be parameters, measured values, etc. depending on how the module 364 is defined. The inputs to the module are inputs from applications etc. which may be sent through the external server to the actual device or software associated with that device to effect that device in some manner. In effect, the inputs of the module 364 are data or control signals that the associated device will accept or recognize. The function of these inputs will be defined by the device or software associated with the device. These inputs enable data from other modules, such as modules within the integrated system or modules associated with other external data sources to be sent to the external data source or device through the IOP services and thus through the external server connected to the external data source. The external data source may use this input data in any manner it desires. It may, for example, be controlled by this input data, or use this input data to make better or more accurate calculations about the parameters of the device, etc. If desired, the modules for the external data sources may also include software which use the inputs, outputs, parameters, etc. to make calculations of some nature.

In the preferred embodiment of the configuration system, the modules created for the devices, applications, etc. within the integrated system and the external data sources are based on the Fieldbus or DeltaV module concept, which are very similar. Here, the module 364, because it is associated with an external data source which does not use the module organization, is a shadow function block or shadow module. Generally speaking, a shadow function block or shadow module element is a function block or module in the configuration database of the integrated system and is configured to be useable as a module. This shadow module, however, is in contact with the data source or device and has its outputs generated by or provided by that external device. Furthermore, the shadow module provides the inputs it receives to the external data source. Thus, the shadow module merely has inputs and outputs and a state that reflects the inputs to, outputs of and the state of the actual device or data source as determined by the data received from that data source. The use of a shadow module, however, makes the inputs and outputs, of the external device or data source accessible to the other modules within the integrated system, such as modules associated with applications in the asset utilization suite 50. In this manner, the shadow function block or module operates as a conduit of information between the external data source and the applications within the integrated system by putting the data received from the external data source in a format that is usable by other applications within the integrated system. The description and use of shadow function blocks is described in U.S. patent application Ser. No. 09/151,084 entitled "A Shadow Function Block Interface For Use in a Process Control Network" which was filed on Sep. 10, 1998, which is assigned to the assignee of the present application and which is hereby incorporated by a reference herein.

Figure 6:
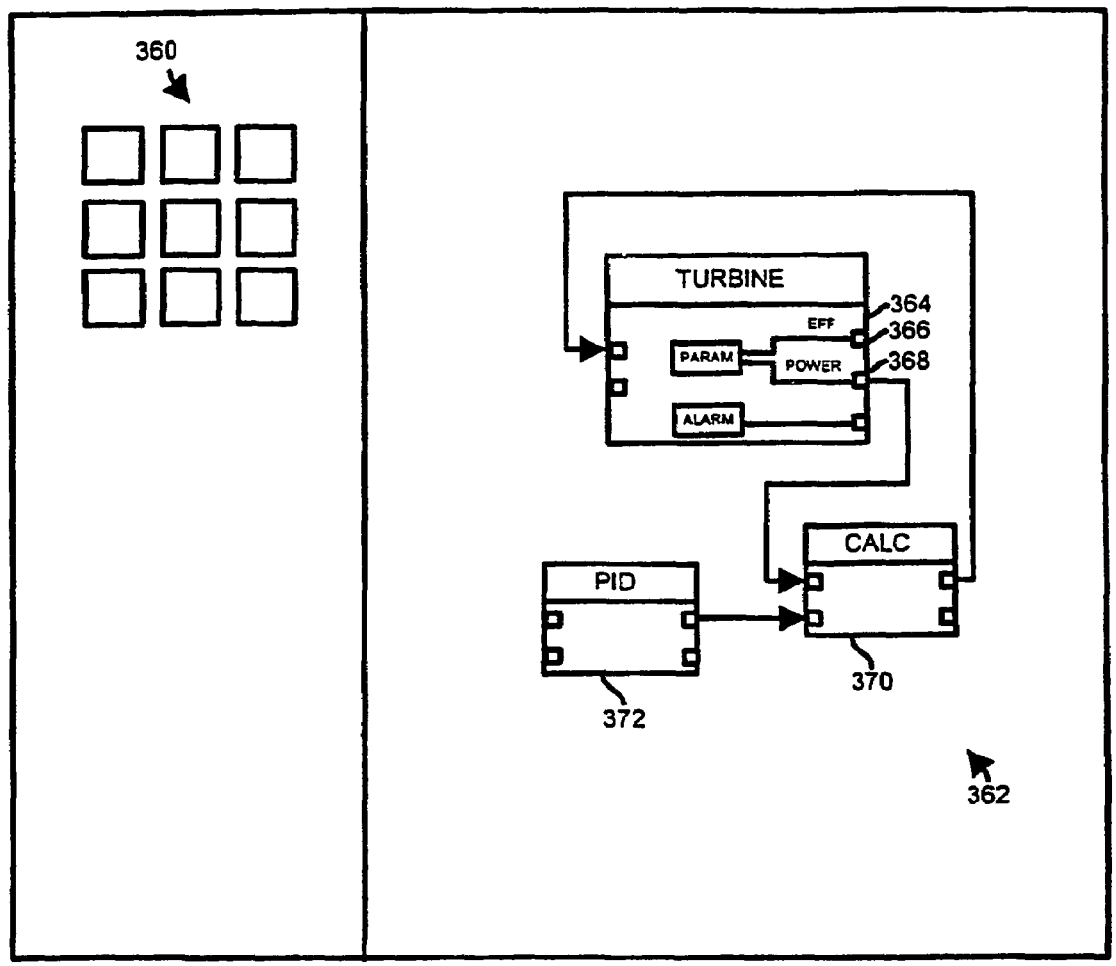
FIG. 6 is a diagram illustrating an application that enables a user to configure a data collection and distribution system to automatically provide collected data to applications within a process control environment in conjunction with the configuration system of FIG. 5.

The configuration screen 362 of FIG. 6 illustrates that the user has configured the turbine module 364 to provide outputs thereof to inputs of another module which is identified as a calculation or Calc module 370. The Calc module 370 includes a power input received from the turbine module 364 and an input received from a PID module 372 which may be a module associated with a process control routine within the integrated system. The Calc module 370 uses these inputs to create an output which may be indicative of a need to change some parameter within the turbine associated with the module 364. In this example, the output of the Calc module 370 is provided to an input of the turbine module 364 so that this data is sent, via the IOP services and the external server, to the application (such as the RTO+ application) that provides the data associated with the turbine. It will be understood that the Calc module 370 is a module which is implemented in and run in a workstation within the integrated system. The Calc module 370 may be associated with another application, such as one of the applications with the asset utilization suite 50. As such, the configuration screen 362 of FIG. 6 illustrates the manner in which one external data source is coupled to an application within the integrated system to provide data to that application. Still further, the application within the integrated system (i.e., the Calc module 360) uses the remote data and process control data to perform a calculation and sends other data or information to the external data source via an external server. It will be understood that the external server is configured to use OPC or any other desired communication conversion protocol to convert the data to the proper format when flowing in either direction between the integrated system and the external data source.

While a configuration or communication strategy between an external data source and an application within the integrated system is illustrated in FIG. 6, it will be understood that modules for other data sources, different modules associated with the same data source, etc. could be created as well and interconnected to provide communication between any external data sources and any applications within the integrated system. Still further, modules from different external data sources could be communicatively coupled together to provide communication between these data sources. In this case, the data collection and distribution system 102 provides the necessary data collection and conversion between the data formats associated with the different external data sources.

One example of manipulation of data from an external data source within a module created to collect and organization data from that source is the use or creation of alarms for an external data source in particular, alarms can be defined for a module to collect and reflect actual alarm data provided from the external source. Additionally or alternatively, alarms can be created within a module based on data received from the external data source associated with that module. In the case in which alarms are created within the module, a function block within the module can acquire data from the external source as well as data from other sources if so desired and perform any desired computation to determine if an alarm or alert condition exists. If so, this function block may set an alarm signal that will be associated with the module and that can be monitored by or sent to alarming applications which process this alarm in the same manner as other alarms are processed. Such alarm processing could include displaying the alarm to the user, storing the alarm, enabling the alarm to be acknowledged, etc. Furthermore, the alarm capability of a module, such as a module associated with an external data source can be enabled or disabled (which may turn the alarm capabilities of the module on or off) via the hierarchy 350 of FIG. 5. Thus, it will be understood that data from external data sources can be mapped to an alarm within the module or can be used to generate an alarm for the module and, thus, for the external data source.

To access, acquire or view data from an external data or associated with an external data source, a user may go through library section of the hierarchy 350 to view the information associated with the external servers. Additionally, the user may view the control strategies and look for the particular module for the external data source. Still further, the user may use the ACN, workstation, IOP, external server, device path within the hierarchy 350 to find the appropriate data.

Similar to the alarm services, other types of services for the external data sources, such as diagnostic services, may be provided for the external data sources using the hierarchy 350 of FIG. 4 and the data collection and distribution system 102. For example, some diagnostic applications regularly collect data from or about modules within the integrated system and use this data to diagnose problems, poor performance, etc. The same diagnostic applications can now be used to collect data about external data sources using the modules created for that data source. Thus, the data needed by the diagnostic application can be collected in an automatic manner as long as the module associated with the external data source is configured to receive or collect the data needed for the diagnostic application from the external data source. In some cases, the information about the module itself, such as variability within inputs, outputs or other parameters of the module may be used for diagnostic purposes. Of course, any desired data may be collected or used for these diagnostic applications. Similar to alarms, the diagnostic applications, such as the Inspect application sold by Fisher Rosemount Systems, Inc. may be enabled or disabled in the hierarchy 350 of FIG. 5. This diagnostic application is described in detail in U.S. patent application Ser. No. 09/256,585 entitled "Diagnostics in a Process Control System." Of course, other diagnostic applications could create indexes for the external data source to indicate a health of that data source or device associated with the data source. Such indexes might include a utilization index, a performance index, a variability index or other help index.

Using a common module definition or scheme within the data collection and distribution system 102 makes the creation and use of this system more easily understood, programmed and used. Thus, it may be desirable, although it is not necessary, to use an open or well known module protocol, such as the Fieldbus protocol, the DeltaV protocol, which is very similar to the Fieldbus protocol or other open protocol to create and manipulate the modules described herein. When using such and open protocol, service providers who may be supplying or overseeing the external data sources may be able to support the data collection and distribution system 102 by creating a front end for the external system that uses the open protocol to communicate data to the data collection and distribution system 102. If this is the case, an OPC, PI, etc. front end for the data collection and distribution system 102 may not be necessary for that data source. Instead, the modules created by the data collection and distribution system 102 may simply be imported from the remote data sources themselves. Furthermore, the provision of this front end on the external data sources enables the operators or owners of these data sources to define the data available from their system, to provide alarms and alerts that are most pertinent to their system, to better support diagnostic applications used within the integrated system, etc., all of which makes their products or services more desirable. Likewise, this front end makes it easier for their applications to acquire and use data from other sources, such as other external data sources and applications within the integrated system, which may add value to their product.

While the data collection and distribution system has been describe herein as using modules and being organized and manipulated using an explorer type hierarchy such as that of FIG. 5, it will be understood that this is only one way to implement this system. Any other manner of collecting the data from external data sources, converting it to a common or usable format, storing that data and providing the data to other applications could be used as well. Furthermore, while the data collection and distribution system 102 of FIG. 3 has been illustrated as being a single entity, it could be distributed in nature. Thus, different workstations or other computer devices spread throughout an integrated system may collect data from different sources and process and store this data in a manner that makes it available to the integrated system.

Once the data collection and distribution system 102 is configured, there are many different types of applications which can use the data collected from disparate data sources to perform new or more complete functions within a process environment. For example, one or more of the applications within the asset utilization suite 50 may be used to execute or oversee the execution of one or more mathematical or software models that model the operation of a particular plant or entities within the plant, such as devices, units, loops, areas, etc. Thus, process or device models may be created and implemented to use the collected data. These models may be based on process equipment or process regions. In one embodiment, to generate these models, a modeling expert divides the plant into component equipment and provides a model for the different component parts at any desired level of abstraction. For example, the model for a plant is implemented in software and is made up of or may include a set of hierarchically related, interconnected models for the different areas of the plant. Similarly, the model for any plant area may be made up of individual models for the different units within the plant with interconnections between the inputs and outputs of these units. Likewise, units may be made up of interconnected equipment models, and so on. Of course, area models may have device models interconnected with unit models, loop models, etc. In this example model hierarchy, the inputs and outputs of models for the lower level entities, such as devices, may by interconnected to produce models for higher level entities, such as units, the inputs and outputs of which may be interconnected to create still higher level models, such as area models, and so on. The way in which the different models are combined or interconnected will, of course depend on the plant being modeled. Of course, these models may receive needed data from external data sources in the manner described above.

Figure 7A:
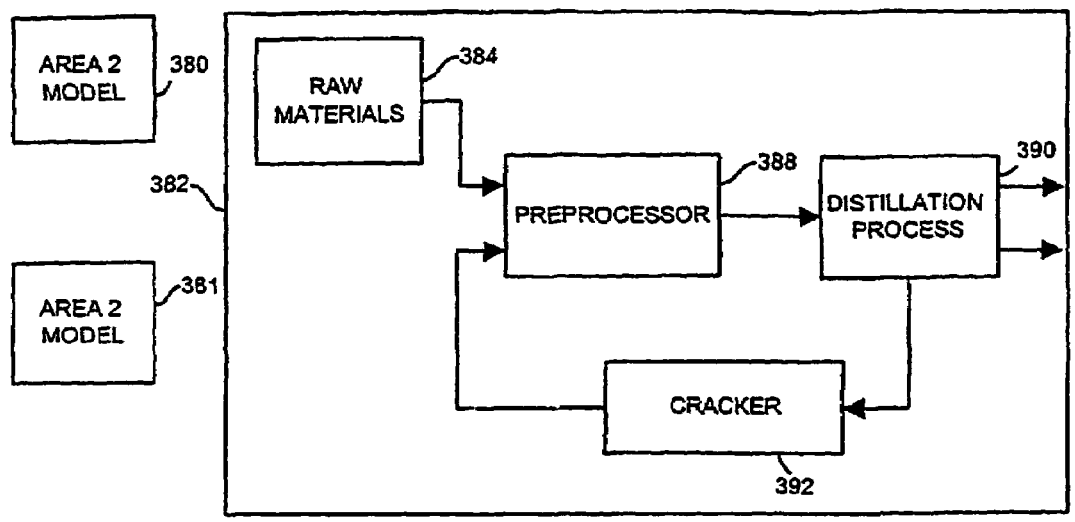
FIG. 7A is a block diagram of a model used to simulate the operation of an area within a plant.

An example use of hierarchical software models will now be described with respect to FIGS. 7A and 7B. FIG. 7A illustrates models for multiple areas 380, 381 and 382 within a refining plant. As illustrated in FIG. 7A, the area model 382 includes a component model of a raw material source 384 which feeds raw material such as crude oil to a pre processor model 388. The pre processor 388 provides some refining to the raw material and provides an output, typically crude oil to a distillation process 390 for further refining. The distillation process 390 outputs C2H4, usually a desired product, and C2H6 which, generally speaking, is a waste product. The C2H6 is fed back to a C2 cracker 392 which provides its output to the pre processor 388 for further processing. The feedback from the distillation process 390 through the C2 cracker 392 is a recycling process. Thus, the model for the area 382 may include separate models for the raw material source 384, the pre processor 388, the distillation process 390 and the C2 cracker 392 having inputs and outputs interconnected as illustrated in FIG. 7A. That is, each component model may be tied to the inputs and outputs of other component models in the manner illustrated in FIG. 7A to form the model for the area 382. Of course, the models for the other areas 380 and 381 could have other component models having interconnected inputs and outputs. These models may be implemented in a processor associated with an external data source and provide outputs, such as efficiency, etc. to the integrated system. Conversely, the models may be implemented within the integrated system and receive data from one or more external data sources.

Figure 7B:
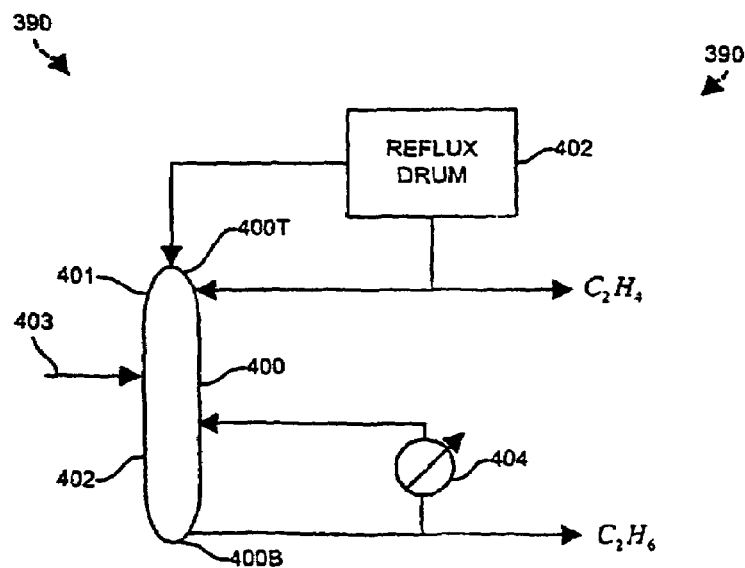
FIG. 7B is a block diagram of a model used to simulate the operation of a unit within the area model of FIG. 7A.

Referring now to FIG. 7B, the component model for the distillation process 390 is illustrated in more detail and includes a distillation column 400 having a top portion 400T and a bottom portion 400B. The input 403 to the distillation column 400 is an indication of pressure and temperature which may be tied to the output of the model for the pre processor 388 shown in FIG. 7A. However, this input could be set by an operator or be set based on actual measured inputs or variables within the plant 10. Generally speaking, the distillation column 400 includes a number of plates disposed therein and fluid moves between the plates during the distillation process. C2H4 is produced out of the top 400T of the column 400 and a reflux drum 402 feeds back some of this material to the top 400T of the column 400. C2H6 generally comes out of the bottom of the column 400 and a reboiler 404 pumps polypropylene into the bottom 400B of the column 400 to aid in the distillation process. Of course, if desired, the model for the distillation process 390 may be made up of component models for the distillation column 400, the reflux drum 402 and the reboiler 404, etc. having the inputs and outputs of these models connected as illustrated in FIG. 7B to form the component model for the distillation process 390.

As noted above, the component model for the distillation process 390 may be executed as part of a model for the area 382 or may be executed separately and apart from any other models. In particular, the input 403 to the distillation column 400 and/or the outputs C2H4 and C2H6 can actually be measured and these measurements may be used within the model of the distillation process 390 in a number of ways as described below. In one embodiment, the inputs and outputs of the model of the distillation process 390 may be measured and used to determine other factors or parameters associated with the model of the distillation process 390 (such as the distillation column efficiency, etc.) to force the model of the distillation process 390 to more accurately match the operation of the actual distillation column within the plant 10. The model of the distillation process 390 may then be used with the calculated parameters, as part of a larger model, such as an area or plant model. Alternatively or additionally, the model of the distillation process 390 with the calculated parameters may be used to determine virtual sensor measurements or to determine if actual sensor measurements within the plant 10 are in error. The model of the distillation process 390 with the determined parameters may also be used, to perform control or asset utilization optimization studies, etc. Still further, component models may be used to detect and isolate developing problems in the plant 10 or to see how changes to the plant 10 might affect the selection of optimization parameters for the plant 10.

If desired, any particular model or component model may be executed to determine the values of the parameters associated with that model. Some or all of these parameters such as efficiency parameters may mean something to an engineer within the context of the model but are generally unmeasurable within the plant 10. More particularly, a component model may be generally mathematically described by the equation Y=F(X, P), wherein the outputs Y of the model are a function of the inputs X and a set of model parameters P. In the example of the distillation column model of the distillation process 390 of FIG. 7B, an expert system may periodically collect data (e.g., every hour, every ten minutes, every minute, etc.) from the actual plant indicative of the actual inputs X to and the outputs Y from the entity to which the model pertains. Then, every so often, a regression analysis, such as a maximum likelihood, least squares or any other regression analysis may be performed using the model and multiple sets of the measured inputs and outputs to determine a best fit for the unknown model parameters P based on the multiple sets of measured data. In this manner, the model parameters P for any particular model may be determined using actual or measured inputs and outputs to reconcile the model with the entity being modeled. Of course, this process can be performed for any and all component models used within the plant 10 and can be performed using any appropriate number of measured inputs and outputs. Still further, the collected data, or the information calculated from this data, may be provided to the data collection and distribution system 102 and used in modules reflecting these models, the elements modeled by these models, etc.

In any event, using these component models, or the data collected or generated by these models, the asset utilization suite 50 can perform asset performance monitoring by plotting the values of the determined model parameter(s) (and/or model inputs and outputs) versus time. Still further, the models, whether run in a data source or in the asset utilization suite 50, can detect potentially faulty sensors. If one or more of the sensors appears to have a high or an otherwise unacceptable error associated therewith, the asset utilization suite 50 can notify a maintenance person and/or a process control operator of the faulty sensor.

As noted above, the parameters, inputs, outputs or other variables associated with any particular model may be stored and tracked to provide performance monitoring for a unit, an area or any other entity of a process or a plant. If desired, two or more of these variables may be tracked or monitored together to provide a measure of the performance of the entity.

The asset utilization suite 50 can monitor one or more entities based on model parameters or other model variables and can report the operating states or performance measures of these entities to any other desired persons, functions or applications within the process control plant 10, such as to a process control expert system, a maintenance person, a business application, a user interface routine, etc. Of course, the asset utilization suite 50 may perform, performance or condition monitoring on any desired entity, based on one, two, three or any other desired number of parameters or variables for each entity. The identity and number of variables or parameters to be used in this performance monitoring will generally be determined by an expert familiar with the process and will be based on the type of entity being monitored.

If desired, the asset utilization suite 50 or more particularly, the state monitor application 240 may define a performance index or plot by comparing one or more of the parameters determined by the models as described above with the same parameter determined by the model run in accordance with the design parameters of the entity being modeled. In particular, the asset utilization suite 50 may execute a model using the design parameters of the entity within the plant 10 to which the model pertains to determine what the designed performance of the entity would be if it was operating according to the current state of the process and using the actual inputs to the entity as measured within the plant 10. This design performance can then be compared to the actual performance of the entity as determined by the component model for that entity or as determined by the measured inputs and outputs of the entity to generate a measure of the performance of the entity.

The component models may also be used to perform process optimization. In particular, the asset utilization suite 50 may use one or more optimization routines which execute the individual component models to optimize the operation of the plant in terms of some optimization criteria provided by, for example, a process control operator or a business person via a business application. The optimizer can be a real time optimizer which operates in real time to optimize the plant 10 based on the actual state of the plant 10 at that time. Alternatively or additionally, an optimizer may determine changes to be made to the plant 10, such as bringing certain devices or units back on line, that will provide the greatest optimization of the plant 10. Of course, other types of optimization routines may be executed instead of or in addition to those mentioned here.

As a result of the above discussion, it can be seen that the use of models provides many new types of data or information for the business applications, process control applications and asset maintenance and performance monitoring applications. In particular, the models can be used to perform performance monitoring and to produce a performance index which indicates the relative performance of a device, unit, area, etc. within a plant. This performance index may be a measure of the performance of an entity with respect to the possible performance of that entity. Furthermore, while device and unit models have been discussed above, similar models could be made and executed for process control entities, such as loops, units, etc. to provide performance measures and optimization criteria for these types of entities as well. Also, as indicated above, models may, in some cases, be used to measure or indicate the health of certain devices or other entities and to provide a health index indicative of these entities. For example, the error measurements of certain input and output sensors as determined by the regression analysis used on certain models may be used as or converted into an indication of the health of those devices. Also, other information not otherwise available to the process controller, such as model parameters and virtual sensor measurements based on the models could be provided to the process controllers or to the business persons for use in numerous manners.

Besides performance and health indexes, the asset utilization suite 50 can assist the index generation routine in creating other types of indexes such as a utilization index and a variability index. A variability index indicates how much some signal into or out of, or some other parameter associated with a device, loop, unit, etc. varies as compared to how much this signal or parameter is expected to vary. The data needed to create this variability index may be collected by the asset utilization suite 50 via the data collection and distribution system 102 and provided to the index generation routine at any desired or convenient times. Of course, the normal amount of variation of a signal or parameter may be set by a manufacturer, engineer, operator or maintenance person familiar with the entity or may be based on a statistical measure (such as an average, standard deviation, etc.) associated with that or other similar entities within the plant and this normal or expected variation may be stored by or updated within the index generation routine.

The utilization index, in one form or another, tracks or reflects the utilization of individual loops or other entities and may provide some indication as to whether these entities are being utilized based on previously determined bench marks or operational goals. A utilization index can be generated based on measured uses of the actual device. For example, a device may be measured as to how often it is being used within a process compared to a desired utilization. The utilization index might identify loops, etc. which are not being used as designed.

As indicated above, the user interface routine 244 provides a graphical user interface (GUI) that is integrated with the asset utilization suite 50 described herein to facilitate a user's interaction with the various asset utilization capabilities provided by the asset utilization suite 50. However, before discussing the GUI in greater detail, it should be recognized that the GUI may include one or more software routines that are implemented using any suitable programming languages and techniques. Further, the software routines making up the GUI may be stored and processed within a single processing station or unit, such as, for example, a workstation, a controller, etc. within the plant 10 or, alternatively, the software routines of the GUI may be stored and executed in a distributed manner using a plurality of processing units that are communicatively coupled to each other within the asset utilization system. Still further, the data used by the GUI to create certain screens may be accessed from external data sources via the data collection and distribution system 102.

Preferably, but not necessarily, the GUI may be implemented using a familiar graphical windows based structure and appearance, in which a plurality of interlinked graphical views or pages include one or more pull down menus that enable a user to navigate through the pages in a desired manner to view and/or retrieve a particular type of information. The features and/or capabilities of the asset utilization suite 50 described above may be represented, accessed, invoked, etc. through one or more corresponding pages, views or displays of the GUI. Furthermore, the various displays making up the GUI may be interlinked in a logical manner to facilitate a user's quick and intuitive navigation through the displays to retrieve a particular type of information or to access and/or invoke a particular capability of the asset utilization suite 50.

In one embodiment, similar to FIG. 5 above, the GUI may perform or present a set or series of hierarchical displays in which more basic or common information about the nature of the process control system (such as the areas, loops, devices, controller routines performance monitoring applications, etc. within the plant) is displayed in some manner in a higher level display. Then, in a series of subsequent lower level displays, which may be accessed by selecting and clicking on any of the particular information within the higher level display, may provide further information about the control routines, the maintenance routines, the interconnections of process control equipment, as well as actual performance measurements, process control routine activity such as alarms, problems, etc., performance measurements such as performance recommendations, predictions, etc. and maintenance information such as problems occurring within the plant etc. Other lower level displays may then provide further information about elements in those displays. In general, such a hierarchical display provides more information about particular areas, loops, etc. and the problems associated therewith from the standpoint of process control activities, maintenance activities as well as process performance activities as the user drills down or go into lower levels in the display.

Generally speaking, the GUI described herein provides intuitive graphical depictions or displays of process control areas, units, loops, devices, etc. Each of these graphical displays may include numerical status and performance indexes (some or all of which may be generated by the index generator routine described above) that are associated with a particular view being displayed by the GUI. For example, a display depicting a process control area may provide a set of indexes reflecting the status and performance of that area (i.e., a particular portion of the process control system at a particular level of the equipment hierarchy). On the other hand, a display depicting a loop may provide a set of status and performance indexes associated with that particular loop. In any event, a user may use the indexes shown within any view, page or display to quickly assess whether a problem exists within any of the devices, loops, etc. depicted within that display.

Additionally, the GUI described herein may automatically, or may in response to a request by a user, provide maintenance information to the user. The maintenance information may be provided by any portion of the asset utilization suite 50. Similarly, the GUI may display alarm information, process control information, etc., which may also be provided by the asset utilization suite 50. Still further, the GUI may provide messages to the user in connection with a problem that has occurred or which may be about to occur within the plant 10. These messages may include graphical and/or textual information that describes the problem, suggests possible changes to the system which may be implemented to alleviate a current problem or which may be implemented to avoid a potential problem, describes courses of action that may be pursued to correct or to avoid a problem, etc.

Still further, the GUI described herein may automatically, or in response to a request by a user, provide process performance information to the user. The process performance information may be provided by any portion of the asset utilization suite 50. Such performance data or information may include performance measures, predictions or recommendations to the user about changes to the process to alter the performance, may include inputting or displaying the performance goals currently being used by the system etc.

Figure 8:
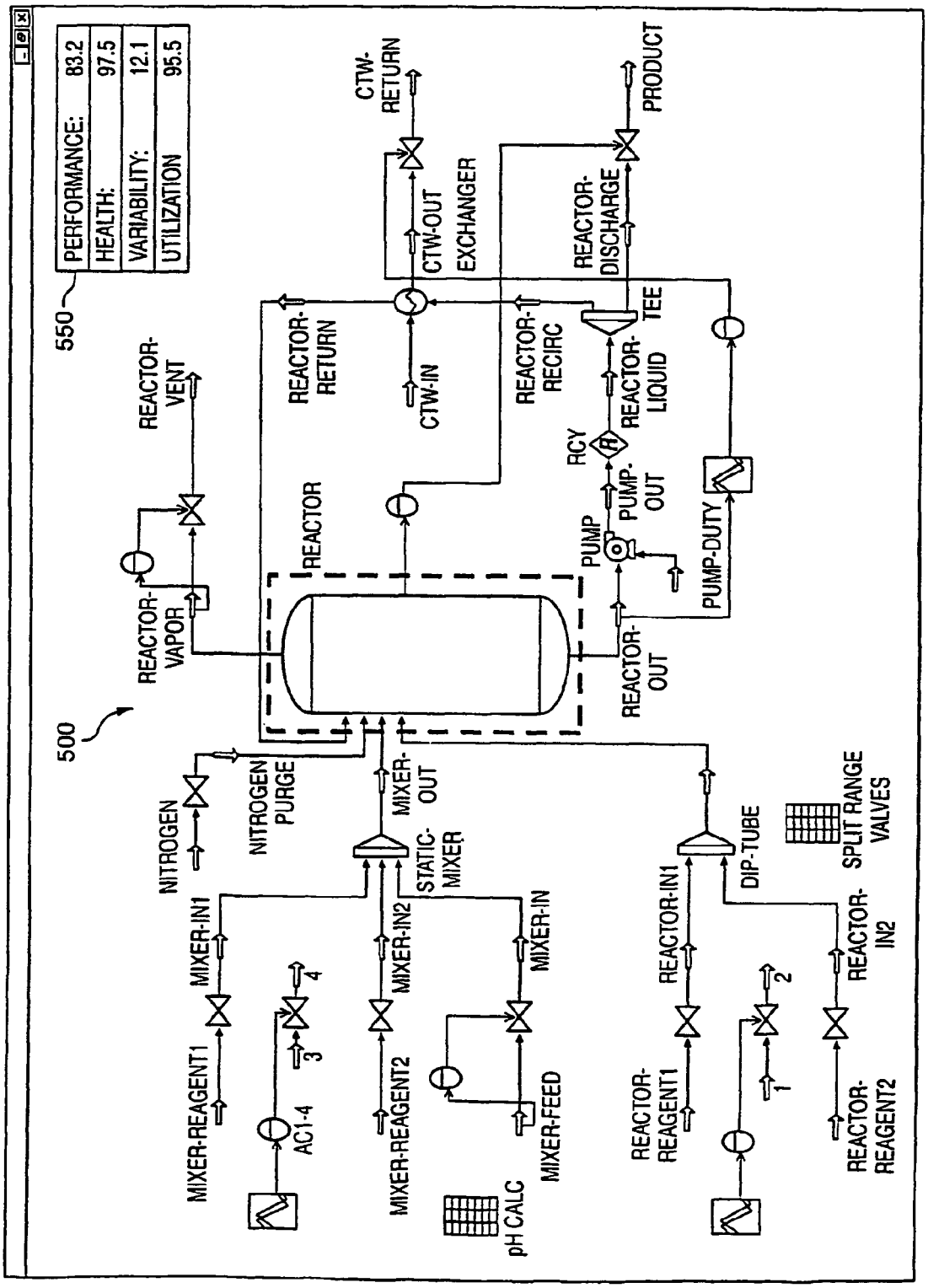
FIG. 8 is an exemplary depiction of a display representing a unit within a process control system that may be displayed by a graphical user interface.

FIG. 8 is an exemplary depiction of a display representing a unit 500 within a process control system that may be displayed by the GUI. As illustrated in FIG. 8, the unit 500 includes a plurality of devices such as, for example, valves, pumps, temperature transmitters, etc., all of which may be depicted graphically as shown. Additionally, the display may further include lines arrows, and any other indicia to represent logical and physical interconnections between the various devices. Of course, such graphical representations of process control systems (or portions of process control systems) are, well known in the art and, thus, the manner of implementing these graphical representations or displays will not be described in further detail herein.

The GUI display shown in FIG. 8 also includes a plurality of index names and values 550. In particular, the index names and values 550 include a performance index, a health index, a variability index and a utilization index, all of which have been discussed briefly above in connection with the asset utilization suite 50 and the index generation routine thereof. The index names and values 550 maybe displayed in a tabular format as shown or in any other desired format. The index names and values 550 are representative of the performance and status of the entire unit 500 and, thus, the index values shown are preferably, but not necessarily, composed of the index values or fields associated with each of the sub units and/or devices that make up the unit 500.

Before discussing the GUI and the manner in which asset information, process control information, maintenance information, diagnostic information, performance information or any other type of information is displayed to a user thereby, a brief discussion of the manner in which the performance and status, indexes are generated is provided below. Also, it should be recognized that while a performance index, a health index, a variability index and a utilization index are described in detail herein in connection with the various displays of the GUI, additional and/or different indexes may be generated by the asset utilization suite 50 and displayed via the GUI. It will also be understood that some or all of the data displayed by the GUI may come from an external data source.

In general, the indexes generated by the index generator routine and displayed via the GUI may be calculated for individual devices, for logical and/or physical groupings of devices, for logical processes (e.g., control loops), for logical groupings of process equipment such as units and areas, etc. In other words, the indexes may, in principal, be calculated at each level of the equipment and logical hierarchy of a process control system or, more generally, an asset utilization system, which may include one or more process control systems. However, the meaning of a particular index may depend on the context (i.e., whether the index corresponds to a logical or a physical grouping of devices and/or parameters) in which the index is generated and displayed and may depend on the level of the hierarchy at which it is displayed. For example, at the lowest level of the equipment hierarchy, indexes correspond to physical devices such as valves, temperature sensors, actuators, etc. Thus, each device may have a unique set of indexes that may be generated within the device or for the device based on information stored within the device at the time the device is manufactured. Accordingly, each device may generate and provide its indexes to higher levels of the hierarchy and to the asset utilization suite 50 as needed.

Similarly, units or loops, each of which is composed of one or more devices or function blocks may each have a unique set of indexes. Of course, the calculation of one or more of the performance, health, variability and utilization indexes may not be appropriate, required or useful for every level of the logical and equipment hierarchies. Any or all of these indices may be indicative of the health of a device or other entity within the system. For example, the health index (HI) for a device may be based on historical usage of the device. In particular, the device manufacturer may store information relating to the life cycle of the device within the device and, based on the usage of the device and the environmental impacts imparted to the device during its operation (e.g., temperature variations, shocks, etc.), the device may determine to what extent the: device has moved along its life cycle curve (i.e., aged). The manufacturer may program a device to provide an HI value which is indicative of the current status of the life cycle of the device. For example, a stroke type valve may have an expected useful operating life cycle of 250,000 full stroke cycles and the manufacturer of the stroke valve device, which is typically a smart field device, has stored in its memory the expected number of lifetime operating strokes along with the current number strokes that the valve has completed. Thus, in the case where an HI value may range from good, need maintenance soon (NMS) and need maintenance now (NMN), the HI value generated may be based on the number of strokes ranging from zero to 250,000. Of course, the precise relationship between the HI values and the life cycle characteristic (e.g., strokes) may not be linear. To the contrary, many life cycle characteristics follow an exponential characteristic, whereby failure and degradation in device performance/operation progresses more rapidly as time passes, as strokes are completed, etc. Of course, there are many other manners of defining or computing an HI for a device, based on the current detected state of the device and how well it is operating. The HI for a loop, on the other hand, is preferably, but not necessarily, based on functions blocks that make up the loop.

Similarly, the UI calculated for the loop area and unit levels, represents the degree to which a particular asset (e.g., a loop) is being exploited in comparison to its capacity or desired utilization. For example, the UI value may be based on the amount of time for which loops are being used to perform control as designed.

The mathematical combination of device index values to form index values for loop, sub-unit, unit and area levels of the hierarchy may use weighted summations or averages, or any other suitable mathematical combination. Of course, the calculation of one or more of the performance, health, variability and utilization indexes may not be appropriate, required or useful for every level of the logical and equipment hierarchies. FIG. 9 is an exemplary table that illustrates one manner in which the performance index (PI), the health index (HI), the variability index (VI) and the utilization index (UI) may or may not be generated for the device, loop, sub unit and unit levels of the system hierarchy. As shown in FIG. 9, the PI may be generated for the unit and sub unit levels. At the unit and sub unit levels, the PI may be calculated by comparing a model (such as one of the models 56) of the unit or sub unit to the actual performance of the unit or sub unit or in any other desired manner. In particular, the PI in this context (i.e., at the unit and sub unit levels of the hierarchy) may be, for example, an efficiency with respect to a theoretical maximum or, alternatively, with respect to an empirically derived maximum efficiency based on actual system performance. The table shown in FIG. 9 also indicates that the PI need not be calculated for individual devices or loops. However, in some applications it may be desirable to calculate a PI for loops and devices. For example, in the case of calculating a PI for a device, the device manufacturer may store performance information within the device so that during operation the device may calculate a PI based on a comparison of an actual performance characteristic (such as, for example, an operating efficiency) to stored performance information, which may include a theoretical maximum device efficiency. Of course, the index generation routine 51 may also perform this function. In the case of calculating a PI for a loop, the system may, for example, compare the maximum or average loop error (i.e., the steady state error signal) to some predetermined minimum error value which, ideally, may be zero. In this manner, a small loop error may correspond to a PI value that is indicative of good performance.

FIG. 9 also illustrates that the VI may be calculated at the loop and device levels of the hierarchy. At the device level, the VI may be calculated by comparing the changes or deviations in a device output to an expected or desired amount of change or variation. An excessively high or an excessively low VI value may be indicative of a device failure or malfunction or possibly an imminent failure or malfunction. Likewise, at the loop level, excessively frequent or large magnitude changes in the output of a loop may be indicative of a problem. In any case, the VI for loops and devices may be based on a comparison of actual parameter variability to expected parameter variability, which may be determined theoretically or empirically. Although FIG. 9 shows that the VI may not be calculated for the unit and sub unit levels, in some applications, it may nevertheless be desirable to generate a VI for these levels.

Further, FIG. 9 shows that the HI is calculated for the device, loop, sub unit and unit levels. The HI for a device may be based on historical usage of the device. In particular, the device manufacturer may store information relating to the life cycle of the device within the device and, based on the usage of the device and the environmental impacts imparted to the device during its operation (e.g., temperature variations, shocks, etc.), the device may determine to what extent the device has moved along its life cycle curve (i.e., aged). The manufacturer may program a device to provide an HI value which is indicative of the current status of the life cycle of the device. For example, a stroke type valve may have an expected useful operating life cycle of 250,000 full stroke cycles and the manufacturer of the stroke valve device, which is typically a smart field device has stored in its memory the expected number of lifetime operating strokes along with the current number strokes that the valve has completed. Thus, in the case where an HI value may range from between zero and ten (where zero represents poor health and ten represents perfect health), the HI value generated by the valve may range from zero to ten as the number of strokes rises from zero to 250,000. Of course, the precise relationship between the HI values and the life cycle characteristic (e.g., strokes) may not be linear. To the contrary, many life cycle characteristics follow an exponential characteristic, whereby failure and degradation in device performance/operation progresses more rapidly as time passes, as strokes are completed, etc. Of course, there are many other manners of defining or computing an HI for a device, based on the current detected state of the device and how well it is operating. For example, if the device has two detected minor problems, its HI may decrease.

The HI for a loop, on the other hand, is preferably, but not necessarily, a mathematical combination (such as, for example, a weighted summation or average) of the HI values for the individual devices or functions blocks that make up the loop. Likewise, the HI values for the sub unit and unit levels may also be a mathematical combination of the underlying HI values for loops and sub units. Thus, ultimately, the HI values hierarchy for levels above the device level are based on one or more HI values for devices that have been formed into composite values.

As is also shown in FIG. 9, the UI may be calculated for the loop, sub unit and unit levels, but may not necessarily be calculated for the device level. Generally, speaking, the UI represents the degree to which a particular asset (e.g., a loop, a sub unit or a unit) is being exploited in comparison to its capacity or desired utilization. For example, the UI value may be based on the amount of time for which a unit, sub unit or loop is being used to perform control or produce outputs. Additionally or alternatively, the UI value may be based on the amount of material which is being processed by the loop, sub unit and/or unit in comparison to the maximum amount that may be processed by that loop, sub unit, unit, etc.

Figure 10:
FIG. 10 is an exemplary chart depicting one manner in which a performance index for a unit may be calculated.

FIG. 10 is an exemplary chart depicting one manner in which the PI for the unit 500 shown in FIG. 8 may be calculated. As shown in FIG. 10, each of a plurality of loops 575 that make up the unit 500 has its own PI and weighting coefficient, which may be user selected or defined based on the relative importance of that particular loop to the overall operation of the unit 500. The indexes and weights for the loops 575 may then be mathematically combined using a weighted average to arrive at a PI value of 83.2 for unit 500.

In a similar manner, the HI for the unit 500 may be calculated as a weighted average of the HI values for all of the devices (and/or loops) that make up the unit 500. A table such as that shown in FIG. 11 may be used to represent the values to be included in the weighted average. As is also shown in FIG. 11, a textual description may be associated with particular devices and index values. These textual descriptions may provide diagnostic information, maintenance information, etc. based on the HI value and the particular device associated with that HI value.

FIG. 12 is an exemplary table that illustrates one manner in which the VI may be calculated for a unit, such as the unit 500 shown in FIG. 8. As with the HI, the VI calculated for the unit 500 of FIG. 8 is based on a weighted average of the VI values for the individual devices, loops and/or sub units that make up the unit 500. Of course, the GUI may provide a user with the ability to see the weighted average data such as that illustrated in FIGS. 10-12 and may enable the user to change the weights.

Figure 13:
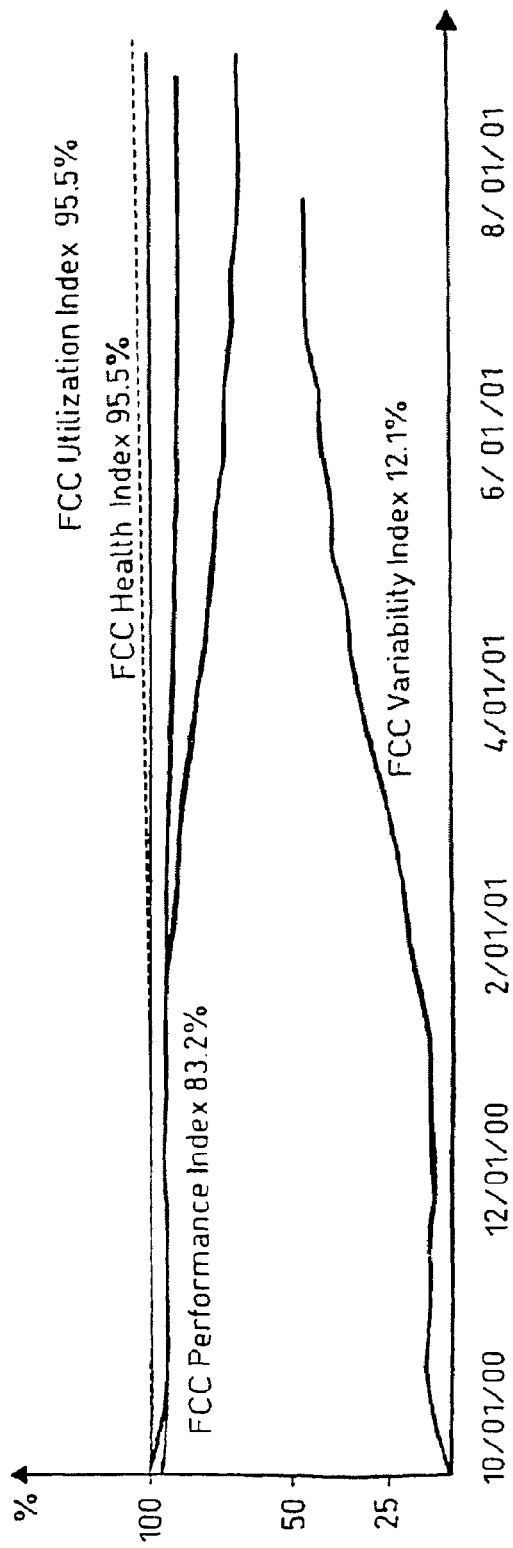
FIG. 13 is an exemplary graphical depiction of a display that may be provided by a graphical user interface.

FIG. 13 is an exemplary graphical depiction of a display that may be provided by the GUI to enable a user to monitor the performance of a unit, sub unit, loop; device, etc. within the plant 10. As shown in FIG. 13, the values of the various indexes may be plotted as a function of time, thereby enabling a user to more intuitively analyze any trends or any other time-based changes that may be indicative of a problem. Further, such a graphical depiction may also reveal important correlations or relationships between changes in the various indexes. For example, a user may be able to more easily identify a relationship between a decreasing or poor HI value and an increasing or excessively high VI value.

Still further, the GUI may also provide textual messages within the graphical display shown in FIG. 13 or in some other display or page that indicate to the user current or potential problems, which may be related to the displayed index values or changes thereof. These textual messages may identify possible solutions to the problems which have been identified. Although the graphical information depicted within FIG. 13 has been scaled so that the indexes are expressed as percentages and the time axis is labeled in units of months, any other units and display resolution may be used instead. For example, in the case where indexes may be or could be changing rapidly, the GUI may enable the user to display index values on an hourly basis, minute by minute, every few seconds, or more frequently (i.e., at a higher time resolution) if desired.

Figure 14:
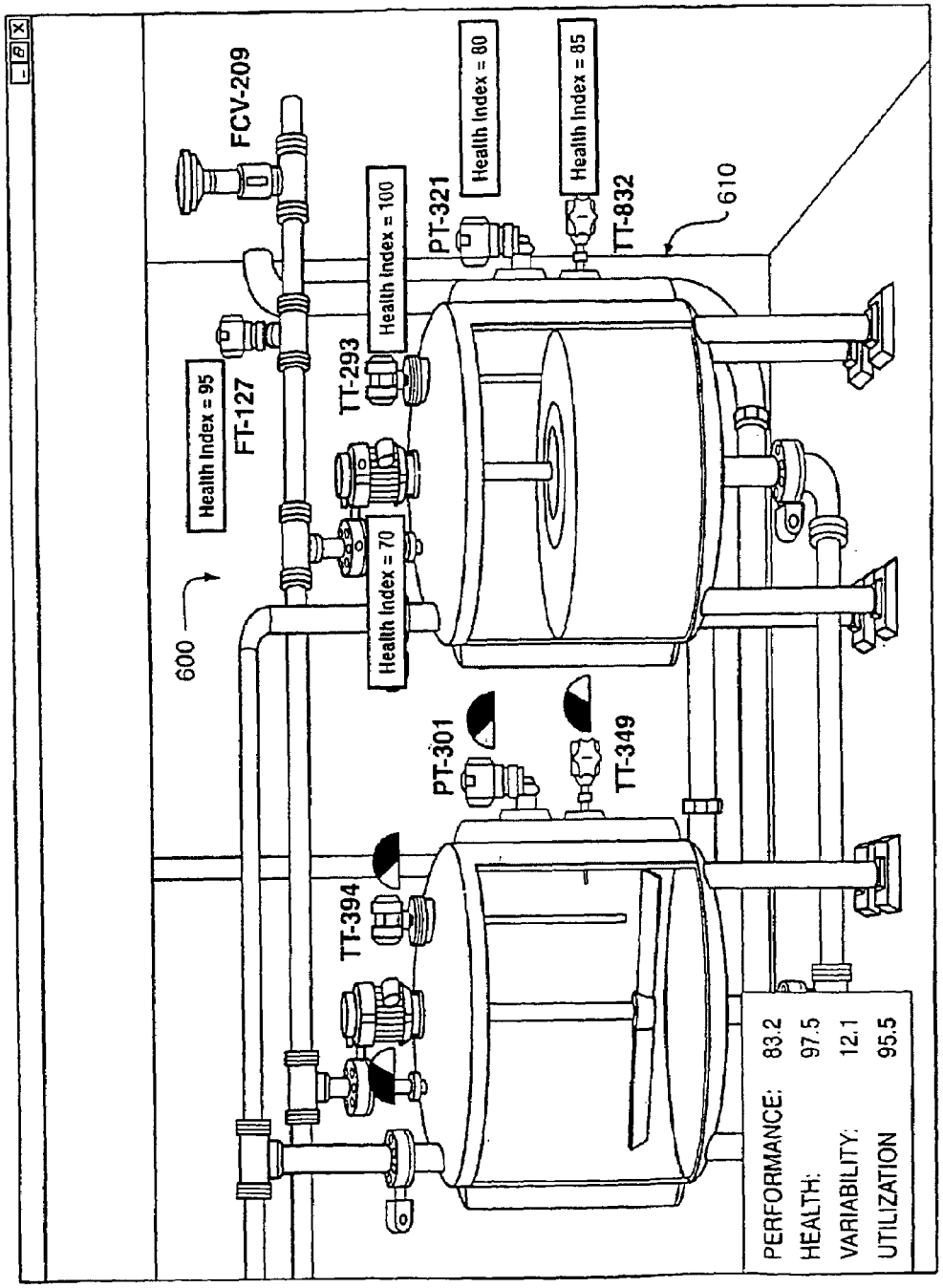
FIG. 14 is an exemplary graphical display that may be provided by a graphical user interface.

FIG. 14 is an exemplary graphical display that may be provided by the GUI to enable a user to quickly analyze the operational status and performance of a process area within the plant 10. As shown in FIG. 14, the GUI may graphically depict the physical equipment (and the interconnections therebetween) within a process area 600. Of course, it should be recognized that although a process area is depicted within the GUI display shown in FIG. 14, any other portion of the plant 10 such as, for example, a unit, sub unit, loop, device, etc. may be shown instead to achieve the same or similar results. In any event, the process area 600 is depicted as having a pair of tanks, a plurality of temperature transmitters, pressure transmitters, flow transmitters, etc. and pipes, all of which may be interconnected as shown in FIG. 14. Further, each of the physical devices may be displayed along with an associated alphanumeric identifier (e.g., TT-394) that uniquely identifies that device within the plant 10 and may also be displayed along with a graphic meter or gauge (i.e., the partially shaded semi-circular features) that enables a user to quickly determine the status of the sensing parameter associated with that device. For example, the GUI may display a graphic meter or gauge associated with a temperature transmitter and may shade more or less of the meter based on the temperature currently being sensed by the temperature transmitter. Importantly, one or more of the VI, HI, UI and PI values may be displayed for one or more of the devices shown within the area 600. By way of example only, the HI values for several of the devices that are connected to a tank 610 within the area 600 are displayed. However, more or fewer HI values could be displayed if desired. Additionally, different index values or groups of index values may be displayed for any of the devices that appear within the area 600 as desired. As can be appreciated from the display shown in FIG. 14, a user can quickly ascertain whether an area is performing properly and will continue to perform properly.

Further, a user can also quickly identify those devices, units, sub units, etc. that may need attention and/or which may be causing a particular problem.

It will also be understood that a user may view successively lower and lower entities within a plant and be provided information about the indexes associated with each of these different entities or views. Thus, for example, a user may look at a view of the plant and see a particular set of indexes for the plant. The user may then focus on one area, such as by clicking on one of the areas within the plant view, and see the indexes associated with that area. Similarly, by clicking on units within the displayed area, the indexes for different units may be viewed. Likewise indexes for loops, sub units, devices etc. may then be viewed by focusing in on these different entities from a view of an entity in which these entities are located. In this manner, a user can quickly find the cause of a lower than (or higher than) expected index at any point or level of the plant.

Figure 15:
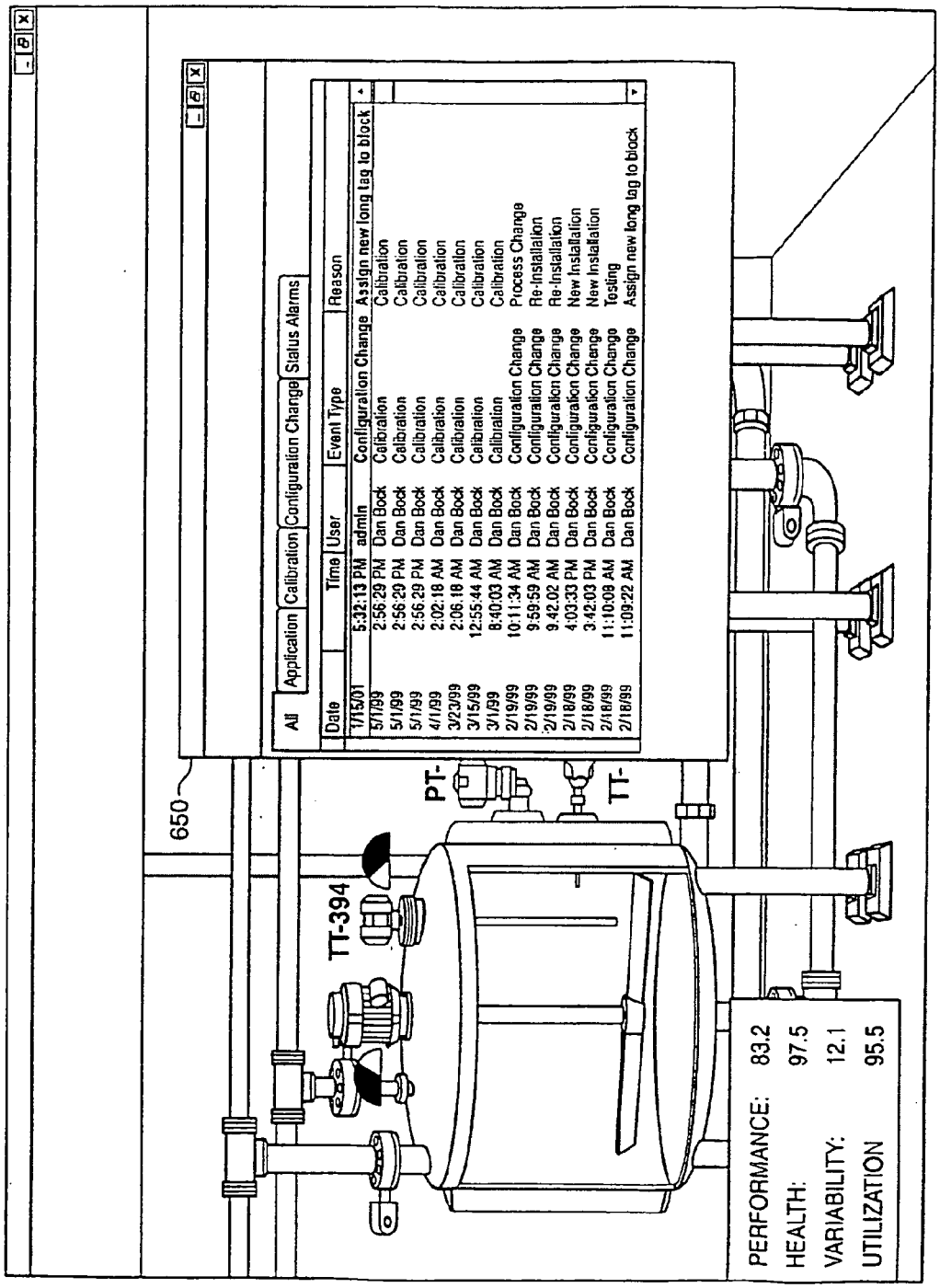
FIG. 15 is an exemplary depiction of a display that may be provided by a graphical user interface to enable a user to view audit trail information.

FIG. 15 is an exemplary depiction of a display that may be provided by the GUI to enable a user to view audit trail information in connection with any device used within the area 600. By way of example, a user may use a mouse to click on a given device or its alphanumeric identifier or, alternatively, may enter the identifier via a keyboard, to request a pop-up audit trail window 650 for that device. In this manner, a user can use the audit trail information to determine whether an improper or unacceptable index value may be related to a failure to calibrate the device properly or in a timely manner, whether a device has been configured properly or at all, etc.

Figure 16:
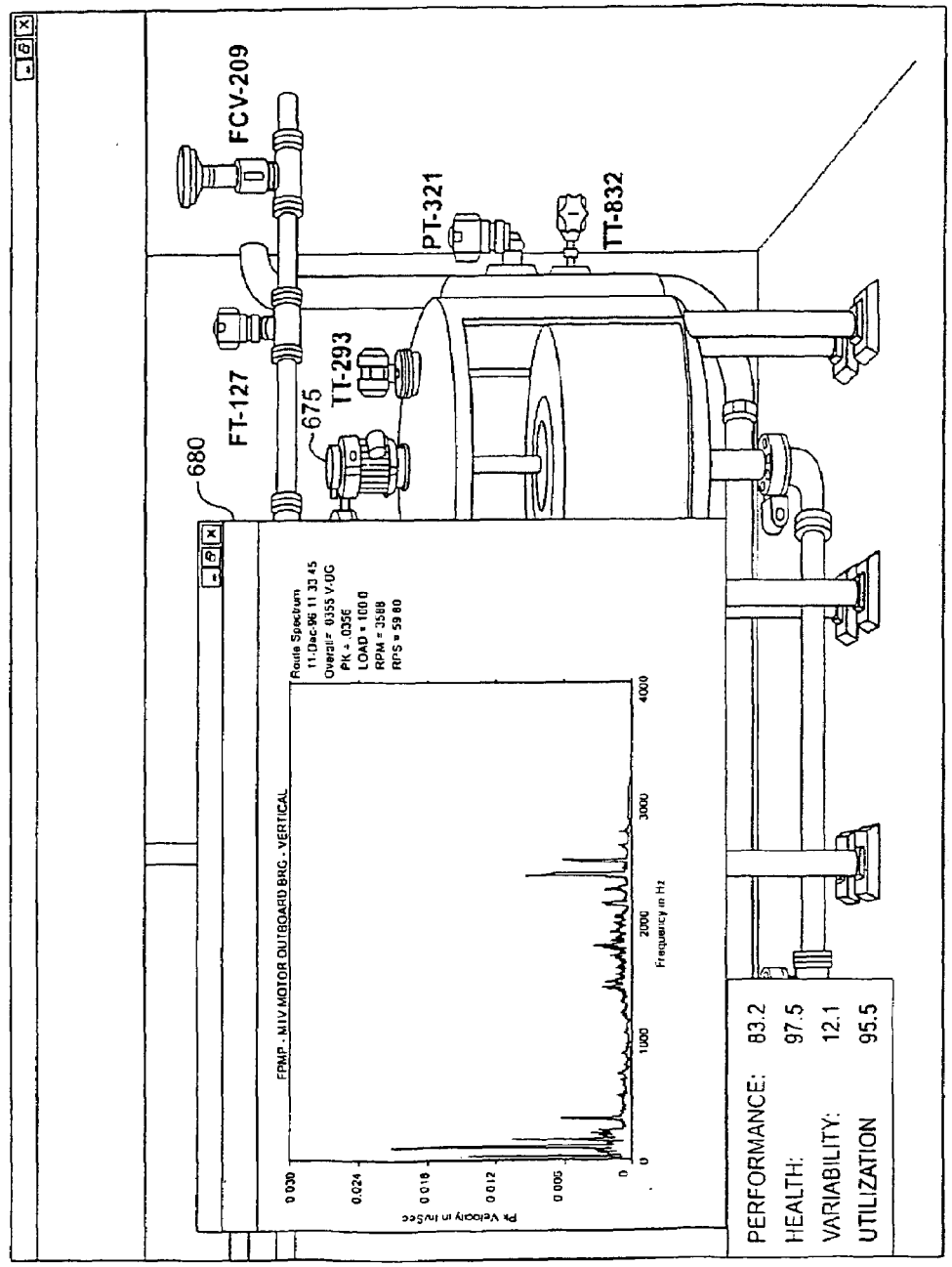
FIG. 16 is an exemplary depiction of a display that may be provided by a graphical user interface to enable a user to perform a more detailed analysis of data used to generate one or more indexes for a device.
Figure 17:
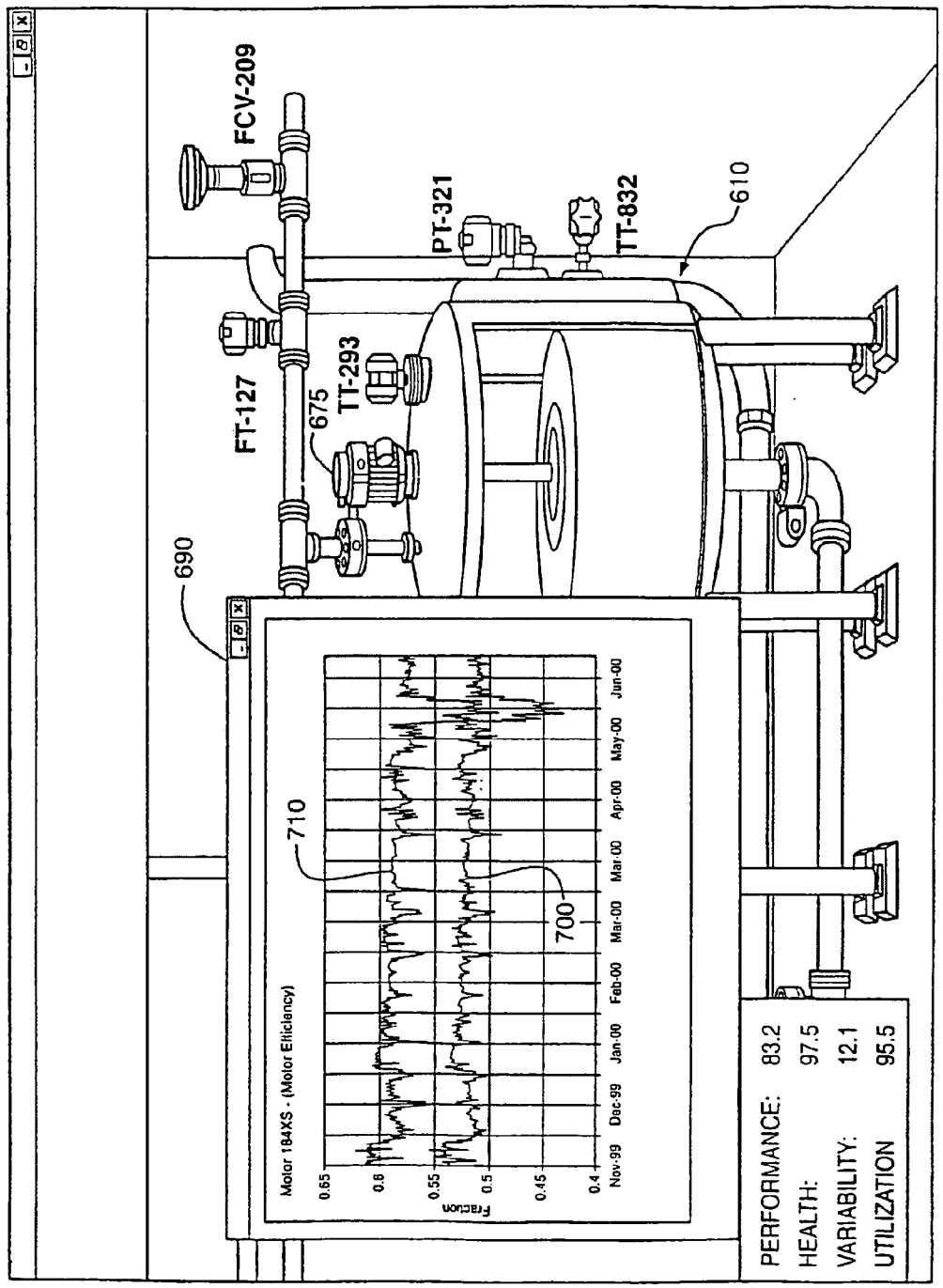
FIG. 17 is an exemplary depiction of a display that may be provided by a graphical user interface to enable a user to graphically view or monitor a performance characteristic of a device.

FIG. 16 is an exemplary depiction of a display that may be provided by the GUI to enable a user to perform a more detailed analysis of the data which may be used in generating one or more of the indexes for a particular device within the area 600 or to perform condition monitoring. By way of example only, a vibration analysis for a motor 675 may be displayed in a pop-up window 680. A user may request such a pop-up window in response to an abnormally high or an abnormally low index value for the unit affected by the motor 675 and/or may request the window if an index value associated with the motor is indicative of a possible problem. Furthermore, if desired, the GUI may automatically provide such pop-up windows containing a detailed data analysis for those devices, units, etc. that have one or more abnormal index values. Similarly, FIG. 17 is an exemplary depiction of a display that may be provided by the GUI to enable a user to graphically view or monitor a performance characteristic of a device within the area 600. By way of example, a pop-up window 690 including a graph of the efficiency of the motor 675 is provided in response to a user request or, alternatively, in response to an automatic request by the asset utilization expert 59. Such a pop-up window may be requested or needed if one or more the index values associated with the portion of the process being carried out by the tank 610 is abnormal. In particular, in this example, the user may recognize that the motor 675 has a poor PI value and/or that the area 600 has a poor PI value. As a result, the user may request more detailed information, such as that contained within the pop-up window 690 to determine whether a problem exists with the motor 675. Also, in this example, the pop-up window may contain a graph of the efficiency of the motor 675 over time where actual efficiency data 700, is graphed against theoretical or empirically derived maximum efficiency data 710. As discussed above, these two sets of efficiency data may also be used to calculate a PI value over time for the motor 675 by, for example, using the ratio of actual efficiency and theoretical maximum efficiency as the PI value.

Figure 18:
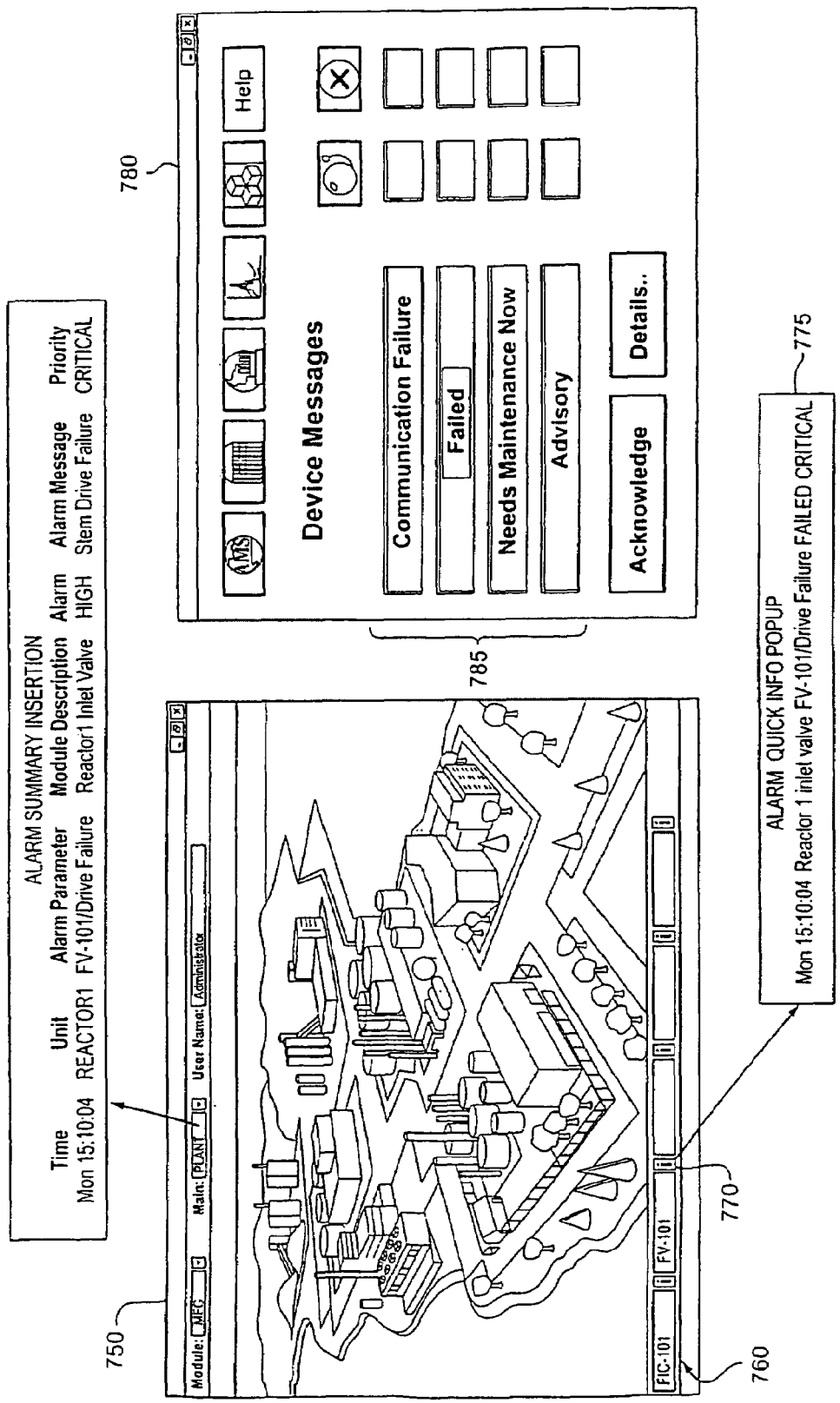
FIG. 18 is yet another exemplary depiction of a display that may be provided by a graphical user interface to enable a user to quickly investigate information within a plant.

FIG. 18 is yet another exemplary depiction of a display that may be provided by the GUI to enable a user to quickly investigate alarm information, conditions, etc. within the plant 10. A high level graphical view 750 of the plant 10 may include an alarm banner 760 having one or more pending alarms. Each of the alarms within the alarm banner may be represented using an alphanumeric indicator that is uniquely associated with the device which generated the alarm or event. Additionally, each of the alarms within the banner 760 may also include an information button 770, which may be selected by a user to generate a pop-up window 775 containing more detailed information relating to that particular alarm. Further, the user may also select the alphanumeric designator for the device causing a particular alarm to investigate the possible reasons for the alarm. When the alphanumeric designator is selected, a pop-up window 780 may be provided by the GUI. The pop-up window 780 may provide one or more response categories 785, which may facilitate the user's understanding of how a particular alarm should be addressed and within what time frame the alarm should be addressed. By way of example, the pop-up window 780 may indicate that a particular device is no longer communicating, that the device has failed, that the device needs maintenance immediately, or that the device requires maintenance or some other attention soon. Of course more, fewer and/or different response categories may be used instead. The alarm display generated by the GUI at this, point may be the integrated display disclosed in U.S. patent application Ser. No. 09/707, 580 (filed Nov. 7, 2000) which is hereby expressly incorporated by reference herein. Generally, this alarm display may show process alarms and alerts as well as other types of alarms like maintenance alarms and alerts. Furthermore, information about the alarm, such a specific information provided in the field 775 of the alarm banner may be sent to the GUI or to the asset utilization expert 59 along with the alarm.

While the data collection and distribution system 102 and the asset utilization suite 50 and other process elements have been described as preferably being implemented in software, they may be implemented in hardware, firmware, etc., and may be implemented by any other processor associated with the process control system 10. Thus, the elements described herein may be implemented in a standard multi purpose CPU or on specifically designed hardware or firmware such as an application specific integrated circuit (ASIC) or other hard wired device as desired. When implemented in software, the software routine may be stored in any computer readable memory such as on a magnetic disk, a laser disk, or other storage medium, in a RAM or ROM of a computer or processor, in any database, etc. Likewise, this software may be delivered to a user or a process control plant via any known or desired delivery method including, for example, on a computer readable disk or other transportable computer storage mechanism or over a communication channel such as a telephone line, the internet, etc. (which are viewed as being the same as or interchangeable with providing such software via a transportable storage medium). Also, while the suite 50 is described as possibly being or using a rule based expert, other types of expert engines could be used as well, including those which use other known data mining techniques.

Figure 19:
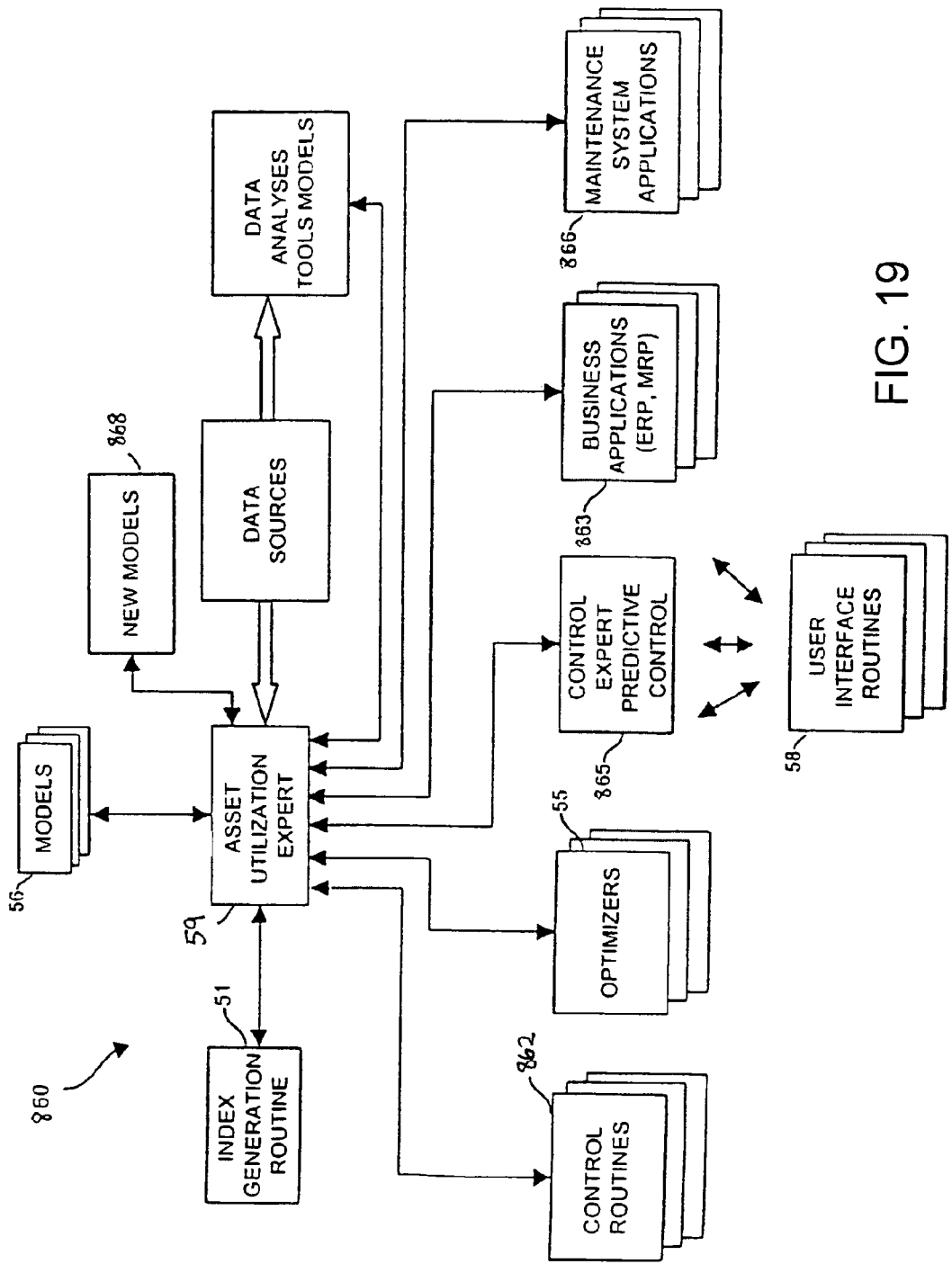
FIG. 19 is a data and information flow diagram with respect to the asset utilization expert within the plant of FIG. 1.

Referring now to FIG. 19, a data flow diagram illustrating some of the data flow between the asset utilization expert 59 and other computer tools or applications within the process plant 10 is provided. FIG. 19 will be described with reference to FIG. 1. In particular, the asset utilization expert 59 may receive information from numerous data collectors or data sources such as multiplexers, transmitters, sensors, hand held devices, control systems, radio frequency (RF) transceivers, on-line control systems, web servers, historians, control modules or other control applications within the process plant 10, interfaces such as user interfaces and I/O interfaces as well as data servers such as buses (e.g., Fieldbus, HART and Ethernet buses), valves, transceivers, sensors, servers and controllers and other plait assets such as process instrumentation, rotating equipment, electrical equipment, power generation equipment, etc. This data can take on any desired form based on how the data is generated or used by other functional systems. Still further, this data may be sent to the asset utilization expert 59 using any desired or appropriate data communication protocol and communication hardware such as the XML protocol discussed above. Generally speaking, however, the plant 10 will be configured so that the asset utilization expert 59 automatically receives specific kinds of data from one or more of the data sources and so that the asset utilization expert 59 can take predetermined actions with respect to that data.

Also, the asset utilization expert 59 receives information from (and may actually execute) data analysis tools such as typical maintenance data analysis tools which are currently provided today, performance tracking tools, such as those associated with devices, as well as performance tracking tools for process control systems like that described in U.S. patent application Ser. Nos. 09/256,585 and 09/499,445 identified above. The data analysis tools may also include, for example, a root cause diagnostics application which detects root causes of certain types of problems, event detection such as that described in U.S. Pat. No. 6,017,143, regulatory loop diagnostics, such as that disclosed in U.S. patent application Ser. No. 09/303,869 (filed May 3, 1999), which is hereby expressly incorporated by reference herein, impulse lines plugging detection applications, such as that described in U.S. patent application Ser. No. 09/257,896 (filed Feb. 25, 1999), which is hereby expressly incorporated by reference herein, other plugged line detection applications, device status applications, device configuration applications and maintenance applications, device storage, historian and information display tools, such as AMS, Explorer applications and audit trail applications. Still further, the expert 59 can receive data and any information from process control data analysis tools such as the advanced control expert 52, model predictive control process routines such as those described in U.S. patent application Ser. No. 09/593,327 (filed Jun. 14, 2000) and U.S. patent application Ser. No. 09/412,078 (filed Oct. 4, 1999), which are hereby expressly incorporated by reference herein, tuning routines, fuzzy logic control routines and neural network control routines, as well as from virtual sensors such as that described in U.S. Pat. No. 5,680,409, which may be provided within the process control system 10. Still further, the asset utilization expert 59 may receive information from data analysis tools related to rotating equipment such as on-line vibration RF wireless sensors and hand-held data collection units, oil analysis associated with rotating equipment, thermography, ultra-sonic systems and laser alignment and balancing systems, all of which may be related to detecting problems or the status of rotating equipment within the process plant 10. These tools are currently known in the art and so will not be described further herein. Still further, the asset utilization expert 59 may receive data related to power management and power equipment and supplies such as the applications 23 and 27 of FIG. 1, which may include any desired power management and power equipment monitoring and analysis tools.

In one embodiment, the asset utilization expert 59 executes or oversees the execution of mathematical software models 56 of some or all of the equipment within the plant 10, such as device models, loops models, unit models, area models, etc., which are run by; for example, the computer 30 or any other desired computer within process plant 10. The asset utilization expert 59 may use the data developed by or associated with these models for a number of reasons. Some of this data (or the models themselves) may be used to provide virtual sensors within the plant 10. Some of this data, or the models themselves, may be used to implement predictive control or real time optimal control within the plant 10. Some of the data generated by the models 56 may be used by the index generation routine 51 to generate indexes which are used in other applications, such as business and process control applications.

The asset utilization expert 59 receives data as it is generated or at certain periodic times over, for example, the bus 32 or other any communication network within the process plant 10. Thereafter, periodically or as needed, the asset utilization expert 59 redistributes the data to other applications or uses that data to generate and provide other information useful in different aspects of the control or operation of the process plant 10 to other function systems within the plant 10. In particular, the asset utilization expert 59 may supply data to cause the index generation routine 51 to create a series of composite indexes such as a performance index, a utilization index, a health index and a variability index associated with one or more of the devices, units, loops, areas, or other entities within the process plant 10. The generation and use of these indexes will also be discussed in more detail herein.

The asset utilization expert 59 may also provide data to and receive data from control routines 862 which may be located in process controllers or interfaces associated with those controllers, optimizers 55, business applications 863, maintenance applications 866, etc.

Furthermore, a control expert 865 (which may include a predictive process controller), which in the past simply assumed that the devices it was controlling either worked properly or not at all, can receive information from the asset utilization expert 59 related to the status or health of the devices it is controlling, such as the utilization, variability, health or performance indexes mentioned above or other information related to the operating status of devices, loops, etc. which can be taken into account when trying to control a process. The predictive controller 865, as well as the optimizers 55 may provide additional information and data to user interface routines 58. The predictive controller 865 or optimizer 55 may use the status information pertaining to actual current status of the devices in the network, as well as take into account goals and future needs such as those identified by business solution software provided from the asset utilization expert 59 as defined by, for example, business applications 863, to optimize control based on predictions within the control system.

Still further, the asset utilization expert 59 may provide data to and receive data from enterprise resource planning tools such as those typically used in business solutions or business computers 35 and 36. These applications may include production planning tools which control production planning, material resource planning, the work order generation tool 54 which automatically generates part orders, work orders, or supply orders for use in the business applications, etc. Of course, the part order, work order and supply order generation may be completed automatically based on information from the asset utilization expert 59, which decreases the time required to recognize that an asset needs to be fixed as well as the time is takes to receive the parts necessary to provide corrective action with respect to maintenance issues.

The asset utilization expert 59 may also provide information to the maintenance system applications 866, which not only alert maintenance people to problems immediately, but also take corrective measures such as ordering parts, etc. which will be needed to correct a problem. Still further, new models 868 may be generated using types of information that are available to the asset utilization expert 59 but that were previously unavailable to any single system. Of course, it will be understood from FIG. 19 that the asset utilization expert 59 not only receives information or data from the data models and the analysis tools but, also receives information from enterprise resource tools, maintenance tools and process control tools.

Moreover, one or more coordinated user interface routines 58 may communicate with the asset utilization expert 59 as well as any other applications within the plant 10 to provide help and visualization to operators, maintenance persons, business persons, etc. The operators and other users may use the coordinated user interface routines 58 to perform or to implement predictive control, change settings of the plant 10, view help within the plant 10, or perform any other activities related to the information provided by the asset utilization expert 59. As discussed above, the user interface routines 58 may include an operator guidance tool that receives information from the predictive controller 865 as well as information related to the indexes, which can be used by an operator or other user to help perform many functions such as viewing the status of a process or devices within the process, to guide the predictive controller 865 or to perform predictive or optimized control. Still further, the user interface routines 58 may be used to view data or to obtain data from any of the tools in the other parts of the process plant 10 via, for example, the asset utilization expert 59. For example, managers may want to know what is happening in the process or may need high level information related to the process plant 10 to make strategic plans.

As will be understood, therefore, once data is received at a central database and is converted to, for example, a common format, the data is stored in the database in some accessible manner and is made available to applications or users within the asset utilization expert 59. For example, applications related to process control, alarming, device maintenance, fault diagnostics, predictive maintenance, financial planning, optimization, etc. may use, combine and integrate the data from one or more of the different data sources to operate better than these applications have been able to operate in the past without data from vastly different or previously inaccessible data sources. The applications illustrated in FIG. 19 as being part of the asset utilization expert 59 may be any of the applications described in FIG. 1 or can be any other types of applications if so desired. Of course, both the data sources and the applications which use the collected data illustrated in FIG. 19 are exemplary in nature and more, less or different data sources and applications may be used. Likewise, the data sources themselves may be configured to receive data collected by the data collection and distributions system or the database. In this manner, different vendors or service providers, who may have proprietary applications, may collect certain data that they had not or were incapable of previously acquiring from the process plant which may enhance the products or services being offered by these service providers.

In one embodiment, it is expected that traditional process control service providers, who in the past have collected and generated data apart from the process control network using typically proprietary applications, will now provide the collected or generated data to asset utilization expert 59 which will then make that data available to other applications. These other applications can be applications executed within computers communicatively connected to the process control environment, such as applications within host devices, user interfaces, controllers, etc. Additionally, these other applications may be applications provided by or used by the traditional service organizations. In this manner, any application can now be designed to use any data generated within the process plant in any manner, whether by applications owned by the process system owners or applications owned and managed by service providers. As a result, there are many, many instances in which applications can be enhanced because they can use data that was previously unavailable to them. For example, a corrosion analysis service provider may be able to use data collected by a proprietary process control system or proprietary equipment monitoring application to enhance the reliability or predictability of the corrosion analysis. Such cross pollination of data from vastly different types of service providers and applications was previously unavailable.

As mentioned above, the asset utilization expert 59 can execute or oversee the execution of one or more mathematical or software models 56 that model the operation of a particular plant or entities within the plant, such as devices, units, loops, areas, etc. These models may be hardware models or they may be process control models. In one embodiment, to generate these models, a modeling expert divides the plant into component hardware and/or process control parts and provides a model for the different component parts at any desired level of abstraction. For example, the model for a plant is implemented in software and is made up of or may include a set of hierarchically related, interconnected models for the different areas of the plant. Similarly, the model for any plant area may be made up of individual models for the different units within the plant with interconnections between the inputs and outputs of these units. Likewise, units may be made up of interconnected device models, and so on. Of course, area models may have device models interconnected with unit models, loop models, etc. In this example model hierarchy, the inputs and outputs of models for tile lower level entities, such as devices, may be interconnected to produce models for higher level entities, such as units, the inputs and outputs of which may be interconnected to create still higher level models, such as area models, and so on. The way in which the different models are combined or interconnected will, of course depend on the plant being modeled. While a single, complete mathematical model for the whole plant could be used, it is believed that providing different and independent component models for different portions of or entities within the plant, such as areas, units, loops, devices, etc. and interconnecting these different models to form larger models is useful for a number of reasons. Furthermore, it is desirable to use component models that can be run independently of one another as well as together with other component models as part of a larger model.

While highly mathematically accurate or theoretical models (such as third or fourth order models) may be used for the entire plant or for any or all of the component models, the individual models need not necessarily be as mathematically accurate as possible and could be, for example, first or second order models or other types of models. These simpler models can generally be executed more quickly in software and can be made more accurate by matching the inputs and outputs of the models with actual measurements of inputs and outputs made within the plant in a manner described herein. In other words, the individual models may be tuned or tweaked to accurately model the plant or the entities within the plant based on actual feedback from the plant.

Examples of hierarchical models that may be employed were discussed with reference to FIGS. 7A and 7B.

The use of models provides many new types of data or information for the business applications, process control applications and asset maintenance and monitoring applications in particular, the models can be used to perform performance monitoring and to produce a performance index which indicates the relative performance of a device, unit, area, etc., within a plant. This performance index may be a measure of the performance of an entity with respect to the possible performance of that entity. Furthermore, while device and unit models have been discussed above, similar models could be made and executed for process control entities, such as loops, units, etc. to provide performance measures and optimization criteria for these types of entities as well. Also, as indicated above, models may, in some cases, be used to measure or indicate the health of certain devices or other entities and to provide a health index indicative of these entities. For example, the error measurements of certain input and output sensors as determined by the regression analysis used on certain models may be used as or converted into an indication of the health of those devices. Also, other information not otherwise available to the process controller, such as model parameters and virtual sensor measurements based on the models could be provided to the process controllers or to the business persons for use in numerous manners.

Besides performance and health indexes, the asset utilization expert 59 can assist the index generation routine 51 in creating other types of indexes such as a utilization index and a variability index. A variability index indicates how much some signal into or out of, or some other parameter associated with a device, loop, unit, etc. varies as compared to how much this signal or parameter is expected to vary. The data needed to create this variability index may be collected by the asset utilization expert 59 and provided to the index generation routine 51 at any desired or convenient times. Of course, the normal amount of variation of a signal or parameter may be set by a manufacturer, engineer, operator or maintenance person familiar with the entity or may be based on a statistical measure (such as an average, standard deviation, etc.) associated with that or other similar entities within the plant and this normal or expected variation may be stored by or updated within the index generation routine 51.

Figure 20:
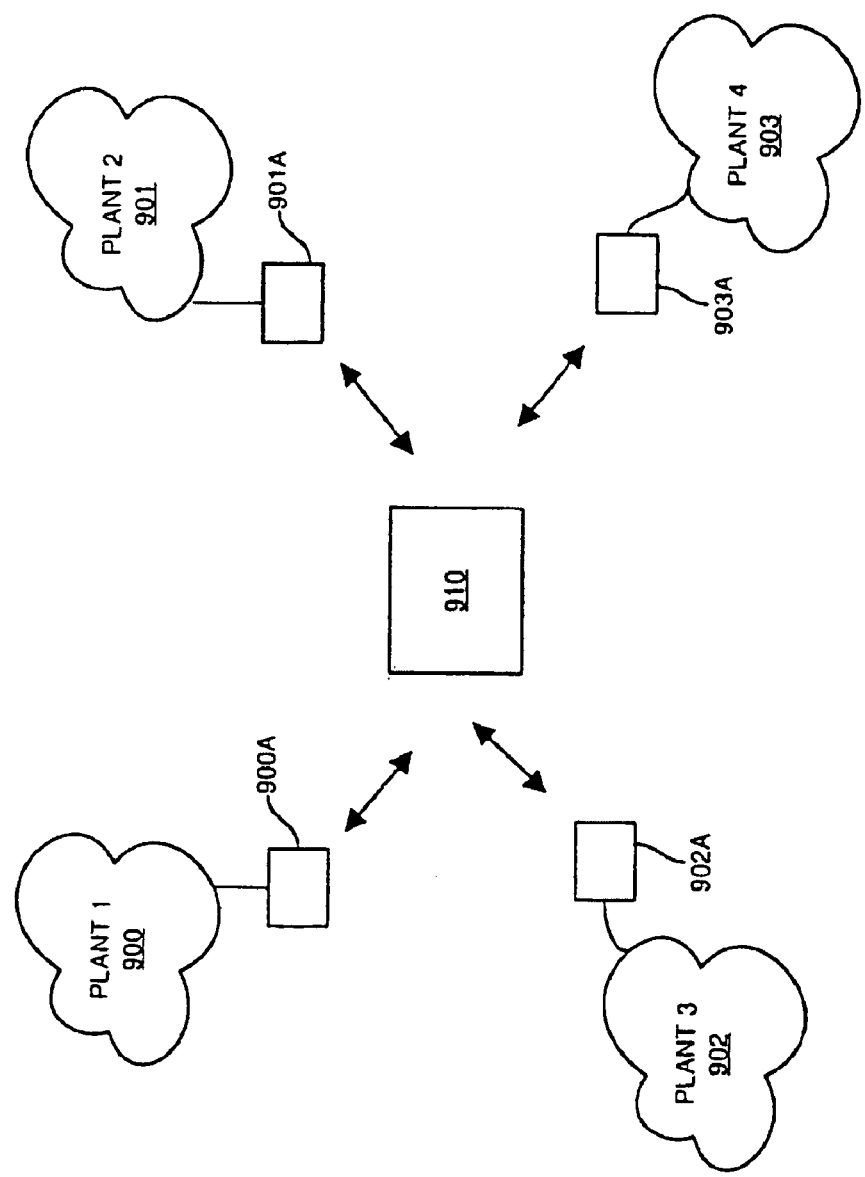
FIG. 20 is a block diagram of a remote monitoring facility connected to multiple process plants via a communication network.

Referring now to FIG. 20, a method of remotely providing access to models, optimizers and other data analysis tools such as performance monitoring tools for one or more process plants will be described. As illustrated in FIG. 20, one or more process plants 900, 901, 902 and 903 operate independently. Each of the plants 900-903 periodically collects data pertaining to the plant and then sends that data to a data processing facility or remote monitoring facility 910. To accomplish this function, each of the plants 900-903 has a user interface or server 900A-903A and these servers are connected via any desired communication network, such as the internet or the worldwide web, to the remote monitoring facility 910.

Figure 21:
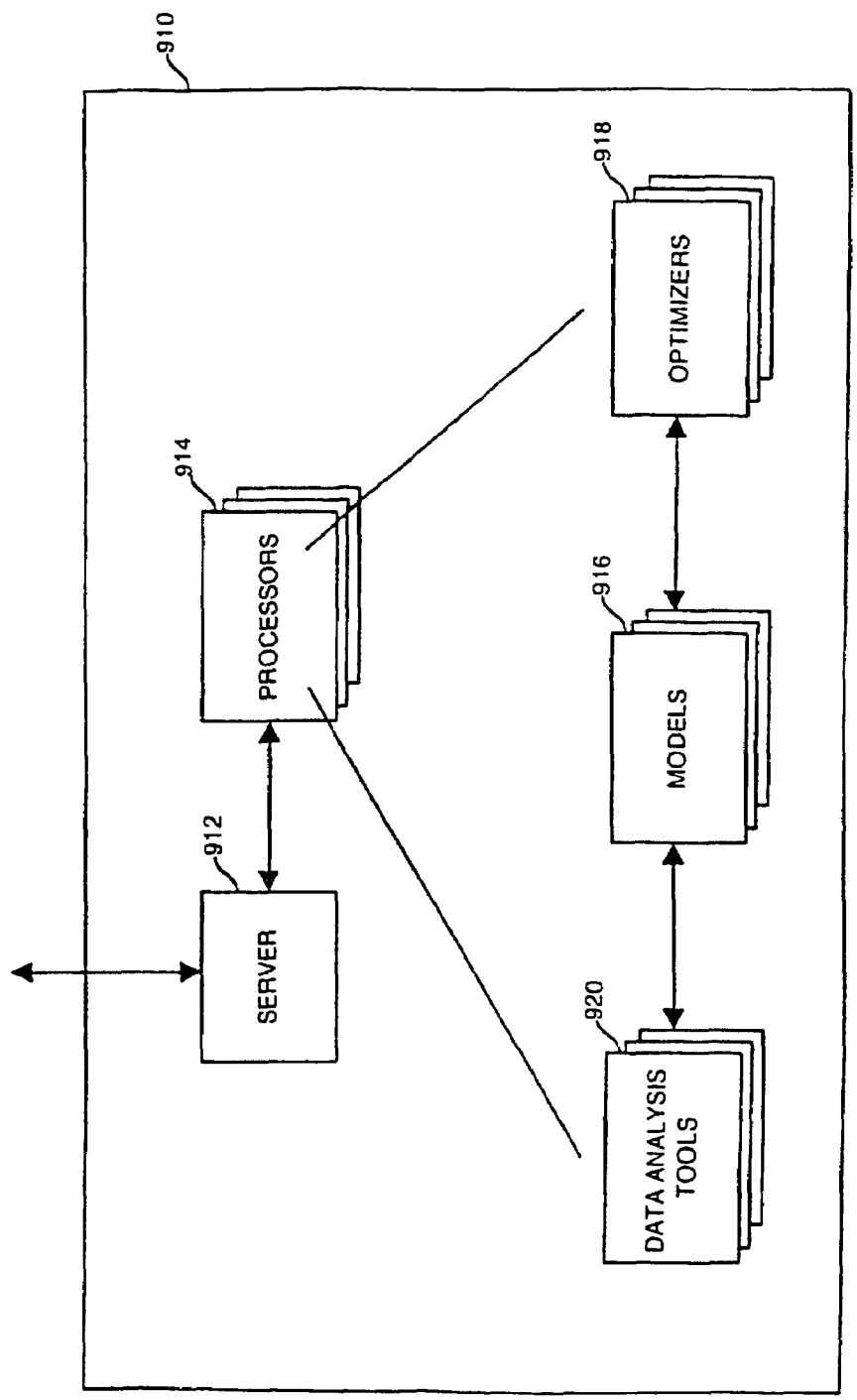
FIG. 21 is a more detailed block diagram of the remote monitoring facility of FIG. 20.

As illustrated in FIG. 21, the remote monitoring facility 910 includes a web server 912 through which the processes 900-903 communicate with the remote monitoring facility 910. The remote, monitoring facility 910 also includes one or more processors 914 having associated databases which store and execute a number of process monitoring applications or tools. In particular, each processor 914 may have access to and execute models 916, such as component models described herein, which have been created to model one or more of the plants 900-903 or entities within those plants. The models 916 may include different component models for each of the different plants 900-903 and these models 916 may be altered or changed by persons in the plants 900-903 via communications with the facility 910 to, for example, reflect changes within the plants 900-903. The processors 914 may also store and execute real time optimizers or any other kinds of optimizers 918 which can be implemented as described herein with respect to FIGS. 1 and 2 using data from the processes 900-903. Still further, processors 914 may have access to and execute other data monitoring tools 920, including, for example, any of the applications or tools within any of the computer systems of FIG. 1, such as any of the process control tools, process monitoring tools, equipment or device monitoring tools, index generation tools, work order generation tools, business or other tools or applications described herein. In one example, the process monitoring tool described in U.S. patent application Ser. Nos. 09/256,585 and 09/499, 445 may be used to monitor process parameters.

During operation, any of the processes 900-903, may at convenient times collect input and output data associated with the process and provide such data to the remote monitoring facility 910 via one of the servers 900A-903A and the World Wide Web, internet or other communication network connected to the server 912. Upon receipt of the data from a plant, an appropriate one of the processors 914 accesses that data and executes the appropriate process monitoring and condition monitoring tools for that plant to detect problems within the plant based on the collected data, to provide condition, plant or process monitoring for the plant, or to perform optimization for the plant. Of course, the data collected at the plant and sent to the remote monitoring facility 910 is data previously determined to be necessary to run the desired models 916, optimizers 918 or other data analysis tools 920 and is collected and sent to the facility 910 at a periodic or non-periodic rate that is appropriate for the tools or models being executed. Thus, for optimizers, data may need to be collected and sent at a different rate than for models or for performance, process or asset monitoring tools. Of course, as part of an optimization or performance, condition or process monitoring exercise, any appropriate models or other tools may be executed and the execution of these models or other tools generally follows the principles discussed above with respect to these same tools in the plant 10 of FIG. 1.

In any event, after executing the models, data analysis or optimizer tools, the processor 914 places the results back on the server 912 where these results can be picked up by the appropriate one of the plants 900-903 at any desired time. Alternatively or additionally, these results may be sent directly to the appropriate one of the plants 900-903 by the server 912. The data resulting from the analysis can be any desired performance modeling data, plots or charts including, for example, those described above with respect to the user interface routines or GUI routine 58. The results could also be suggestions by, for example, an optimizer for making changes to the plants, indexes for the plants, or any other results capable of being provided by these types of tools.

In one embodiment, the a real time optimizer, such as that described above, may be executed on a real time basis, assuring that the plants 900-903 provide sufficient data in a timely periodically manner so as to enables the proper execution of this optimizer. If desired, the servers 900A-903A may automatically collect and send the appropriate data to enable proper operation of the optimizer. In one embodiment, the plants may include the asset utilization expert 59 described herein or any other expert data collection tools for use in assuring that the proper data is sent to the remote monitoring facility 910 in a timely or periodic manner.

In this manner, the remote monitoring facility 910 can execute the software for asset, performance, condition and process monitoring as well as executing one or more optimizers for different plants. This, in turn, means that the plants 900-903 do not need to include the processing power or applications for these purposes, which may be less expensive for the plants. Of course, the plants may pay on a per usage basis or on some other predetermined fee schedule for use of the remote monitoring facility 910. If desired, the remote monitoring facility 910 may contract to get a portion of the profits and/or losses of the plant based on the use of the tools at the facility 910 and the implementation of the results of those tools.

If desired, each of the plants 900-903 may update the models 916 stored within the remote monitoring facility 910 applicable to those plants by sending new or updated models to the server 912 using any desired communication format such as XML, HTML, etc. Still further, the remote monitoring facility 910 may include generic templates for different process plants, areas, units, devices, loops, etc. which may be downloaded to each of the plants 900-903 via the server 912 and these templates may be altered at the plants 900-903 to reflect the actual operation of those plants. The updated models may then be sent back to the remote monitoring facility 910 as models to be implemented in asset, condition or process monitoring or in the optimizers for the plant. In this manner, changes to the plants 900-903 may be adequately or accurately reflected within the remote monitoring facility 910.

While the asset utilization expert 59 and other process elements have been described as preferably being implemented in software, they may be implemented in hardware, firmware, etc., and may be implemented by any, other processor associated with the process control system 10. Thus, the elements described herein may be implemented in a standard multi-purpose CPU or on specifically designed hardware or firmware such as an application-specific integrated circuit (ASIC) or other hard-wired device as desired. When implemented in software, the software routine may be stored in any computer readable memory such as on a magnetic disk, a laser disk, or other storage medium, in a RAM or ROM of a computer or processor, in any database, etc. Likewise, this software may be delivered to a user or a process plant via any known or desired delivery method including, for example, on a computer readable disk or other transportable computer storage mechanism or over a communication channel such as a telephone line, the internet, etc. (which are viewed as being the same as or interchangeable with providing such software via a transportable storage medium). Also, while the expert 59 is described as possibly being a rule-based expert, other types of expert engines could be used as well, including those which use other known data mining techniques.

Figure 22:
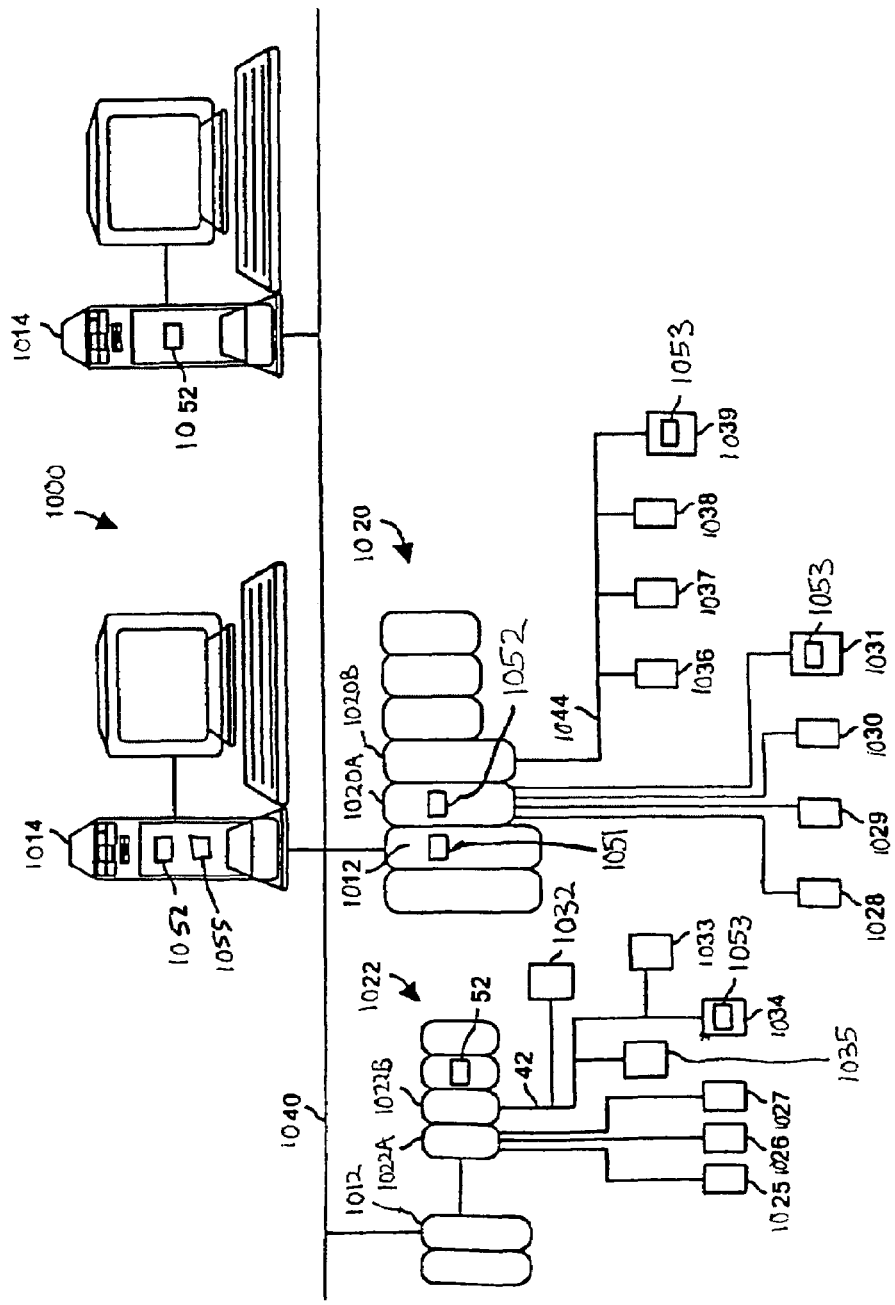
FIG. 22 is a block diagram of a process control system in which Fieldbus devices and HART devices having enhanced alert or alarm capability may be used.

Referring again to FIG. 1, the process plant 10 may include one or more control systems 12 and 14. FIG. 22 illustrates an example process control system 1000. The process control network or system 1000 includes one or more process controllers 1012 connected to one or more host workstations or computers 1014 (which may be any type of personal computer or workstation) and banks of input/output (I/O) devices 1020, 1022, each of which is connected to one or more field devices 1025-1039. The controllers 1012 may be, for example, DeltaV™ controllers sold by Fisher-Rosemount Systems, Inc., and are communicatively connected to the host computers 1014 via, for example, an Ethernet connection 1040 or any other suitable communication link, including the Internet. Likewise, the controllers 1012 are communicatively connected to the field devices 1025-1039 using any desired hardware and software associated with, for example, standard 4-20 mA devices and/or any smart communication protocol such as the Fieldbus or HART protocols. As is generally known, the controllers 1012 implement or supervise process control routines stored therein or otherwise associated therewith and communicate with the field devices 1025-1039 to control a process in any desired manner.

The field devices 1025-1039 maybe any types of devices, such as sensors, valves, transmitters, positioners, etc., while the I/O cards within the banks of I/O devices 1020 and 1022 may be any types of I/O devices conforming to any desired communication or controller protocol such as HART, Fieldbus, Profibus, etc. In the embodiment illustrated in FIG. 22, the field devices 1025-1027 are standard 4-20 mA devices that communicate over analog lines to the I/O card 1022A, the field devices 1028-1031 are illustrated as HART devices connected to a HART compatible I/O device 1020A, and the field devices 1032-1039 are Fieldbus field devices, that communicate over a digital bus 1042 or 1044 to the I/O cards 1020B or 1022B using Fieldbus protocol communications.

Each of the controllers 1012 is configured to implement a control strategy using function, transducer and resource blocks. As is well known, each block is a part (e.g., a subroutine) of an overall control routine and operates in conjunction with other blocks (via communications called links) to implement process control loops within the process control system 1000. Function blocks and transducer blocks typically perform input functions, such as those associated with a sensor or other process parameter measurement device, control functions, such as those associated with a control routine that performs PID control, fuzzy logic control, etc., or output functions that control the operation of some device, such as a valve, to perform some physical function within the process control system 1000. Of course, hybrid and other types of blocks exist.

Function blocks maybe stored in and executed by the controller 1012, which is typically the case when function blocks are used for, or are associated with, standard 4-20 mA devices arid some types of smart field devices, or maybe stored in and implemented by the field devices. While the description of the control system 1000 is provided herein using a function, transducer and resource block control strategy, the control strategy could also be implemented using other techniques such as ladder logic, sequential flow charts, etc. and using any desired proprietary or non-proprietary programming language.

The process control system 1000 may also include one or more business systems that may be implemented within one or both of the workstations 1014 or within one or more other computer systems (not shown) or other types of platforms (e.g., web servers, wireless communication devices, etc.) that are communicatively coupled to the process control system 1000. These business systems may include enterprise asset management systems, abnormal situation management systems, etc. that interoperate with the process control system 1000 to efficiently manage its operation. It is important to recognize that the various devices, systems, etc. Making up the process control system 1000 may be communicatively coupled via one or more types of communication networks, including the Internet. Preferably, a computerized maintenance system (CMMS) 1055 is executed within one of the workstations 1014. However, the CMMS 1055 may be executed within any other workstation, server or computer system that is communicatively coupled to the process control system 1000, if desired.

Figure 24:
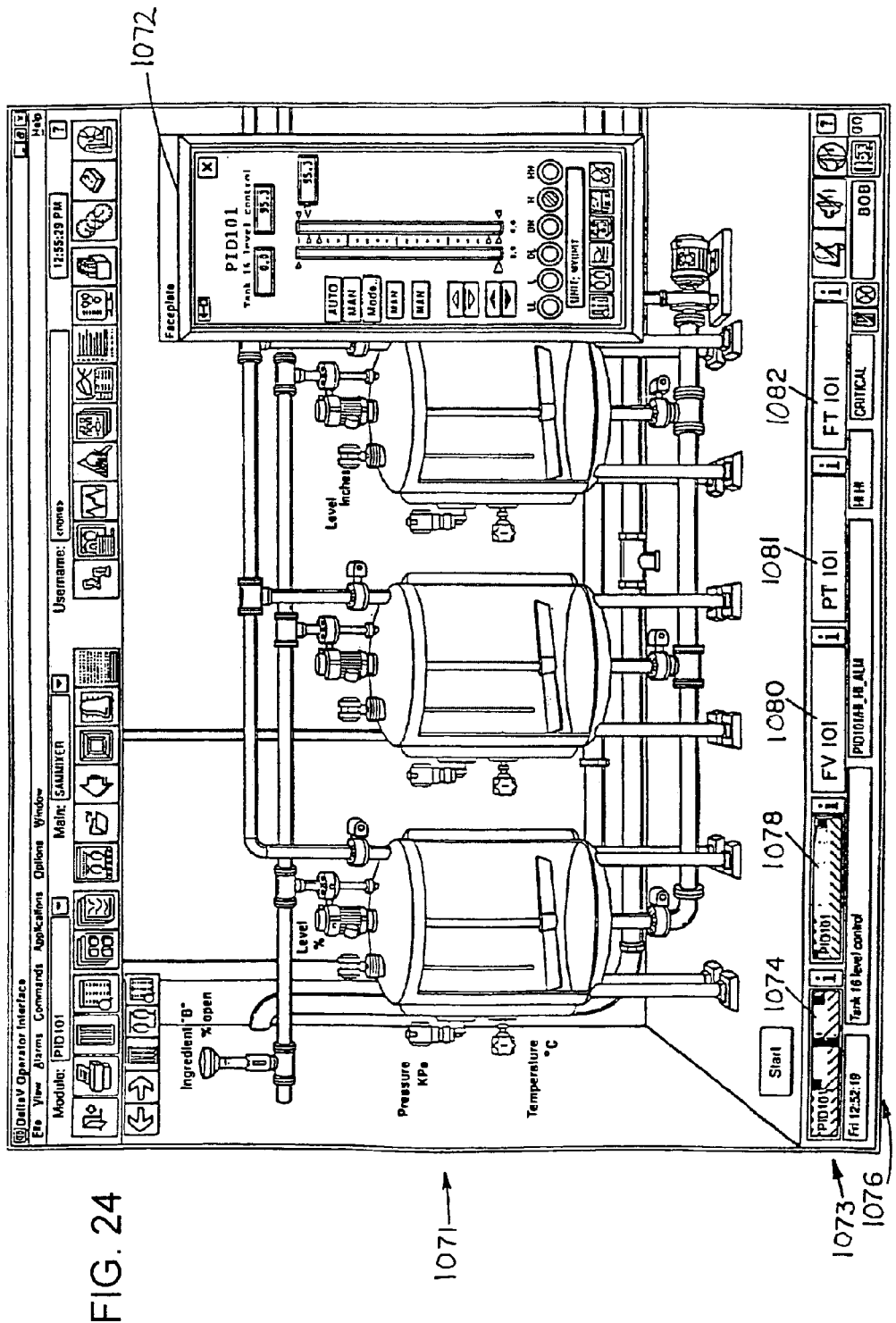
FIG. 24 is an exemplary user interface screen that may be generated by the alarm display and interface system used in the process control system of FIG. 1.

In the process control system 1000 shown in FIG. 22, one or more of the host devices 1014 functions as an operator workstation and has alarm processing software 1050 stored therein. Generally speaking, the alarm processing software 1050 displays information about the process control system 1000 pertinent to the system operator's or user's understanding or ability to view the current operational status of the process with respect to the alarms present in the system. For example, the alarm processing software 1050 may display an alarm banner having alarm indications, therein and a primary control display illustrating a section of the process control system 1000, including the devices and other equipment associated with that section of the process control system 1000 relevant to one or more of the alarms being displayed within the alarm banner. The primary control display may provide information about the current state of the process control system 1000, such as the level of a fluid in a tank, the flow characteristic of a valve and other fluid lines, the settings of equipment, the readings of sensors, the status of a device, etc. An example of such a display is illustrated in FIG. 24. An operator may use the alarm processing software 1050 to view different parts of the process control system 1000 or equipment within the process control system 1000. Of course, the alarm processing software 1050 communicates with the controllers 1012 and, if necessary, the field devices 1025-1039, any of the banks of I/O devices 1020 and 1022 or any other devices to obtain the relevant values, settings and measurements associated with or made in the process control system 1000 to create the interface screen on the operator display of the workstation 1014.

The alarm processing software 1050 is configured to receive alarm messages created by alarm generating software within some or all of the controllers 1012, the I/O devices 1020 and 1022 and/or the field devices 1025-1039. This alarm processing software 1050 is generally illustrated, by way of example only, as software elements 1051, 1052 and 1053 in FIG. 22. Generally speaking, the alarm processing software 1050 receives different categories of alarm messages including, for example, process alarms (which are typically generated by process control software modules, such as those made up of communicatively interconnected function blocks, forming process control routines used during runtime of the process), hardware alarms, such as alarms generated by the controllers 1012, I/O devices 1020 and 1022 or other workstations 1014, pertaining to the state or functioning condition of these devices, and device alarms, which are generated by some or all of the field devices 1025-1039 to indicate problems or potential problems associated with those devices. These or other categories of alarms may be generated in any desired manner. For example, it is well known to have the function blocks or software modules that are used to implement process control functions generate process alarms, and these process alarms are, typically sent in the form of alarm messages to operator interfaces for display. Also, some smart devices, controllers, I/O devices, databases, servers, workstations, etc. may use any desired proprietary or non-proprietary software to detect problems, errors, maintenance alerts, etc. and may send alarms or alerts indicating these conditions to the operator interface within the workstation 1014. In particular, many devices, such as controllers, I/O devices and smart field devices are provided with software and/or sensors that detect hardware problems, such as a stuck valve plug, broken parts, maintenance concerns, etc. and may generate signals or messages, indicting these conditions.

If desired, the alarm processing software 1050 may receive and filter alarms based on a number of factors. In particular, the alarm processing software 1050 may filter alarms based on the workstations or computer systems in which the software 1050 is executed, the identity of the person logged into the workstation, and operator configurable settings, such as category, type, priority, status, time of generation, etc. of the alarm. For example, the alarm processing software 1050 may filter alarms to selectively display alarms from the areas or sections of the plant that the workstation executing the alarm processing software 1050 is configured to receive. In other words, alarms for certain areas or sections of the plant may not be displayed at particular workstations. Instead, each workstation may be limited to displaying alarms for one or more specific areas of the plant. Likewise, alarms may be filtered based on an operator's identity so that individual operators may be limited to viewing certain categories, types, priority levels, etc. of alarms or may be limited to viewing alarms from a section or subsection (e.g., an area) of the plant. The alarm processing software 1050 may also filter alarms for display based on an operator's security clearance. In general, these workstation and operator filtering settings are referred to herein as workstation and operator scope controls.

The alarm processing software 1050 may also filter the viewable alarms (i.e., those within the workstation and operator scope controls) based on operator configurable settings including, for example, the alarm category (e.g., process, device or hardware alarm), alarm type (e.g., communication, failure, advisory, maintenance, etc.), the alarm priority, the module, device, hardware, node or area to which the alarm pertains, whether the alarm has teen acknowledged or suppressed, whether the alarm is active, etc.

Some or all of the Fieldbus devices 1032-1039 may include three independently reportable device alarm or alert categories that have not previously been used in connection with Fieldbus devices. Generally speaking, each of these independently reportable alarm categories may correspond to a different level of severity and, thus, alarms or alerts within each category may require a different type of response by the system user or operator.

In particular, the Fieldbus devices 1032-1039 may provide an alarm parameter FAILED_ALM, which is generally indicative of a problem within a device that has ceased to operate properly or which may not be operating at all, thereby preventing the device from performing its normal sensing and/or control functions. For example, a memory failure within a device, a drive failure within a device, or any other device failure that may require immediate attention (i.e., maintenance, repair, etc.) may be reported using the FAILED_ ALM parameter. The Fieldbus devices 1032-1039 may also provide an alarm parameter MAINT_ALM, which is generally indicative of a condition detected within a device that is associated with a requirement for some type of device maintenance, but which is not severe enough to merit reporting via the FAILED_ALM parameter. Device conditions reported using the MAINT_ALM parameter are preferably, but not necessarily, conditions that result from some type of degradation, wear, fatigue, etc. within a device that could ultimately result in failure of the device, but which do not necessarily affect the ability of the device to sense, to control or to perform any other needed function. For example, sticking valves, impulse lines that are becoming plugged, etc. are device conditions that may result in the reporting of an alarm or alert via the MATIN_ALM parameter. Additionally, the Fieldbus devices 1032-1039 may provide an alarm parameter ADVISE_ALM, which is generally indicative of a condition detected within a device that only merits an alert or alarm of an advisory nature. Generally speaking, alarms or alerts that are reported using the ADVISE_ALM parameter do not have any impact on the operation of the device or the process being controlled and/or monitored using the device. For example, a grounding problem detected by a magmeter, a transient over temperature or a transient over pressure detected by a sensor may be reported using the ADVISE_ALM parameter.

Thus, in contrast to the BLOCK_ALM and BLOCK_ERR parameters used by traditional Fieldbus devices, the independently reportable FAILED_ALM, MAINT_ALM and ADVISE _ALM parameters described herein enable a Fieldbus device to simultaneously report multiple alarms or alerts having different levels of severity. In other words, a single Fieldbus device can, using the independently reportable alarms described herein, report a grounding problem, which does not require any immediate attention, using the ADVISE_ALM and at the same time that Fieldbus device can report a more severe condition such as, for example, a sensor failure that requires immediate attention using the FAILED_ ALM parameter, regardless of whether the ADVISE_ALM has been acknowledged or cleared by the system operator.

Preferably, but not necessarily, each of the FAILED_ALM, MAINT_ALM and ADVISE_ALM parameters described herein are formed using a thirty-two bit word based on any desirable data format or type such as, for example, DS-72 or DS-71, which are both well known IEEE standards and, thus, will not be described further herein. Each bit within each thirty-two bit word may be representative of a unique device condition to be reported using the alarm parameter corresponding to that thirty-two bit word. Thus, thirty-two device conditions at each of the three different levels of severity (i.e., FAILED_ALM, MAINT_ALM and ADVISE_ALM) for a total of ninety-six unique alarm or alert conditions may be reported by each Fieldbus device. If desired, one bit within each of the independently reportable alarms FAILED_ALM, MAINT_ALM and ADVISE_ALM may be used for "other" conditions that are not specifically defined, thereby enabling the devices to more flexibly provide for the detection of a variety of device conditions which may not be anticipated during the design of the device and/or which may be needed by a particular user.

While, in general, a lower severity alarm or alert may be reported using the ADVISE_ALM or MAIN_ALM parameters without affecting the ability of a Fieldbus device to simultaneously report a higher severity alarm using the FAILED_ALM parameter, multiple active conditions (i.e., multiple detected device conditions) within a particular alarm parameter may not result in multiple alarm events being sent to the operator workstation 1014. For example, if one of the Fieldbus devices detects an over pressure condition and an over temperature condition, the bits corresponding to these conditions will be set within the ADVISE_ALM parameter for that device. However, the first detected condition will cause an alarm event to be generated and sent to the operator workstation 1014, while any subsequently detected condition will cause another alarm event to be generated and sent to the workstation only after the alarm event associated with the earlier or first detected condition is cleared or acknowledged by the system operator or user. As a result, if the Fieldbus device detects the over pressure condition first, the subsequently detected over temperature condition will not generate an alarm event until the system user or operator clears or acknowledges the over pressure alarm or alert.

The FAILED_ALM, MAINT_ALM and ADVISE_ALM parameters may be independently reported to the system user or operator via one of the workstations 1014 using the Fieldbus alarm message format described above (i.e., the message format including a block identification field, a subcode field, etc.). Further, each of the thirty-two possible conditions associated with each of the FAILED_ALM, MAINT_ALM and ADVISE_ALM parameters is preferably, but not necessarily, represented using a unique subcode when these alarms are sent to a system workstation using the Fieldbus alarm messaging format. Each Fieldbus device includes definitions of the subcodes associated with each of the possible conditions for each of the FAILED_ALM, MAINT_ALM and ADVISE_ALM parameters. Also, each Fieldbus device may define a unique textual message that is descriptive of the condition associated with each of the subcodes. Although each subcode preferably corresponds to a unique device condition and, thus, a unique textual message, it may be desirable in some situations to use a single textual message for more than one device condition.

The independently reportable device alarm parameters described herein may be filtered by each device to enable or to disable the reporting of an alarm or alert in response to one or more of the possible device conditions (i.e., the ninety-six possible conditions). Each of the Fieldbus devices 1032-1039 that are capable of reporting alarms using the independently reportable FAILED_ALM, MAINT_ALM and ADVISE_ALM parameters described herein may further include an active alarm parameter and a mask parameter for each of the independently reportable alarm parameters. In particular, each of the Fieldbus devices 1032-1039 may include FAILED_ACTIVE and FAILED_MASK parameters, which correspond to the reportable FAILED_ALM parameter, MAINT_ACTIVE and MAINT_MASK parameters, which correspond to the reportable MAINT_ALM parameter, and ADVISE_ACTIVE and ADVISE_MASK parameters, which correspond to the reportable ADVISE_ALM parameter. The mask and active parameters are preferably, but not necessarily, implemented using an unsigned thirty-two bit data format or type. Of course, any other suitable data type or format may be used instead.

Each of the thirty-two bits in the mask and active parameters uniquely corresponds to a condition within its corresponding reportable alarm parameter (i.e., FAILED_ALM, MAINT_ALM and ADVISE_ALM). In general, the bits of the mask parameters of each device may be set or reset during configuration, for example, to enable or to disable the ability of a device to report alarms in response to the detection of conditions associated with the FAILED_ALM, MAINT_ALM and ADVISE_ALM parameters or alarms for that device. In this manner, a system user or operator may selectively enable or disable those conditions for which each device will generate a Fieldbus alert or alarm message. Of course, a system user or operator may enable or disable as many or few device conditions as desired.

In operation, when a Fieldbus device detects a condition, a bit corresponding to that detected condition may be set within an appropriate active parameter. For example, if a Fieldbus device detects a failed sensor, a bit corresponding to that condition within the FAILED_ACTIVE parameter for a transducer block within that device may be set or reset to indicate the sensor failure. Any additional device conditions that are detected (and which have not been acknowledged, canceled or cleared), or which are detected at anytime, may also result in bits being set or reset within the active parameter to indicate the existence of those additional conditions. However, as discussed in greater detail below, conditions which are detected following a reported condition (i.e., one for which a Fieldbus alarm message has been sent to the system operator) that has not yet been acknowledged may not be reported until that reported condition has been acknowledged, canceled or otherwise cleared by the system user or operator. The Fieldbus device may then use the FAILED_MASK parameter for the transducer block to filter the device conditions associated with that block for which the user or system operator does not want to receive alarms or alerts. The system user or operator may, at the time of system configuration, define which bits are set or reset in the FAILED_MASK parameter to achieve the desired filtering. By way of example, a logical AND operation may be performed with the FAILED_MASK parameter and the FAILED_ACTIVE parameter to generate the FAILED_ALM parameter to have bits that have been set or reset to indicate the presence of device conditions that are currently active (i.e., have been detected) and which have not been masked by the mask parameter.

In general, each of the independently reportable alarm parameters FAILED_ALM, MAINT_ALM and ADVISE_ALM may report or cause a Fieldbus device to send Fieldbus alarm or alert messages to the system user or operator (for any detected conditions that are active and which are not masked) in the order in which the conditions are detected. In other words, detected conditions within a particular one of the independently reportable alarm parameters for a particular device may be reported to the system user or operator in the order in which the conditions were detected (i.e., on a first in first out basis). Of course, detected conditions may be reported to the system user or operator using some other prioritization or sequencing mechanism if desired. For example, non-masked detected conditions may be reported in reverse chronological order (i.e., on a last in first out basis), based on the type, of the condition detected, etc. Additionally, a Fieldbus device may provide a clear alarm message when all the alarm messages associated with a particular alarm parameter are cleared. Furthermore, if a mask parameter for a particular alarm is changed while a condition associated with the alarm parameter is active, the device may clear the alarm and reevaluate the alarm based on any changes that have been made to the mask parameter.

Each of the Fieldbus devices 1032-1039 may also include priority parameters FAILED_PRI, MAINT_PRI and ADVISE_PRI for each of its respective FAILED_ALM, MAINT_ALM and ADVISE_ALM parameters. These priority parameters may be implemented using unsigned eight bit values, which provide 256 possible priority levels, and may, for example, be assigned a default level or value of two. Setting the priority level of an alarm to zero disables the reporting of that alarm and setting the priority level to any value between 1 and 255 enables a user or system operator to control the manner in which the alarm processing software 1050 manages alarms or alerts on a system-wide basis. In particular, the numerous possible priority levels may be used to determine which devices alarms or alerts take precedence over the alarms or alerts of other devices in this manner, the system user or operator can predefine how the system manages and processes a potentially large number of active alarms.

Each of the Fieldbus devices 1032-1039 may also include a RECOMMENDED_ACTION parameter that may be mapped to textual information within the device description information, which may be stored within the workstation 1014. The textual information referenced by the RECOMMENDED_ACTION parameter may be displayed to the system operator or user to assist in the correction, repair, etc. of a device that has generated an alarm. In the base where a reported alarm has multiple active conditions, the recommended action displayed to the system user or operator may be the most critical or highest priority condition.

As described above, the various types of alerts and alarms generated by the Fieldbus devices 1032-1039 may be mapped at the device level to a plurality of independently reportable alarm parameters (e.g., FAILED_ALM, MAINT_ALM and ADVISE_ALM). In this manner, alerts or alarms from a plurality of Fieldbus devices can be monitored, processed and displayed in a consistent, logical manner to a system operator or user via the workstation 1014. Additionally, within a given Fieldbus device, the independently reportable alarm parameters described herein prevent lower severity types of alerts from masking the communication or display of higher severity types of alerts or alarms to the system operator or user.

Each of the HART devices 1028-1031 provides eight standard status conditions and, if desired, one or more device specific status conditions. However, these standard and device specific status conditions associated with HART devices are not typically consistent with the status conditions reported by Fieldbus devices. In particular, the HART devices 1028-1031 do not report status conditions in a manner that is consistent with the independently reportable alarm parameters FAILED_ALM, MAINT_ALM and ADVISE_ALM described herein.

To facilitate the integrated monitoring, processing and display of alerts or alarms associated with the status conditions reported by the HART devices 1028-1031 and the alerts or alarms reported by the Fieldbus devices 1032-1039 via the independently reportable alarms parameters described herein, the alarm processing software 1050 maps or categorizes HART compliant status information to alert or alarm categories that are consistent with the independently reportable alarm parameters FAILED_ALM, MAINT_ALM and ADVISE_ALM. By way of example only, the eight standard HART device status conditions may be mapped as indicated by Table I below. As depicted in Table I, the alarm processing software 1050 may map or categorize the eight standard HART device status conditions into FAILED, MAINTENANCE and ADVISORY categories, thereby enabling these standard HART status conditions to be reported or displayed to the system operator or user along with Fieldbus device alerts or alarm information in a more consistent and logical manner than was possible with prior systems.

TABLE 1

| HART Status Condition | Mapped Reporting Category |
|---|---|
| Device Malfunction | FAILED |
| More Status Available | ADVISORY |
| Configuration Change | ADVISORY |
| PV Saturated | MAINTENANCE |
| PY Fixed | MAINTENANCE |
| PV Out of Limits | MAINTENANCE |
| Non-PV Out of Limits | MAINTENANCE |
| Cold Start | ADVISORY |

As is well known, in contrast to Fieldbus devices, HART devices must be polled to obtain current device status conditions. Accordingly, the alarm processing software 1050, the controllers 1012 and/or the I/O device 1020A may be configured to periodically poll the HART devices 1028-1031 for status information. Because every response message sent by a HART device includes the current states of the eight standard status conditions, the alarm processing software 1050 may efficiently obtain this status information by extracting the status information from responses to commands that are typically sent by the controllers 1012 via the I/O device 1020A to the HART devices 1028-1031. In other words, the alarm processing software 1050 may introduce little or no additional communication overhead by obtaining status information from responses to commands that would otherwise be periodically sent to the HART devices 1028-1031 by the controllers 1012 to carry out required process control or monitoring activities. For example, in the case where the controllers 1012 are DeltaV type controllers, HART commands #0 and #3 are periodically sent to the HART devices 1028-1031. Thus, the alarm processing software 1050 may extract the standard HART status condition information associated with the devices 1028-1031 from the messages sent in response to these commands. Of course, if desired, any other command could be used by the controllers 1012 and the alarm processing software 1050 to cause the HART devices 1028-1031 to send responsive messages containing the standard HART status information.

As is well known, non-standard HART status (i.e., device specific status) conditions may be obtained by sending a HART command #48 to the HART devices 1028-1031. As is also well known, the HART communication protocol specifies that device specific status information may be available when either the "Device Malfunction" or the "More Status Available" conditions are true (i.e., the bits are set to a logical 1). Thus, when the alarm processing software 1050 detects a true condition for either the "Device Malfunction" or the "More Status Available" status conditions for one of the HART devices 1028-1031, the alarm processing software 1050 sends a HART command #48 to that device. In response to the command #48, the polled device provides more detailed information relating to the nature of the device specific condition or status. The alarm processing software 1050 may then categorize any device specific status conditions, which are provided in response to a command #48, in the following manner: (1) if the "Device Malfunction" bit has been, set, the alarm processing software 1050 maps the device specific status condition to the "FAILED" alert or alarm category and (2) if the "More Status Available" bit has been set, the alarm processing software 1050 maps the device specific status condition to the "ADVISORY" alert or alarm category.

Figure 23:
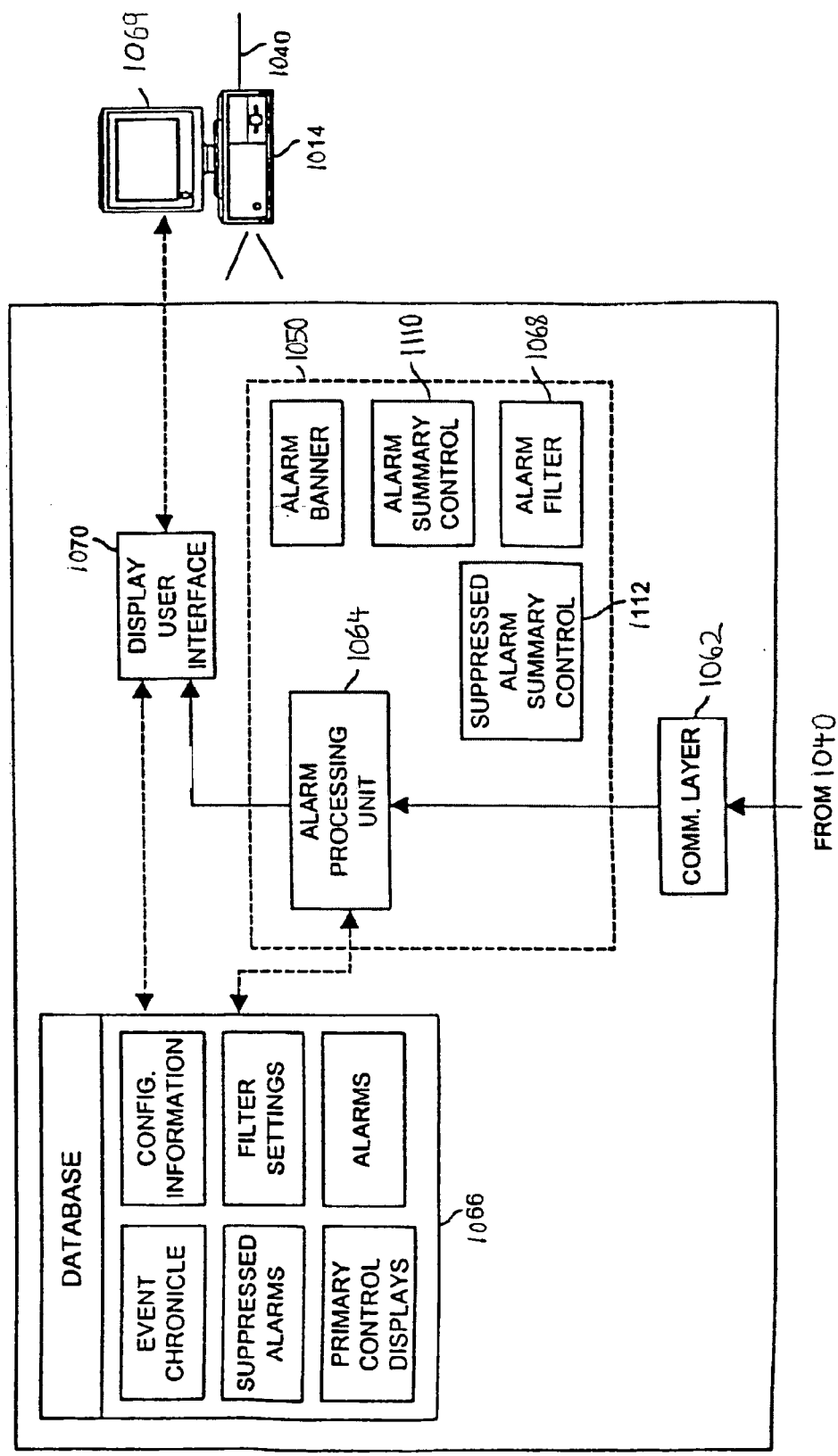
FIG. 23 is a block diagram of a workstation having an alarm display and interface system executed therein that may be used in the process control system shown in FIG. 1.

Referring now to FIG. 23, the configuration of one of the workstations 1014 that implements the alarm display and interface system is illustrated in more detail. As illustrated in FIG. 23, the workstation 1014 stores and executes communication software, such as a communication layer or stack 1062, that communicates with the controllers 1012 via the Ethernet connection 1040 (or via some other communication network such as, for example, the Internet) to receive signals sent by the controllers 1012, I/O devices within the banks 1020 and 1022, the field devices 1025-1039 and/or other workstations. The communication layer 1062 also properly formats messages to be sent to the controllers, I/O devices, the field devices 1025-1039 and other workstations such as alarm acknowledgment messages or signals, etc. The communication software used to implement the communication layer 1062 can be any known or desired communication software that is currently used with, for example, Ethernet communications. Of course, the communication layer 1062 is coupled to other software that performs other functions, such as configuration applications, diagnostic or other process applications, database management applications, etc. executed within the workstation 1014.

The alarm display and interface system includes an alarm processing unit 1064 that receives alarms and other event information from the communication layer 1062 in the form of messages, decodes those messages containing alarm or other event information and may store the alarm and other event information in a database 1066.

The front end of the alarm processing unit 1064 which interfaces with the communication layer 1062 and the database 1066, may be an alarm receiver. The alarm processing software 1050 also includes an alarm filter 1068 that the alarm processing unit 1064 uses to determine which alarms are to be displayed on a user interface 1069 (such as a CRT, LCD, LED, plasma display, printer, etc.) associated with the workstation 1014. The filter 1068 may have its settings stored in the database 1066 and these filter settings may be preconfigured and/or may be changed by a user based on the user's preferences. It should be recognized that the filter 1068 and its settings are distinct from the device level mask parameters FAILED_MASK, MAINT_MASK and ADVISE_MASK, which may be used in connection with Fieldbus devices as described herein. That is, a system user or operator may filter specific alarms generated by specific conditions within specific devices using the device mask parameters. Alternatively or additionally, as described herein, the system user or operator may filter types or categories of alarms, alarms associated with particular plants, areas, units, loops, etc. within the process control system using the filter 1068. For example, in the case where the alarm processing software 1050 is processing alert or alarm information sent by one or more of the HART devices 1028-1031, the alarm filter 1068 may be used to selectively display alert or alarm information in any desired manner. Of course, the HART devices 1028-1031 do not have internal alarm or alert filtering mechanisms such as, for example, the device level mask parameters described above in connection with the Fieldbus devices 1032-1039.

Generally, the filter settings of the alarm filter 1068 may control the category and priority of alarms and, if desired, may establish the order of the alarms to be displayed using a number of different criteria. The workstation and operator scope controls affect what a particular operator can see (e.g., which alarms can be displayed at a particular workstation) based on the operator's identity and the workstation to which the operator is logged on. In this case, an operations license may be assigned to each workstation and, without an operations license, the alarm information and all alarm list/summary displays may be empty. In other words, no active or suppressed alarms of any category (i.e. process, hardware or device) will be shown by the alarm processing unit 1064. Still further, only alarms from a plant area in the current operator's scope (the operator is usually given at least one security key in the plant area) are eligible to appear in the alarm displays on that workstation. Also, only alarms from a plant area and unit which has not been turned off using the plant area or unit filtering display(s) (to be discussed below) are eligible to appear in the alarm display. In this manner, the alarm filter 1068 prevents the display of alarms outside of the workstation and operator scope and alarms from plant areas or units that have been turned off by the operator.

After testing alarms for conformance to the workstation and operator scope controls, the filter 1068 filters out and determines the display order of alarms based on operator settings, which may include, for example, the category of alarm, the priority of the alarm, the type of alarm, the acknowledged status of the alarm, the suppressed status of the alarm, the time of the alarm, the active status of the alarm, etc. The received alarms, which are sent to the alarm processing software 1050 using alarm messages (e.g., Fieldbus alarm messages) may include a parameter for each of these values and the filter 1068 may filter alarms for display by comparing the appropriate parameters of the alarms to the filter settings. For example, the operator can indicate which categories of alarms and priority levels of alarm should be displayed on the screen. If desired, the operator can adjust a predetermined priority level for an alarm by offsetting the priority level from the preconfigured priority level for the alarm set by the manufacturer. In the DeltaV™ system, a priority level between about three and fifteen is typically selected for each alarm and the operator can offset this priority level by any number of levels to make a higher priority a lower priority or a lower priority a higher priority when viewed by the filter 1068. While the operator may set the order of display of the alarms that are passed by the filter 1068, the order may also be determined by preconfigured settings to provide a consistent display of different types of alarms.

In any event, the operator can customize the manner in which alarms are displayed based on the categories or types of alarms that the user is most interested in, which may all be one category or type of alarm such as process alarms, device alarms, hardware alarms or any combination of two or more categories of alarms. Further, the user may configure the display of alarms so that alarms or alerts of different severities may or may not be displayed. For example, the user may want to view only alarms or alerts contained within FAILED_ALM and MAINT_ALM parameters and may not want to view alarms or alerts contained within ADVISE_ALM parameters. More generally, the system operator or user may configure the display of alarms to view alerts or alarms associated with a device failure, a device needing maintenance, and/or an advisable action in connection with a device. The user may also have control over how the alarms are presented and the information provided with the alarms. In this manner, the alarm processing software 1050 enables a single person to perform the operations of an operator, a technician or maintenance person, and an engineer by viewing and addressing on the same screen the alarms that would normally be addressed by different personnel at different locations in a plant. Alternatively, at different times in the same system a maintenance person can use the same system to view only maintenance alarms while an engineer can view other types of alarms affecting the devices. In this manner, the alarm processing software 1050 can be used by different types of people at the same time in different workstations to view different aspects of the alarms associated with the process control system 1000. Furthermore, when using the alarm processing software 1050, it is relatively easy for an individual to turn over alarm functions that they are viewing and acknowledging to another individual who may have the same software. Alternatively or additionally, an individual may set their filter to accept alarms that are normally viewed by another person. In this manner, one person may go to lunch and turn the alarm viewing function over to other persons at different workstations by resetting a few filter settings. When returning from lunch, that person may regain control of those functions. Also, when the amount of alarm information becomes too large for one person to handle, that person may hand off or shed the load for certain categories of alarms such as process alarms, device alarms or hardware alarms so that these alarms can be handled by other people at other terminals.

After the alarm processing unit 1064 uses the filter 1068 to decide which alarms (i.e., non-masked conditions) should be displayed to the user via the display 1069 and the order in which the alarms should be displayed, the alarm processing unit 1064 provides this information to a user display interface 1070, which uses any standard or desired operating system to display alarm information on the alarm display 1069 in any desired manner. Of course, the user display interface 1070 obtains other information it needs, such as information about the layout of or the configuration of the process control system 1000, the values of parameters or signals within that system, etc. from the database 1066 or from other communication signals received from the process control system 1000 via the communication layer 1062. Also, the user display interface 1070 receives commands from the user requesting, for example, more information related to particular alarms, changes to alarm or filter settings, new alarm displays, etc. and provides this information to the alarm processing unit 1064, which then takes the requested action, searches the database 1066 for the alarm information, etc. to provide a new alarm view to the user via the display 1069.

Generally speaking, there are different categories of alarms that can be generated and displayed on the display 1069 including, for example, process alarms, device alarms and hardware alarms. Process alarms, which are known and which are typically generated by function blocks or modules within a process control routine running on a controller or a field device, have, in the past, been sent to and displayed on an operator interface. Process alarms generally indicate a problem with the functional operation of the process control software, i.e., a problem with the process control routine itself such as out-of-bounds measurement, abnormal variances between process parameters and set points, etc. Process alarms are typically configured by the user as components of process control modules and may appear in the configuration information provided on the operator interface as being associated with a module name. Some types of process alarms include bad input/output, out-of-bounds measurements, exceeded thresholds, etc. Because, process alarms are well known in the art, they will not be described in more detail herein.

Device alarms such as the alarms associated with device failure, device maintenance and/or an advisable action in connection with a device, are alarms associated with the operation of the field devices within the process and may be detected by software (e.g., the software 1053 in FIG. 22) within the field devices or other devices connected within the process control system 1000 to indicate a problem or error with the operation of a field device. Device alarms may appear in the operator interface of the system described herein as being associated with a particular device. Device alarms may, for example, indicate that the pressure in a valve is too great or too small for proper operation of the valve, that the motor current in the valve is too high or too low, that the voltage levels of a device are not synchronized, that a valve plug within a valve is stuck, that a device is not communicating properly, that a device, needs scheduled maintenance because, for example, a certain amount of time has passed or because a valve member of the device has undergone a certain amount of travel since the last maintenance, etc. Device alarms can be generated in any desired manner, including using proprietary or non-proprietary software located within a device itself or in other devices connected to the device for which the alarm is generated to recognize and detect specific problems with the device and to generate an alarm with respect thereto.

As discussed above, there can be many different types of device alarms including, for example, failure alarms indicating that a failed or failing condition exists within a device, maintenance alarms indicating that maintenance of some type should take place, communication alarms indicating that a device is not, communicating properly or at all, advisory alarms, etc. A failure (e.g., a "failed") alarm indicates that a device has detected one or more conditions indicating that it cannot perform a critical function and, thus, requires maintenance immediately Whenever the failed alarm condition is true, the integrity of the device is considered bad, which rolls up to the controller and causes the integrity of the controller node to which the device, is connected to be bad. On the other hand, a maintenance alarm indicates that a device is able to perform critical functions but has one or more detected conditions that may lead to a failure if left unaddressed and, thus, the device should receive maintenance attention soon. A communication (e.g., a "not communicating") alarm becomes active when a device stops communicating. Whenever the not communicating alarm condition is true, the integrity of the device is considered bad, which causes the integrity of the controller node to which the device is connected to be bad. An advisory alarm indicates that a device has detected conditions that do not fall into the other alarm categories. Usually, an advisory alarm is an alarm provided by individual devices and is uniquely associated with the type of device, such as a flow meter tracking the variability of the flow signal. In this case, the device may recognize that a variability in some signal associated with the device is too high or too low, which means that something unusual has happened and requires investigation. Depending on the device, advisory alarms may require more or less urgent attention than maintenance alarms and, thus, users may set the priority of the advisory alarm lower than that of the maintenance alarm. Of course, failed, maintenance and advisory alarms may not be supported by every device and a single, catch all alarm, such as an "abnormal" alarm for generic devices maybe used instead of the failed, maintenance, and advisory alarms resulting in two total alarms, i.e., not communicating and abnormal. Of course, other types of device alarms could be created or used instead of or in addition to the ones discussed above.

In one embodiment, integrated alarm information may be provided to a user on a display in the form of an alarm banner at, for example, an edge of a display screen. Referring now to FIG. 24, an alarm banner 1073 is located on the bottom of a screen 71. The alarm banner 1073 includes a first line that displays indications of various alarms that have been generated by the process control system 1000 and that have passed through the filter 1068 to the display 1069. At least one of the alarms indicated in the alarm banner 1073 may be associated with the portion of the process control system 1000 depicted in the main part of the screen 71. The specific alarms displayed in the alarm banner 1073 and the order of these alarms are determined according to the configuration of the mask and priority parameters and the filter settings of the filter 1068. Generally speaking, the highest priority alarms that have not been acknowledged, suppressed or masked will be displayed first, with the next highest priority arms being displayed next, and so on. In the exemplary screen of FIG. 24, the highest priority alarm 1074 is a process alarm illustrated as being associated with a PID101 control routine. The alarm 1074 is displayed in red to illustrate that its priority is critical. On the second line of the alarm banner 1073, an alarm information field 1076 displays alarm information associated with the alarm in the alarm banner 1073 that is currently selected. In the example of FIG. 24, wherein the alarm 1074 is selected, the alarm information field 1076 illustrates that the alarm 1074 was generated on Friday at 12:52:19, is associated with the "tank 16 level control," has a designation or name of PID101/HI_HI_ALM, has a high, high priority and is a critical alarm. If the alarm 1074 is flashing, the alarm 1074 has not been acknowledged, while a constant (non-flashing) alarm indication in the alarm banner 1073 indicates that the alarm 1074 has been acknowledged by some operator or user. Of course, other types of alarm information could be displayed within the alarm information field 1076.

Also, the other alarm indications in the alarm banner 1073, such as the alarm indication 1078, may be yellow, purple, or any other color to indicate other levels of seriousness or priority associated with the alarm. When another alarm is selected, such as the alarm 1078, 1080, 1081 or 1082, alarm information pertaining to that alarm may be displayed in the alarm information field 1076: When viewing an alarm in the alarm banner 1073, the user can acknowledge the alarms and alert maintenance or engineer personnel to take the appropriate actions to correct the condition that led to the alarm or, alternatively, could take other steps such as resetting certain set points to alleviate the alarm condition.

As indicated above, by selecting one of the alarms in the alarm banner 1073 such as the alarm 1074, a primary control display for that alarm is presented in the screen 1071. In particular, as shown in FIG. 24, the main body of the screen 1071 includes a primary control display or depiction of pertinent hardware associated with a particular alarm (a selected alarm) within the process control system 1000. In the example of FIG. 24, the hardware includes three tanks with various sensors attached thereto, all of which are interconnected by various valves and fluid flow lines. This hardware depiction is a representation of the equipment within a portion of the process control system 1000 and provides information about the operation of some of the equipment, such as values or parameters associated with the tanks, sensors etc. Of course, some of this information may be provided by configuration information in the database 1066 and signals from the sensors in the process control system via the controllers 1012 and Ethernet connection 1040. In this case, such information is sent through the communication layer 1062 and is provided to the user display interface 1070 via any known or desired software.

Figure 25:
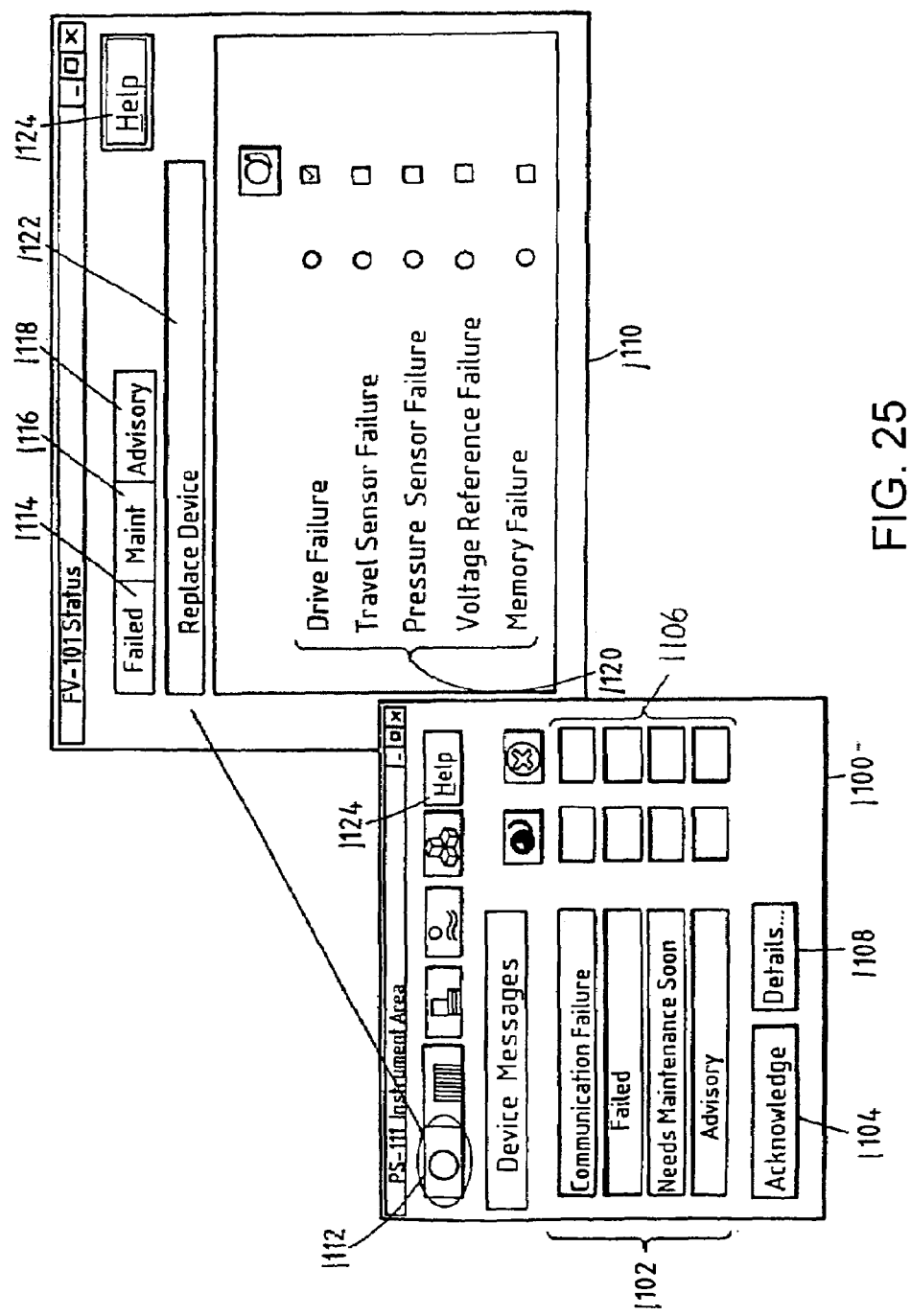
FIG. 25 is another exemplary user interface screen that may be generated by the alarm display and interface system used in the process control system of FIG. 1.
Figure 26:
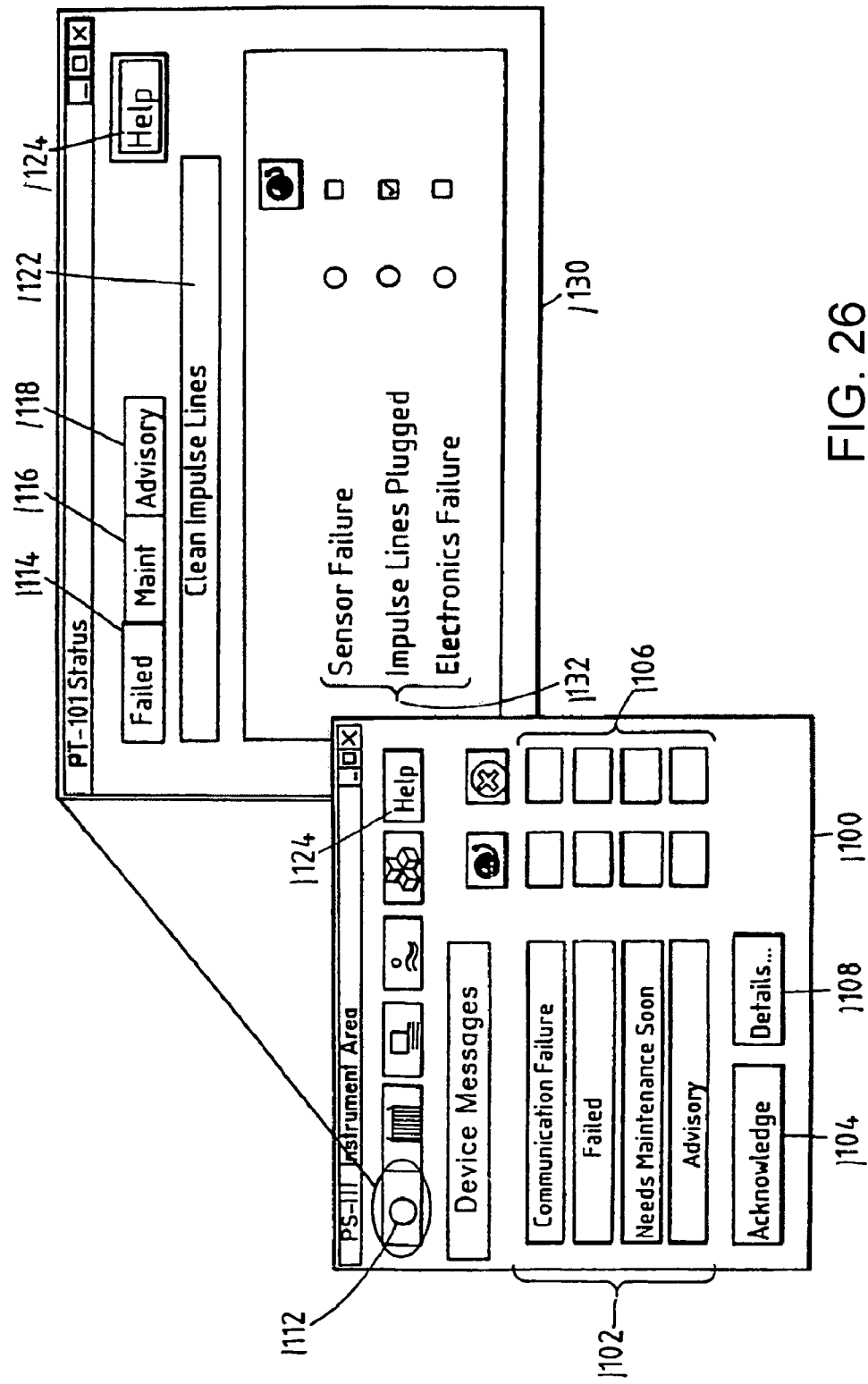
FIG. 26 is yet another exemplary user interface screen that may be generated by the alarm display and interface system used in the process control system of FIG. 1.
Figure 27:
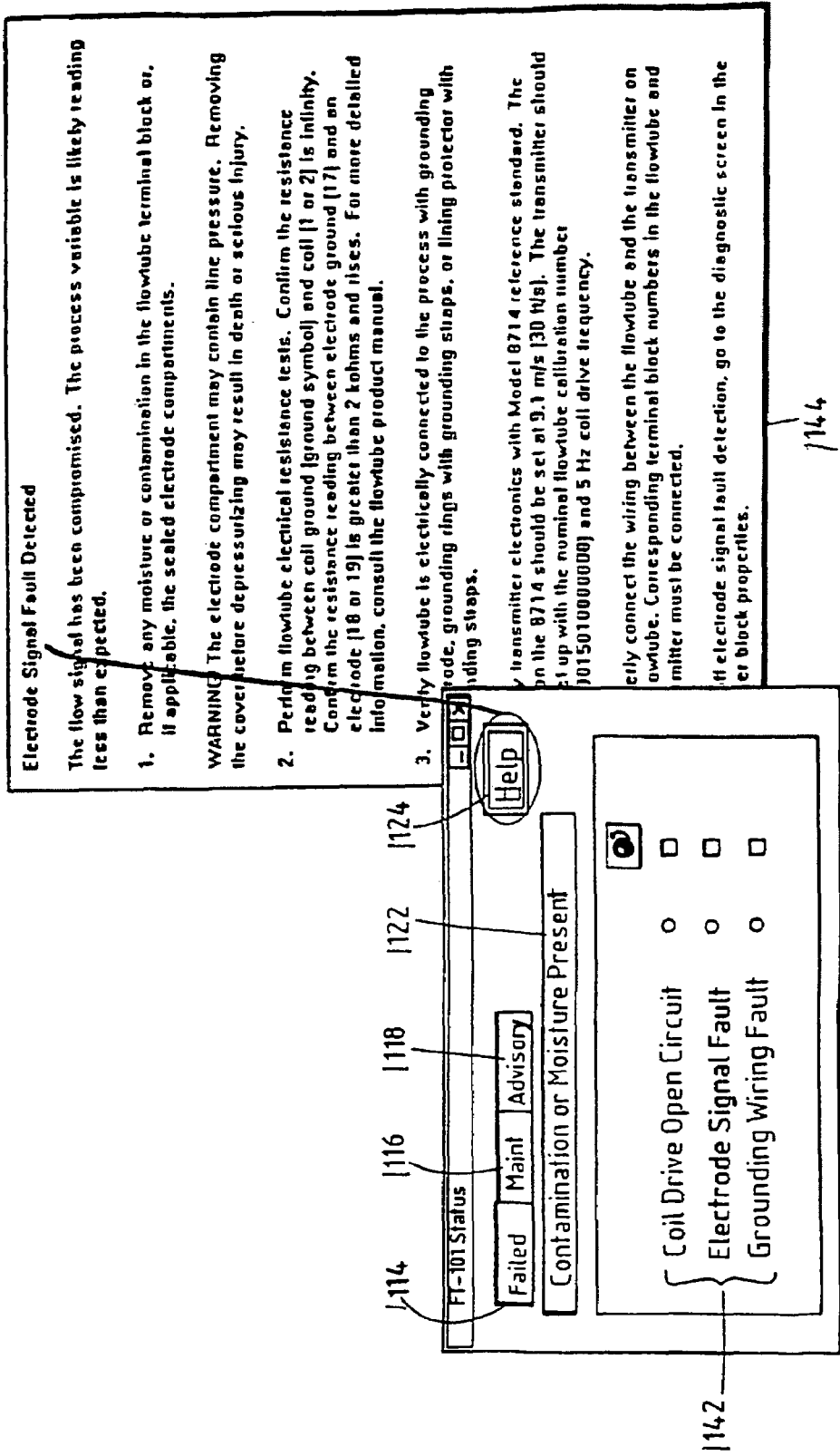
FIG. 27 is still another exemplary user interface screen that may be generated by the alarm display and interface system used in the process control system of FIG. 1.

FIGS. 25-27 are exemplary depictions of graphical displays that may be provided for use by a system user or operator via the alarm display and interface software 1050. FIG. 25 depicts an exemplary pop up window 1100 that may be displayed by the alarm processing software 1050 in response to the system user or operator selecting one of the alarms from the alarm banner 1073 shown in FIG. 24. In particular, if the user selects (e.g., by double clicking on) the alarm 80 associated with a flow valve FV 101, the pop up window 1100 may be displayed. As shown in FIG. 25, the pop up window 1100 includes alarm or alert bars 1102, one or more of which may be highlighted to indicate an active condition within one or more of the independently reportable alarm parameters (i.e., FAILED_ALM, MAIN_ALM and ADVISE_ALM for one or more of the Fieldbus devices 1032-1039, which in this example is the flow valve FV 101. Additionally, one or more of the alert bars may indicate an active condition associated with a device failure, maintenance or advisory alert or alarm from one or more of the HART devices 1028-1031. Of course, the "Failed" alarm bar may be highlighted as a result of an active condition within the FAILED_ALM parameter, the "Needs Maintenance Soon" bar may be highlighted as a result of an active condition within the MAINT_ALM parameter and the "Advisory" bar may be highlighted as a result of an active condition within the ADVISE_ALM. Additionally, as shown in FIG. 25, the alarm or alert bars 1102 may include a "Communication Failure" bar to indicate the presence of a communication failure associated with any one of the field devices 1025-1039.

The system user or operator may select an acknowledge button 1104 to acknowledge a highlighted alarm or alert within the window 1100 or, alternatively, may select one of the cancel boxes 1106 to cancel one or more active alarms or alerts. Further, if desired, the user or system operator may select a "Details" button 1108 to invoke other pop up windows, as discussed in greater detail below, that provide additional information related to those alarms that are currently active within the window 1100.

FIG. 25 also depicts another pop up window 1110 including more detailed status information associated with the flow valve FV 101. The status window 1110 may be invoked from the window 1100 by selecting an icon 1112, the details button 1108, a highlighted one of the alarm or alert bars 1106, or in any other desired manner. In any event, the status window 1110 may include bars 1114, 1116 and 1118, each of which corresponds to one of the independently reportable alarms or alerts. In this example, the "Failed" bar is highlighted because the flow valve FV 101 currently has an active condition within a FAILED_ALM parameter of the valve FV 101. The status window 1110 also includes a list of possible conditions 1120 associated with the reporting, of a failure within the flow valve FV 101. It is important to recognize that while only five conditions are shown in this example, more or fewer than five conditions may be provided if desired. Each of the possible conditions 1120 shown within window 1110 corresponds uniquely to the unmasked active conditions that may be reported by the FAILED_ALM or device failure parameter for that, device. Still further, the window 1110 provides a recommended action bar 1122, which displays, the textual information that is associated with the RECOMMENDED_ACTION parameter of the device and which may be stored within the device description of the device. Additionally, the window 1110 includes a help button 1124 which, if selected by the system user or operator, may invoke another pop up window (such as the help window 1144 shown in FIG. 27 and discussed below) containing textual information for facilitating the user or system operator in troubleshooting, repairing, etc. the device that generated the alarm or alert currently being viewed.

FIG. 26 is another exemplary depiction of a pop up window 1130 that provides status information associated with a pressure transmitter PT 101. The general format of the window 1130 shown in FIG. 26 is identical to that shown FIG. 25 except that the window 1130 includes possible conditions 1132, which are conditions that may cause the pressure transmitter PT 101 to generate a maintenance alert or alarm. It should be noted that, in this example, the maintenance button 1116 is highlighted or active, which indicates that a non-masked condition associated with the MAINT_ALM or device needs maintenance parameter for the pressure transmitter PT 101 is currently active.

FIG. 27 is yet another exemplary depiction of a pop up window 1140 that provides status information associated with a flow transmitter FT 101 and which includes a group of possible conditions 1142 that are similar or identical to the conditions that may be reported by the MAINT_ALM or device needs maintenance parameters for the flow transmitter FT 101. FIG. 27 also shows the pop up help window 1144 that may be invoked by selecting the help button 1124. As shown in FIG. 27, the help window 1144 includes detailed textual information, which may be provided by the device description of the flow transmitter FT 101 and sent to the workstation 1014 for display via the alarm display software 1050.

While the alarm display and interface software 1050 has been described as being used in conjunction with Fieldbus, HART and standard 4-20 mA devices, it can be implemented using any other external process control communication protocol and may be used with any other types of controller software. Although the alarm display and interface software 1050 described herein is preferably implemented as software, it may be implemented in hardware, firmware, etc., and may be implemented by any other processor associated with the process control system 1000. Thus, the routine 1050 described herein may be implemented in a standard multi-purpose processor or using specifically designed hardware or firmware as desired. When implemented in software, the software routine may be stored in any computer readable memory such as on a magnetic disk, a laser disk, or other storage medium, in a RAM or ROM of a computer or processor, etc. Likewise, this software may be delivered to a user or a process control system via any known or desired delivery method including, for example, on a computer readable disk or other transportable computer storage mechanism or over a communication channel such as a telephone line, the Internet, etc. (which are viewed as being the same as or interchangeable with providing such software via a transportable storage medium).

Of course, while the independently reportable alarms described herein have been described as having three levels of severity or types of alarm (i.e., device failure, device maintenance and an advisable action), it should be recognized that two levels or more than three levels of severity may be used instead.

Figure 28:
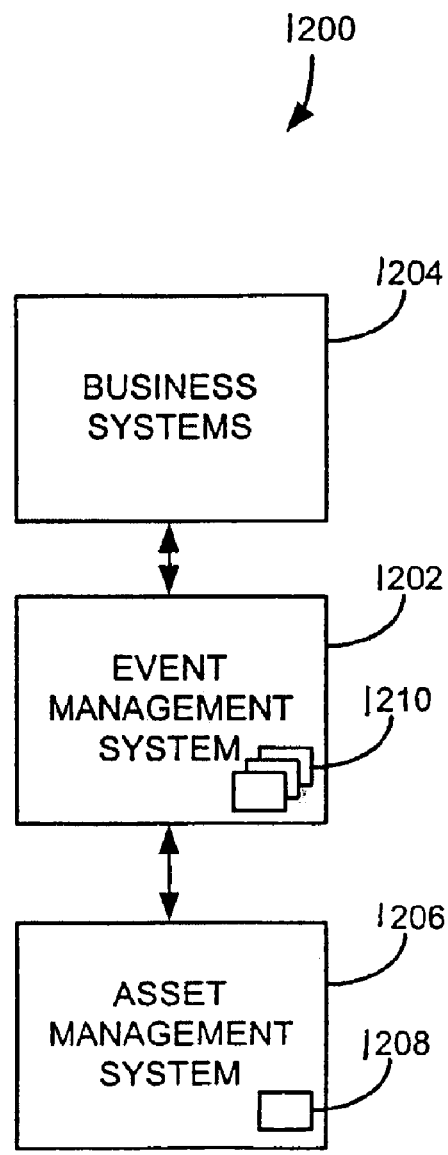
FIG. 28 is an exemplary functional block diagram of a system that uses an event management system to integrate device alerts or alarms with one or more business systems.

In addition to enabling the integrated display of device alert or alarm information, the above-described alarm organization and prioritization system and technique also enables more effective integration of device alert or alarms with the business systems that are typically used within a process control plant or business enterprise. FIG. 28 is an exemplary functional block diagram of a system 1200 that uses an event management system 1202 to integrate device alerts or alarms with one or more business systems 1204. An asset management system 1206 may provide or communicate device alerts or alarms, process alerts or alarms, or any other desired alert or alarm information related to the operation of a process control system or plant to the event management system 1202. Generally speaking, the asset management system 1206 coordinates the interoperation of, and the exchange of information between, the various diagnostic tools, optimization tools, process control tools and any other software and/or hardware tools that may be used to process information related to the operation of a process control plant. The asset management system 1206 may be implemented within one or both of the workstations 1014 and may include the alarm processing software 1050 discussed in connection with FIG. 23. In any event, the asset management system 1206 may receive alert or alarm information from a plurality of process control devices, control loops, etc. and prioritizes, organizes or categorizes the alert or alarm information into the FAILED, MAINTENANCE and ADVISORY categories using techniques that are similar to or identical to the techniques described above.

The asset management system 1206 may communicate categorized alert or alarm information to the event management system 1202. Additionally, the asset management system 1206 may send descriptive information (e.g., textual information) to the event management system 1202 for each of the alerts or alarms that are communicated to the event management system 1202. This descriptive information may be received directly from a field device and stored within a database 1208 or, alternatively, may be generated by a user or operator for each of the devices being monitored and stored in the database 1208 for later retrieval and transmission to the event management system 1202.

The event management system 1202 generally functions as an expert system interface between the asset management system 1206 and the business systems 1204. More specifically, the event management system 1202 may include one or more configuration routines 1210 that, when executed, may be used to configure alert or alarm priorities and rules that are used by the event management system 1202 to control the manner in which the alarm or alert information is sent to or otherwise affects the operation of the business systems 1204. During configuration, a user or operator may be provided with a graphical interface that facilitates selection of the devices to be monitored (i.e., from which devices alert or alarm information will be received and processed) by the event management system 1202. The configuration routines 1210 may, for example, maintain a list or table of all the device tags, which uniquely identify each device within a process control system, and may update this list or table based on a user's selection or de-selection of particular devices. Well known windows-based graphics, point-and-click operations, etc. may be used to provide the user or operator with an intuitive graphical interface for selecting and de-selecting devices to be monitored or tracked.

The configuration routines 1210 may also enable the user or operator to select or define the particular parameters (i.e., particular device alerts or alarms) to be monitored for each selected device. The parameters, alerts or alarms that may be monitored may be provided by the devices themselves using, for example, the device descriptions. Of course, the parameters available for monitoring for each selected device may instead be provided from a database such as, for example, the database 1208 within the asset management system 1206. In any case, each parameter selected is also assigned a priority which may, for example, be a numeric value that ranges from 1-10, where a one may be the lowest priority and a ten may be the highest priority value. Of course, any other numeric range or any other symbols may be used to represent varying priority levels, if desired. For instance, a parameter may be assigned a priority which is a numeric value that ranges between 0 and 100, where 0 is the highest priority and 100 is the lowest priority.

The priority assigned to each parameter selected for monitoring is preferably, but not necessarily, reflective of the overall severity of an alert or alarm associated with that parameter. Thus, the type of alert generated by a device (i.e., which parameter in particular does the alert concern) and the relative importance of the operation of the device to the overall control system that the monitored device is used within may affect the assignment of priority values. The FAILED, MAINTENANCE and ADVISORY categories discussed herein may be used to automatically generate priority assignments. For example, if the event management system 1202 uses numeric values of 1-10 to represent increasing levels of parameter priority, the event management system 1202 may assign a numeric value often to alerts or alarms that are categorized as FAILED, may assign a numeric value of five to alerts or alarms that are categorized as MAINTENANCE and may assign a numeric value of one to alerts or alarms that are categorized as ADVISORY. Of course, a system user or operator may be permitted to override these automatic prioritizations and could assign a different priority to one of more of the selected parameters. By way of example, a maintenance engineer may consider a particular device to be especially crucial to the operation of a process control system or plant and may assign a high priority (e.g., a ten) to all alerts or alarms associated with that device, even if some or all of the alerts or alarms associated with the selected parameters for that device have been categorized as MAINTENANCE or ADVISORY in nature. On the other hand, in a case where a device within the process control system or plant is merely being used to monitor a non-critical process parameter, a user or operator may set a relatively low priority (e.g., a one) for alerts or alarms received in connection with that device, even if some or all of the alerts or alarms associated with the selected parameters for that device are categorized as FAILED. Thus, different devices within a process control system may have different priorities for the same alert or alarm because the operation of some of the devices may be more critical than others. As with the device selection process described above, the parameter selection and priority determination process may be carried out using a windows-based graphical user interface. Additionally, if desired, pop up help windows may be automatically provided or provided at the request of the user or operator to assist in the determination of an appropriate priority level for each of the selected parameters.

Figure 29:
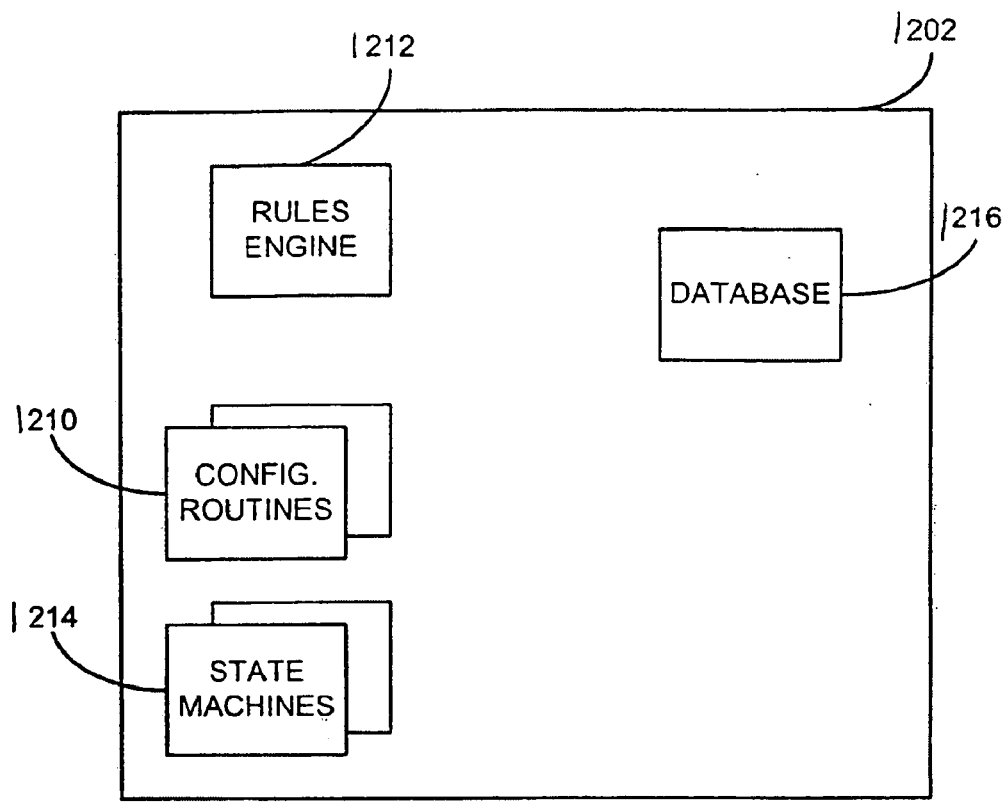
FIG. 29 is a more detailed block diagram of the event management system shown in FIG. 7.

Still further, as shown in FIG. 29, the event management system 1202 may include a rules-engine 1212 that determines whether or not alerts or alarms received by the event management system 1202 should be sent to one or more of the business systems 1204. The rules-engine 1212 may be implemented using relatively simple rules such as, for, example, a look-up table that functions as a filter that indicates which alerts or alarms should be sent or not sent to which ones of the business systems 1204. On the other hand, more complex rules, such as complex conditional logic that considers one or more plant conditions, process control system states, etc. may be implemented within the rules-engine 1212. By way of example only, the conditional logic may be similar or identical to logical conditions such as, for example, "if condition A is true, then take action B."

As shown in FIG. 29, the event management system 1202 may also include one or more state machines 1214 and a database 1216. The basic principles of operation of state machines are well known in the art and, thus, are not described in detail herein. However, the state machines 1214 are specifically adapted to provide state information to the rules-engine 1212. In particular, the state machines 1214 may store a state table within the database 1216 that the rules-engine 1212 may access to retrieve state information to determine, for example, whether or not one or more conditions (such as condition "A" above) are true or false prior to determining whether an action should be taken.

The event management system 1202 described above may be implemented as software or a combination of hardware and software that is executed within a workstation, server or any other computer that is in communication with the process control systems and the business systems associated with a process control plant. For example, in the case of the process control system 1000 shown in FIG. 22, the event management system 1202 may be implemented within one or both of the workstations 1014 or any other workstation, server or computer system that is communicatively coupled to the process control system 1000.

In operation, the asset management system 1206 sends alert or alarm information associated with particular parameters of particular devices that have been selected during execution of the configuration routines 1210. The rules-engine 1212 processes the received alert or alarm information and determines which, if any, of the business systems 1204 will receive notifications. These notifications may include the alert, a priority associated with the alert and a description of the alert, which may be provided by or derived from a device description. Such descriptions may include, for example, textual information relating to repair and/or replacement of a device to remedy a detected problem. Additionally, these notifications are preferably designed to elicit some action by the receiving ones of the business systems 1204. In some cases, a business system may be designed to request notifications and, in those cases, the event management system 1202 will only send notifications if such requests are made. However, in other cases, a business system may simply receive notifications from the event management system 1202 without having to poll the event management system 1202.

After sending a notification, the event management system 1202 may send subsequent notifications to one or more of the business systems 1204 in response to changes in the status of alerts or alarms sent by the asset management system 1206. More specifically, the state machines 1214 receive information from the asset management system 1206 so that the current status of the alerts or alarms that the event management system 1202 has been configured to track may be continuously monitored. In this manner, the event management system 1202 may, for example, initially notify one of the business systems 1204 that a device needs maintenance and may subsequently notify that one of the business systems that the device has failed in response to receipt of an alert or alarm from the asset management system 1206 indicating that such a failure has been detected. Preferably, but not necessarily, the state machines 1214 may be used to manage the communication of notifications between the event management system 1202 and the business systems 1204.

Importantly, the state machines 1214 may be configured to, only update or send notifications to the business systems 1204 in response to changes in status, as opposed to sending multiple or redundant notifications in response to receiving multiple identical alerts or alarms from the asset management system 1206, which may occur in situations where the event management system 1202 is polling the asset management system 1206 for alert or alarm information.

In general, the business systems 1204 may include enterprise asset management systems, abnormal situation management systems, or any other system that may be used in connection with the operation of a process control plant. One particularly useful type of enterprise asset management system is a computerized maintenance system (CMMS), which may be used to coordinate the activities of process control plant maintenance personnel. In the case where the event management system 1202 sends notifications to a CMMS, the notifications may provide alert or alarm information, textual information that includes suggestions or instructions for responding to the alert or alarm that initiated the notification, commands or other instructions that cause the CMMS to respond in a desired manner, etc. To facilitate the work performed by maintenance personnel, the CMMS may display, print or otherwise convey work order information, preventative maintenance information or any other maintenance information to the maintenance personnel so that the highest priority work orders may be performed first.

The business systems 1204 may also be adapted to send confirmation information to the event management system 1202. Generally speaking, these confirmations include information indicative of the actions that have been taken place in connection with a user's or operator's use of or interaction with the business systems 1204. These confirmations may be used by the event management system 1202 to clear events and/or update the state machines 1214 within the event management system 1202. The event management system 1202 may also send confirmation information to the asset management system 1206 for storage within the database 1208. For example, in the case of a CMMS, the CMMS may send confirmations to the database 1208 via the event management system 1202 in response to the generation of work orders, in response to a preventative maintenance request, in response to the assignment of personnel to a particular problem or work order, when the work associated with a work order or preventative maintenance request has been completed, when a work order or preventative maintenance request is closed, etc. In this manner, the confirmation information stored in the database 1208 may be used to provide a complete record and documentation of the work performed on the devices monitored by the asset management system 1206. Of course, the confirmations sent by other types of business systems (i.e., that are not CMMSs) are consistent with the nature of the business system.

Thus, in contrast to known computerized maintenance management systems, the event management system 1202 described herein may, for example, be used to automate the scheduling of maintenance activities within a process control plant in a manner that is predictive of actual device performance and in a manner that is based on actual device status or conditions, as opposed to merely performing repairs or replacements in a purely reactive manner and/or performing preventative maintenance activities based solely on a predetermined schedule. In particular, the event management system 1202 described herein, when used with a CMMS, enables maintenance personnel to perform preventative maintenance on devices based on actual device conditions or status, thereby minimizing or eliminating unexpected device failures and/or unscheduled plant stoppages. For example, one or more field devices may be used to monitor impulse lines for plugging and may send alerts or alarms indicating an advisable action or that maintenance of the lines is needed to avert a failure condition. In the case of a smart valve, linear actuator or other similar device, the device may send an alert or alarm based on the total number of strokes and rated life of the device that indicates the valve, actuator or other device should be serviced soon. In the case of rotating equipment such as, for example, a motor, one or more smart field devices may be used monitor vibration of the motor shaft or other portions of the motor and may send alerts or alarms indicating that the characteristics of the vibration indicate that bearings and/or other components of the motor are worn and should be replaced before a failure occurs.

As with the alarm processing software described above, the event management system 1202 described herein may be implemented using any desired combination of hardware and software. Such hardware may include programmable controllers, microprocessors, application specific integrated circuits or any other digital circuitry, and analog circuitry. Software implementations may use any combination of high-level and lower level programming languages and such software may be stored on any computer readable memory, including solid state, magnetic and optical media Additionally, the event management system 1202, the business system 1204 and the asset management system 1208 may communicate with each other via any desired communication network, including, for example, the Internet.

Figure 30:
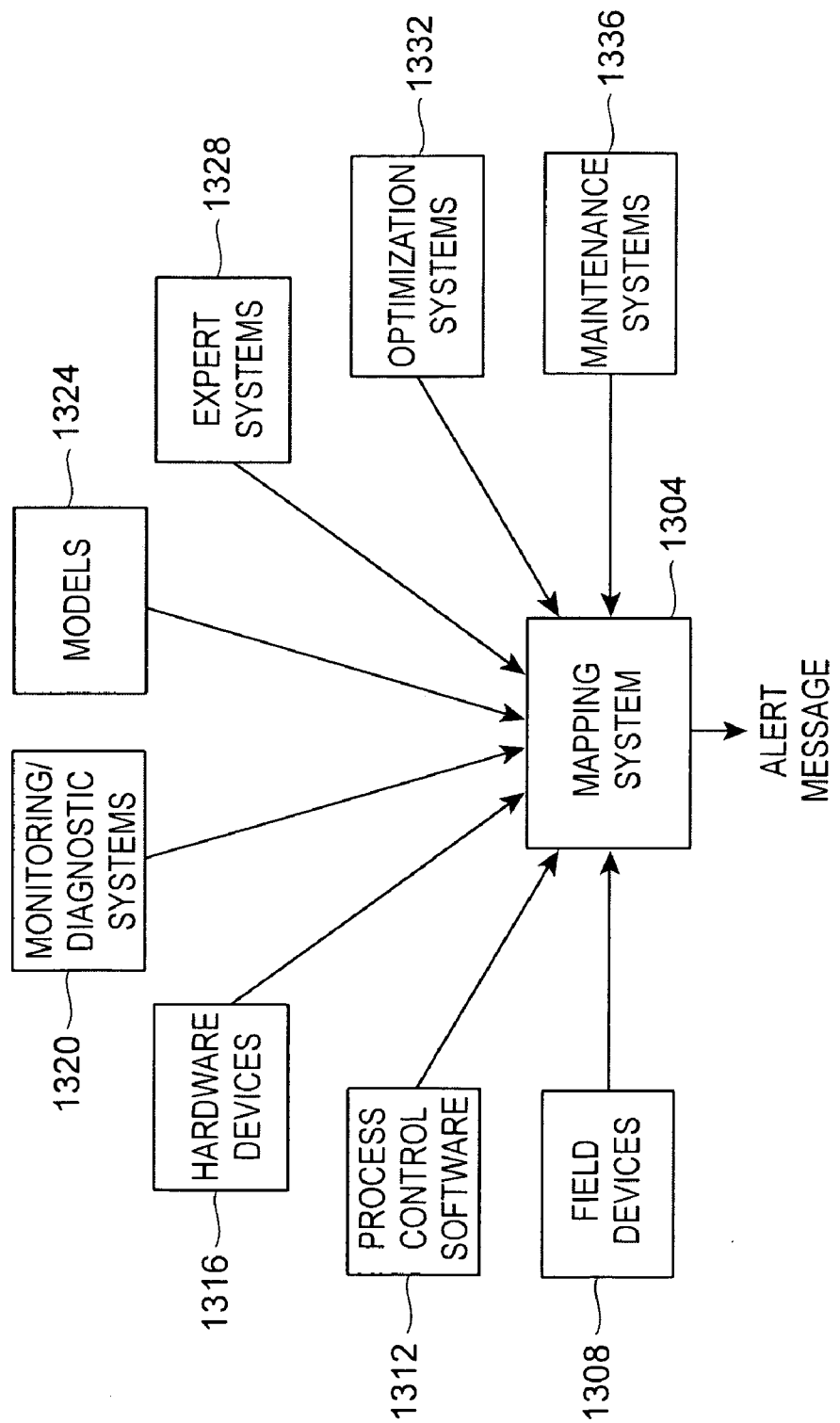
FIG. 30 is a block diagram of information flow in a system that converts operational status information associated with various process entities in a process plant to priority values from a common priority index.

FIG. 30 is a block diagram of information flow in a system 1300 that may be used in a process plant such as the process plant 10 of FIG. 1. Various process entities in the process plant, or monitoring equipment, diagnostic equipment, etc. that monitors process entities, may generate, operational status information associated with the various process entities. Typically, the operational status information associated with many of these process entities is not consistent with the independently reportable alarm parameters FAILED_ALM, MAINT_ALM and ADVISE_ALM described above. To facilitate the integrated monitoring, and/or processing, and/or display of this operational status information, a mapping system 1304 maps the operational status information to the FAILED_ALM, MAINT_ALM and ADVISE_ALM categories described above. The mapping system 1304 may thus enable the operational status information to be, for example, reported or displayed to a system operators maintenance person, business person, etc. in a more consistent and logical manner as compared with prior systems. The system 1300 of FIG. 30 may be implemented in a system such as the process plant 10 of FIG. 1, and will be described with reference to FIG. 1.

The mapping system 1304 may receive operational status information associated with various process entities including field devices 1308, process control software 1312, hardware devices 1316 (e.g., process controllers, input/output devices, operator workstations, network equipment, etc), monitoring and/or diagnostic systems 1320 software or mathematical models 1324, optimization systems 1332, maintenance systems 1336, etc. In the process plant 10 of FIG. 1, the mapping system 1304 may be implemented, for example, by the computer 30. As a particular example, the mapping system 1304 may be implemented as part of software similar to the alarm processing software 1050 as described with reference to FIGS. 22 and 23. In additional examples, the mapping system 1304 could be implemented as part of the event management system 1202 and/or the asset management system 1206 as described with reference to FIGS. 28 and 29.

The mapping system 1304 can be implemented by one or more other computers, workstations, etc., such as computers 12A, 14A, 18, 22, 26, 35, 36, etc. For example, a portion of the mapping system 1304 related to mapping operational status information associated with rotating equipment could be implemented by the computer 22, and another portion of the mapping system 1304 related to mapping operational status information associated with power generation/distribution equipment could be implemented by the computer 26. Thus, the mapping system 1304 may be implemented oh a single computer, or the mapping system 1304 may be a distributed system implemented by a plurality of computers.

The field devices 1308 may include field bus devices, HART devices, devices that communicate according to open protocols such as PROFIBUS®, WORLDFIP®, DEVICE-NET®, CAN, Ethernet, etc., devices that communicate according to proprietary protocols, etc. The operational status information associated with a field device 1308 may include an alert or alarm, a status condition, or other information relative to the operational status of the field device 1308. Referring to FIG. 1, the field devices 1308 may include the field devices 15 and 16. The operational status information associated with a field device 1308 may be received from the field devices 15 and 16, computers 12A, 14A, 18, controllers 12B, 14B, etc.

The operational status information associated with a process control software module 1312 may include process alarms or alerts, or other information relative to the operational status of the process control software 1312. Referring to FIG. 1, the process control software 1312 may include software implemented by controllers 12B and 14B, software within the field devices 16, etc.

The operational status information associated with a hardware device 1316 may include alarms or alerts, or other information relative to the operational status of the hardware device 1316. Referring to FIG. 1, the hardware devices 1316 may include controllers 12B, 14B, I/O cards 312C, computers 12A, 14A, 18, 22, 26, 30, etc. The hardware devices may also include network devices such as switches, routers, bridges, hubs, etc. The network devices may be coupled to a network such as an Ethernet network. Further, the network may be configured for communication according to the Simple Network Management Protocol (SNMP). Further, the operational status information associated with a hardware device 1316 may include alarms, alerts, messages, etc. generated by software executed by the hardware device. As one example, the operational status information associated with a hardware device 1316 may be information generated by a network object. The network object may send the operational status information according to the SNMP.

The monitoring and/or diagnostic systems 1320 may include systems that monitor and/or perform diagnostic analyses such as those described above. For example, such systems may monitor and/or perform diagnostic analyses on a process system (e.g., a root-cause diagnostics system), on rotating equipment, on power generation and/or distribution equipment, etc. The operational status information associated with a monitoring and/or diagnostic system 1320 may include alarms or alerts, or other information relative to the operational status of a process system or equipment being monitored and/or analyzed by the monitoring and/or diagnostic system 1320. Referring to FIG. 1, the monitored/analyzed equipment may include, for example, rotating equipment 20, power generation/distribution equipment 25, etc., and the operational information may be received from, for example, computers 22 and 26.

The software or mathematical models 1324 and expert systems 1328 may include models and experts systems such as those described above. The optimization systems 1332 and maintenance systems 1336 may include optimization and maintenance systems such as those described above.

The mapping system 1304 may receive operational status information associated with a process entity and may generate a corresponding alarm message (e.g., FAILED_ALM, MAINT_ALM, or ADVISE_ALM as described above). The corresponding alarm message may be generated based on the operational status information as well as additional factors (e.g., the location of the process entity or the section of the process plant in which the process entity is located, the rate at which a field device, process control software module, etc. is generating alerts, alarms, status conditions, etc., the type of a field device, user preferences, etc.). The operational status information associated with a process entity may include, for example, a priority value, severity value, etc. indicating a relative severity of a problem, condition, etc. of the process entity. In this case, the mapping system 1304 may generate the corresponding alarm parameter based on the priority or severity value.

The mapping system 1304 may also map certain operational status information into a NO_COMMUNICATION alarm message. For example, operational status information associated with a process, entity may indicate that communication with the process entity (or a device that monitors the process entity) is no longer occurring. Such operational status information may be mapped into a NO_COMMUNICATION alarm message.

The FAILED_ALM, MAINT_ALM, ADVISE_ALM, and NO_COMMUNICATION alarm messages may be generated in a manner, and in a format, similar to the techniques and alarm messages described above. For instance, the alarm messages may be formatted for eventual display on a user interface. In another example, the alarm messages may be formatted according to a format such as the DS-71 or DS-72 IEEE standards for communication to another device. Additionally, the alarm message may include information indicative of a priority level, a recommended action, a link to text or a document offering detailed help, etc. The linked text or document may include a procedure for handling the problem; a document, a diagram, a link to another document, a link to a diagram, etc.

Referring again to FIG. 1, the computer 30 may generate the alarm message corresponding to the operational status information associated with the process entity, and may communicate the alarm message, for example, to an operator workstation for display, to a business system, to a database, etc.

Because the operational information from the various process entities is provided by the mapping system 1304 in a common format, and in a format that may be common to alarm messages generated by other devices, systems, etc. in the process plant, the relative importance of the operational information can be more readily ascertained. For example, if diagnostics information associated with rotating equipment is mapped to FAILED category, and if an alarm associated with a field device is mapped to a MAINTENANCE category, an operator may more readily deduce that a problem with the rotating equipment may be a more pressing problem than the problem with the field device.

The mapping system 1304 described herein may be implemented using any desired combination of hardware and software. Such hardware may include programmable controllers, microprocessors, application specific integrated circuits or any other digital circuitry and/or analog circuitry. Software implementations may use any combination of high-level and lower level programming languages and such software may be stored on any computer readable memory, including solid state, magnetic and optical media. Additionally, the mapping system 1304 may communicate with the other systems via any desired communication network, including, for example, a bus, a LAN, a WAN, the Internet, etc.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A method of processing information related to operational status of process entities in a process plant, the method comprising:

receiving first operational status information associated with a first process entity in the process plant, wherein the first operational status information is indicative of an ability of the first process entity to operate properly, wherein the first operational status information is configured according to a first format, wherein the first process entity is from a first class of devices, wherein the first format is utilized by devices in the first class of devices;

mapping the first operational status information to a status condition associated with the ability of the first process entity to operate properly, wherein the status condition associated with the ability of the first process entity to operate properly is one status condition of a plurality of status conditions, wherein each status condition of the plurality of status conditions is indicative of a different level of severity, wherein the plurality of status conditions corresponds to a second format utilized by devices in a second class of devices to indicate operational status, wherein the second format is different than the first format, wherein the second class of devices is different than the first class of devices; and generating a first alert message associated with the first process entity, the first alert message indicative of the status condition associated with the ability of the first process entity to operate properly.

2. A method as defined in claim 1, further comprising:

receiving second operational status information associated with a second process entity in the process plant, wherein the second operational status information is indicative of an ability of the second process entity to operate properly, wherein the second operational status information is configured according to a third format, wherein the second process entity is from a third class of devices, wherein the third format is utilized by devices in the third class of devices;

mapping the second operational status information to a status condition associated with the ability of the second process entity to operate properly, wherein the status condition associated with the ability of the second process entity to operate properly is one status condition of the plurality of status conditions corresponding to the second format, wherein the second format is different than the third format, wherein the second class of devices is different than the third class of devices; and generating a second alert message associated with the second process entity, the second alert message indicative of the status condition associated with the ability of the second process entity to operate properly.

3. A method as defined in claim 1, further comprising:

receiving operational status information associated with a plurality of other process entities in the process plant, wherein the operational status information associated with the plurality of other process entities is indicative of respective abilities of the plurality of other process entities to operate properly, wherein the operational status information associated with the plurality of other process entities is configured according to at least a fourth format, wherein the plurality of other process entities are from at least a fourth class of devices, wherein the at least the fourth format is utilized by devices in the at least the fourth class of devices;

mapping the operational status information associated with the plurality of other process entities to a plurality of respective status conditions associated with the respective abilities of the plurality of other process entities to operate properly, wherein each respective status condition associated with the respective operational status of the other process entity is one status condition of the plurality of status conditions corresponding to the second format, wherein the second format is different than the at least the fourth format, wherein the second class of devices is different than the at least the fourth class of devices; and generating a plurality of respective alert messages associated with the plurality of other process entities, each of the plurality of respective alert messages indicative of the respective status condition associated with the respective ability of the other process entity to operate properly.

4. A method as defined in claim 1, wherein the first operational status information is received according to a communication protocol chosen from the group of protocols consisting of Fieldbus, HART, PROFIBUS®, WORLDFIP®, DEVICE-NET®, CAN, and Ethernet.

5. A method as defined in claim 1, further comprising displaying an indication of the first alert message on a user interface.

6. A method as defined in claim 1, further comprising communicating the first alert message to a business system.

7. A method as defined in claim 1, further comprising storing the first alert message in a database.

8. A method as defined in claim 1, wherein the first process entity comprises a field device.

9. A method as defined in claim 8, wherein receiving the first operational status information comprises receiving a message indicative of a device alarm associated with the field device.

10. A method as defined in claim 9, wherein generating the first alert message comprises generating the first alert message based on the device alarm.

11. A method as defined in claim 1, wherein the first process entity comprises a process control software module.

12. A method as defined in claim 11, wherein receiving the first operational status information comprises receiving a message indicative of a process alarm associated with the process control software module.

13. A method as defined in claim 12, wherein generating the first alert message comprises generating the first alert message based on the process alarm.

14. A method as defined in claim 1, wherein the first process entity comprises a hardware device from the group consisting of a process controller, an input/output device, an operator workstation, and a network device.

15. A method as defined in claim 14, wherein receiving the first operational status information comprises receiving a message associated a network object.

16. A method as defined in claim 14, wherein receiving the first operational status information comprises receiving a message according to the Simple Network Management Protocol.

17. A method as defined in claim 14, wherein receiving the first operational status information comprises receiving a message indicative of a hardware alarm associated with the hardware device.

18. A method as defined in claim 17, wherein generating the first alert message comprises generating the first alert message based on the hardware alarm.

19. A method as defined in claim 1, wherein the first process entity comprises rotating equipment.

20. A method as defined in claim 1, wherein the first process entity comprises power generating equipment.

21. A method as defined in claim 1, wherein the first process entity comprises power distribution equipment.

22. A method as defined in claim 1, wherein receiving the first operational status information comprises receiving operational status information from a monitoring system.

23. A method as defined in claim 1, wherein receiving the first operational status information comprises receiving operational status information from a diagnostic system.

24. A method as defined in claim 1, wherein receiving the first operational status information comprises receiving operational status information from a model.

25. A method as defined in claim 1, wherein receiving the first operational status information comprises receiving operational status information from an expert system.

26. A method as defined in claim 1, wherein receiving the first operational status information comprises receiving operational status information from an optimization system.

27. A method as defined in claim 1, wherein receiving the first operational status information comprises receiving operational status information from a maintenance system.

28. A method as defined in claim 1, wherein the plurality of status conditions comprises an ADVISORY condition, a MAINTENANCE condition, and a FAILED condition.

29. A method as defined in claim 28, wherein the plurality of status conditions further comprises NO COMMUNICATION condition.

30. A method as defined in claim 1, wherein the first alert message includes an indication of a recommended action.

31. A method as defined in claim 1, wherein the first alert message includes an indication of a link to text related to detailed help.

32. A method as defined in claim 31, wherein the text includes at least one of a procedure for handling a problem associated with the first alert message, a diagram, a link to a document, and a link to diagram.

33. A method as defined in claim 1, wherein the first alert message includes an indication of a link to a document.

34. A method as defined in claim 33, wherein the document includes at least one of a procedure for handling a problem associated with the first alert message, a diagram, a link to another document, and a link to diagram.

35. An apparatus for processing information related to operational status of process entities in a process plant, the apparatus comprising:
   a memory;
   a processor communicatively coupled to the memory, the processor programmed to
      receive first operational status information associated with a first process entity in the process plant, wherein the first operational status information is indicative of an ability of the first process entity to operate properly, wherein the first operational status information is configured according to a first format, wherein the first process entity is from a first class of devices, wherein the first format is utilized by devices in the first class of devices;
      map the first operational status information to a status condition associated with the ability of the first process entity to operate properly, wherein the status condition associated with the ability of the first process entity to operate properly is one status condition of a plurality of status conditions, wherein each status condition of the plurality of status conditions is indicative of a different level of severity, wherein the plurality of status conditions corresponds to a second format utilized by devices in a second class of devices to indicate operational status, wherein the second format is different than the first format, wherein the second class of devices is different than the first class of devices; and
      generate a first alert message associated with the first process entity, the first alert message indicative of the status condition associated with the ability of the first process entity to operate properly.

36. An apparatus as defined in claim 35, wherein the processor is further programmed to
   receive second operational status information associated with a second process entity in the process plant, wherein the second operational status information is indicative of an ability of the second process entity to operate properly, wherein the second operational status information is configured according to a third format, wherein the second process entity is from a third class of devices, wherein the third format is utilized by devices in the third class of devices;
   map the second operational status information to a status condition associated with the ability of the second process entity to operate properly, wherein the status condition associated with the ability of the second process entity to operate properly is one status condition of the plurality of status conditions corresponding to the second format, wherein the second format is different than the third format, wherein the second class of devices is different than the third class of devices; and
   generate a second alert message associated with the second process entity, the second alert message indicative of the status condition associated with the ability of the second process entity to operate properly.

37. An apparatus as defined in claim 35, wherein the processor is communicatively coupled to a database, and wherein the processor is further programmed to send the first alert message to the database for storage.

38. An apparatus as defined in claim 35, wherein the processor is communicatively coupled to a user interface, and wherein the processor is further programmed to display an indication of the first alert message via the user interface.

39. An apparatus as defined in claim 35, wherein the processor is communicatively coupled to a business system, and wherein the processor is further programmed to send the first alert message to the business system.

40. A tangible medium storing machine readable instructions capable of causing one or more machines to:
   receive first operational status information associated with a first process entity in the process plant, wherein the first operational status information is indicative of an ability of the first process entity to operate properly, wherein the first operational status information is configured according to a first format, wherein the first process entity is from a first class of devices, wherein the first format is utilized by devices in the first class of devices;
   map the first operational status information to a status condition associated with the ability of the first process entity to operate properly, wherein the status condition associated with the ability of the first process entity to operate properly is one status condition of a plurality of status conditions, wherein each status condition of the plurality of status conditions is indicative of a different level of severity, wherein the plurality of status conditions corresponds to a second format utilized by devices in a second class of devices to indicate operational status, wherein the second format is different than the first format, wherein the second class of devices is different than the first class of devices; and
   generate a first alert message associated with the first process entity, the first alert message indicative of the status condition associated with the ability of the first process entity to operate properly.

41. A tangible medium storing machine readable instructions as defined in claim 40 capable of causing one or more machines to:
   receive second operational status information associated with a second process entity in the process plant, wherein the second operational status information is indicative of an ability of the second process entity to operate properly, wherein the second operational status information is configured according to a third format, wherein the second process entity is from a third class of devices, wherein the third format is utilized by devices in the third class of devices;

map the second operational status information to a status condition associated with the ability of the second process entity to operate properly, wherein the status condition associated with the ability of the second process entity to operate properly is one status condition of the plurality of status conditions corresponding to the second format, wherein the second format is different than the third format, wherein the second class of devices is different than the third class of devices; and generate a second alert message associated with the second process entity, the second alert message indicative of the status condition associated with the ability of the second process entity to operate properly.

* * * * *